United States Patent
Murata et al.

(10) Patent No.: US 11,988,910 B1
(45) Date of Patent: May 21, 2024

(54) VIEWING ANGLE-CONTROLLING LIQUID CRYSTAL PANEL AND DISPLAY DEVICE

(71) Applicant: Sharp Display Technology Corporation, Kameyama (JP)

(72) Inventors: Koji Murata, Kameyama (JP); Junichi Masuda, Kameyama (JP); Shugo Yagi, Kameyama (JP); Akira Hirai, Kameyama (JP); Hiroshi Tsuchiya, Kameyama (JP); Takashi Satoh, Kameyama (JP); Akira Sakai, Kameyama (JP); Kiyoshi Minoura, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/379,427

(22) Filed: Oct. 12, 2023

(30) Foreign Application Priority Data

Nov. 11, 2022 (JP) ................................ 2022-181164

(51) Int. Cl.
  *G02F 1/13* (2006.01)
  *G02F 1/1335* (2006.01)
  *G02F 1/1347* (2006.01)

(52) U.S. Cl.
  CPC ...... *G02F 1/1323* (2013.01); *G02F 1/133528* (2013.01); *G02F 1/1347* (2013.01)

(58) Field of Classification Search
  CPC ... G02F 1/1323; G02F 1/1347; G02F 1/13471
  See application file for complete search history.

(56) References Cited

U.S. PATENT DOCUMENTS 11,002,998 B2    5/2021  Hopkin et al.
2021/0341800 A1* 11/2021  Woodgate ............. G02F 1/0136

FOREIGN PATENT DOCUMENTS

JP    2008-203565 A    9/2008

OTHER PUBLICATIONS

Min-Hsuan Chiu et al., "Advanced Hyper-Viewing Angle Controllable LCD", 543 • SID 2021 Digest, ISSN 0097-996X/21/5202-0543-$1.00 © 2021 SID, First published: Jun. 28, 2021.

* cited by examiner

*Primary Examiner* — Alexander P Gross
(74) *Attorney, Agent, or Firm* — ScienBiziP, P.C.

(57) ABSTRACT

A viewing angle-controlling liquid crystal panel sequentially includes a first polarizing plate; a first liquid crystal panel; a second polarizing plate; a second liquid crystal panel; and a third polarizing plate, wherein an azimuthal angle φP1 of the absorption axis of the first polarizing plate, an azimuthal angle φ1 of a director of liquid crystal molecules near the first substrate and an azimuthal angle φ2 of a director of liquid crystal molecules near the second substrate in the first liquid crystal panel, an azimuthal angle φP2 of the absorption axis of the second polarizing plate, an azimuthal angle φ3 of a director of liquid crystal molecules near the third substrate and an azimuthal angle φ4 of a director of liquid crystal molecules near the fourth substrate in the second liquid crystal panel, and an azimuthal angle φP3 of the absorption axis of the third polarizing plate satisfy specific formulas.

8 Claims, 44 Drawing Sheets

VIEWING ANGLE-CONTROLLING LIQUID CRYSTAL PANEL AND DISPLAY DEVICE

CROSS-REFERENCE TO RELATED APPLICATIONS

The present application claims priority under 35 U.S.C. § 119 to Japanese Patent Application No. 2022-181164 filed on Nov. 11, 2022, the contents of which are incorporated herein by reference in their entirety.

BACKGROUND OF THE INVENTION

Field of the Invention

The following disclosure relates to viewing angle-controlling liquid crystal panels and display devices using the viewing angle-controlling liquid crystal panel.

Description of Related Art

Liquid crystal panels are panels utilizing a liquid crystal composition to control light passing therethrough. In a typical mode thereof, voltage is applied to a liquid crystal composition sealed between paired substrates such that the alignment of liquid crystal molecules in the liquid crystal composition is changed according to the applied voltage, whereby the amount of light passing through the panel is controlled. Such liquid crystal panels have advantageous features such as thin profile, light weight, and low power consumption, and are therefore used in a variety of fields.

Studies to enhance the viewing angle characteristics of display devices have been made such that the same image can be observed regardless of whether the angle of observation is in a narrow viewing angle range or a wide viewing angle range. Meanwhile, a display method considered in terms of privacy protection is one that allows observation of an image in a narrow viewing angle range but makes the image difficult to observe in a wide viewing angle range. Such studies and consideration suggest a desire for display devices capable of switching between these modes, namely the public mode (wide viewing angle mode) that allows observation of the same image both in a narrow viewing angle range and in a wide viewing angle range and the privacy mode (narrow viewing angle mode) that allows observation of an image in the narrow viewing angle range but makes the image difficult to observe in the wide viewing angle range.

A technique related to a liquid crystal panel used for such a display device capable of switching between the public mode and the privacy mode is disclosed in JP 2008-203565 A, for example. JP 2008-203565 A discloses a viewing angle-controlling liquid crystal panel which, when placed on the front or back surface of a display panel, controls the viewing angle of an image displayed on the display panel, and includes a liquid crystal layer and pixels as units used in application of voltage to the liquid crystal layer. Linearly polarized light is to be incident on the liquid crystal layer. On the surface of the liquid crystal layer from which light is to be emitted is provided a polarizing plate that transmits only light components parallel to the polarization axis of the linearly polarized light incident on the liquid crystal layer, among the light components emitted from the liquid crystal layer. The liquid crystal molecules in the liquid crystal layer tilt in the direction parallel or perpendicular to the polarization axis of linearly polarized light incident on the liquid crystal layer when voltage is applied to the liquid crystal layer. The pixels are arranged in a matrix pattern.

U.S. Ser. No. 11/002,998 B2 discloses a backlight system for controlling a viewing angle, the backlight system including: a first backlight unit that emits light from a non-viewing side of the backlight system toward a viewing side of the backlight system; a second backlight unit located on a viewing side of the first backlight unit that emits light toward the viewing side of the backlight system; a privacy optic that includes a liquid crystal material and is located on a non-viewing side of the second backlight unit and between the first backlight unit and the second backlight unit, wherein the privacy optic operates to transmit light from the first backlight unit in a limited viewing angle range; a first polarizer located on a viewing side of the privacy optic and on a non-viewing side of the second backlight unit; and a second polarizer located on a non-viewing side of the privacy optic and on a viewing side of the first backlight unit, wherein the privacy optic includes a liquid crystal cell configured as a hybrid aligned nematic (HAN) liquid crystal cell located between the first polarizer and the second polarizer, the HAN liquid crystal cell including a first substrate having a first electrode layer and a second substrate having a second electrode layer on opposite sides of a liquid crystal layer, and wherein a viewing angle restriction is stronger when a voltage is applied across the HAN liquid crystal cell.

AU Optronics Corp., Hsinchu et al., Taiwan, "Advanced Hyper-Viewing Angle Controllable LCD", SID 2021 DIGEST, 543 discloses a dual-cell liquid crystal display device including a vertical alignment (VA) mode liquid crystal lens cell; a viewing angle-controlling liquid crystal panel with an ITO grid electrode on its substrate on one side; a display-providing liquid crystal panel; and a louver film. This liquid crystal display device can utilize the transverse electric field to modulate the refractive index distribution in the cell and thereby diffuse the backlight illumination through the louver film (operates in the public mode) during voltage application to the grid electrode of the viewing angle-controlling liquid crystal panel, while allowing the backlight illumination to travel as is toward the display-providing liquid crystal panel without being diffused during no voltage application (operates in the privacy mode).

BRIEF SUMMARY OF THE INVENTION

None of JP 2008-203565 A, U.S. Ser. No. 11/002,998 B2, and Hsinchu et al. mentions consideration on reducing the polar angle (light-shielding angle) at which the transmittance is minimum (i.e., achieving a smaller light-shielding polar angle) in the narrow viewing angle mode. In other words, none of these documents mentions consideration on narrowing the viewing angle range (polar angle range) in the narrow viewing angle mode.

In response to the above issues, an object of the present invention is to provide a viewing angle-controlling liquid crystal panel capable of enhancing capability of blocking light in a narrow viewing angle mode and a display device using the viewing angle-controlling liquid crystal panel.

(1) One embodiment of the present invention is directed to:
a viewing angle-controlling liquid crystal panel sequentially including:
a first polarizing plate with a first absorption axis;
a first liquid crystal panel sequentially including a first substrate with a first electrode, a first liquid crystal layer containing first liquid crystal molecules, and a second substrate with a second electrode;

a second polarizing plate with a second absorption axis parallel to the first absorption axis;

a second liquid crystal panel sequentially including a third substrate with a third electrode, a second liquid crystal layer containing second liquid crystal molecules, and a fourth substrate with a fourth electrode; and a third polarizing plate with a third absorption axis parallel to the first absorption axis, the viewing angle-controlling liquid crystal panel satisfying the following Formula (1), Formula (4), and Formula (5) as well as the following Formula (2) or Formula (3):

$$40° \leq |\varphi1 - \varphi2| \leq 50°$$ Formula (1)

$$0° \leq |\varphi P1 - \varphi1| \leq 5°$$ Formula (2)

$$40° \leq |\varphi P2 - \varphi2| \leq 50°$$ Formula (3)

$$0° \leq |\varphi3 - \varphi4| \leq 20°$$ Formula (4)

$$0° \leq |\varphi P3 - \varphi3| \leq 5°$$ Formula (5)

wherein $\varphi P1$ represents an azimuthal angle of the first absorption axis; $\varphi1$ represents an azimuthal angle of a director of the first liquid crystal molecules near the first substrate, and $\varphi2$ represents an azimuthal angle of a director of the first liquid crystal molecules near the second substrate, each with no voltage applied to the first liquid crystal layer; $\varphi P2$ represents an azimuthal angle of the second absorption axis, $\varphi3$ represents an azimuthal angle of a director of the second liquid crystal molecules near the third substrate, and $\varphi4$ represents an azimuthal angle of a director of the second liquid crystal molecules near the fourth substrate, each with no voltage applied to the second liquid crystal layer; and $\varphi P3$ represents an azimuthal angle of the third absorption axis.

(2) In an embodiment of the present invention, the viewing angle-controlling liquid crystal panel includes the structure (1), in the first liquid crystal panel, the first electrode and the second electrode are solid electrodes, and the first liquid crystal layer provides a retardation of not less than 600 nm and not more than 1200 nm, and in the second liquid crystal panel, the third electrode and the fourth electrode are solid electrodes, and the second liquid crystal layer provides a retardation of not less than 300 nm and not more than 700 nm.

(3) In an embodiment of the present invention, the viewing angle-controlling liquid crystal panel includes the structure (1) or (2), and the first liquid crystal panel or the second liquid crystal panel includes a negative C plate that provides a retardation Rth in a thickness direction of not less than 350 nm and not more than 750 nm.

(4) Another embodiment of the present invention is directed to a display device sequentially including: a backlight located at or behind a back surface side of the first polarizing plate; the viewing angle-controlling liquid crystal panel having the structure (1), (2), or (3) above; a display-providing liquid crystal panel located at or in front of a viewing surface side of the third polarizing plate and sequentially including a fifth substrate with a pixel electrode, a third liquid crystal layer containing third liquid crystal molecules, and a sixth substrate with color filters of a plurality of colors, the display-providing liquid crystal panel being in an IPS mode or an FFS mode; and a fourth polarizing plate with a fourth absorption axis, the display device satisfying the following Formula (6):

$$85° \leq |\varphi P3 - \varphi P4| \leq 90°$$ Formula (6)

wherein $\varphi P3$ represents an azimuthal angle of the third absorption axis, and $\varphi P4$ represents an azimuthal angle of the fourth absorption axis.

(5) In an embodiment of the present invention, the display device includes the structure (4), in the display-providing liquid crystal panel, the color filters of the plurality of colors and the pixel electrode each have an elongated shape, and a lengthwise direction of each of the color filters of the plurality of colors and the pixel electrode lies in a top-bottom direction of the display-providing liquid crystal panel.

(6) In an embodiment of the present invention, the display device includes the structure (4), in the display-providing liquid crystal panel, the color filters of the plurality of colors and the pixel electrode each have an elongated shape, and a lengthwise direction of each of the color filters of the plurality of colors and the pixel electrode lies in a left-right direction of the display-providing liquid crystal panel.

(7) In an embodiment of the present invention, the display device includes the structure (5), the sixth substrate includes a black matrix layer provided with apertures corresponding to the respective color filters of the plurality of colors, the apertures each have a width in the top-bottom direction of the display-providing liquid crystal panel of not smaller than 80 μm and not greater than 140 μm, and the apertures each have a width in a left-right direction of the display-providing liquid crystal panel of not greater than 80 μm.

(8) In an embodiment of the present invention, the display device includes the structure (6), the sixth substrate includes a black matrix layer provided with apertures corresponding to the respective color filters of the plurality of colors, the apertures each have a width in the left-right direction of the display-providing liquid crystal panel of not smaller than 80 μm and not greater than 140 μm, and the apertures each have a width in a top-bottom direction of the display-providing liquid crystal panel of not greater than 80 μm.

The present invention can provide a viewing angle-controlling liquid crystal panel capable of enhancing capability of blocking light in a narrow viewing angle mode, and a display device using the viewing angle-controlling liquid crystal panel.

DETAILED DESCRIPTION OF THE INVENTION

Definition of Terms

The "viewing surface side" herein means the side closer to the screen (display surface) of the display device. The "back surface side" herein means the side farther from the screen (display surface) of the display device.

Figure 52:
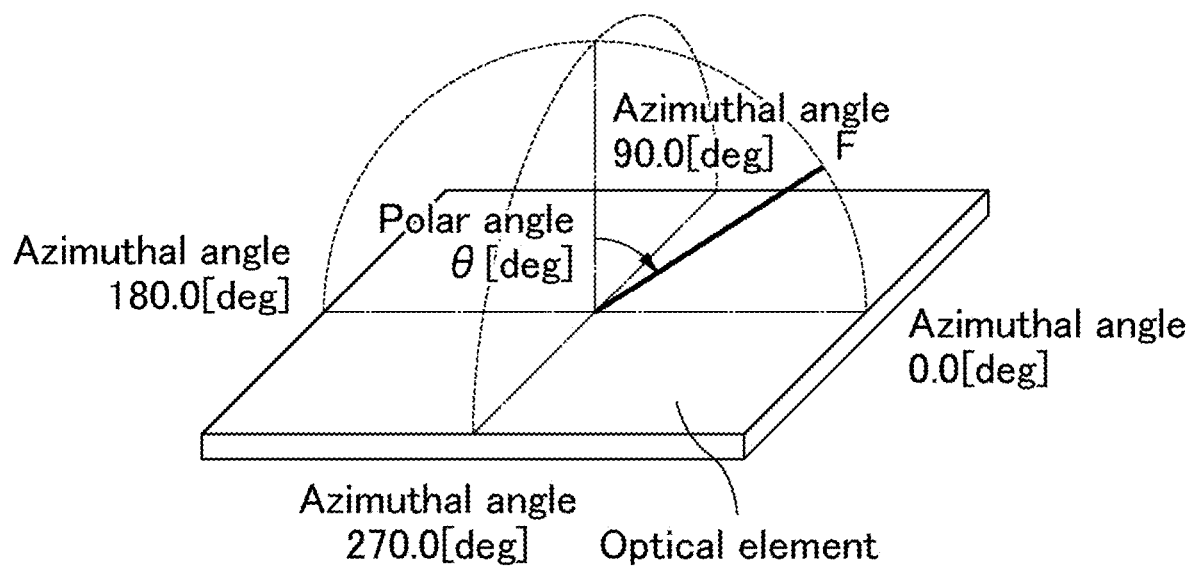
FIG. 52 is a view showing polar angles and azimuthal angles.

FIG. 52 is a view showing polar angles and azimuthal angles. As illustrated in FIG. 52, a "polar angle θ" herein means an angle formed by the direction in question (e.g., measurement direction F) and a direction parallel to the normal to a principal surface of an optical element. That is, the direction parallel to the normal to the principal surface of the optical element is at a polar angle of 0°. The direction parallel to the normal is also referred to a normal direction. The "azimuth" herein means the direction in question in a view projected onto the principal surface of the optical element, and is expressed as an angle (also referred to as an azimuthal angle) formed with the reference azimuth. The reference azimuth (azimuthal angle of 0°) herein is set to the right in the horizontal direction on the screen of the optical element. A polar angle when the direction in question is at an azimuthal angle of 0° to 90° or 270° to 360° (=0°) is expressed as a positive angle. A polar angle when the direction in question is at an azimuthal angle of 90° to 270° is expressed as a negative angle.

The azimuthal angle measures positive in the counterclockwise direction from the reference azimuth and measures negative in the clockwise direction from the reference azimuth. The counterclockwise direction and the clockwise direction are both the rotation directions when the principal surface of the optical element is viewed from the viewing surface side (front). The angle is a value measured in a plan view of the principal surface of the optical element. The expression that two straight lines (including axes, directions, and ridges) are perpendicular to each other herein means that they are perpendicular to each other in a plan view of the principal surface of the optical element. The expression that two straight lines (including axes, directions, and ridges) are parallel means that they are parallel in a plan view of the principal surface of the optical element. Specifically, the expression that two straight lines are perpendicular herein means that they form an angle of 90°±3°, preferably 90°±1°, more preferably 90°±0.5°, particularly preferably 90° (perfectly parallel). The expression that two straight lines are parallel means that they form an angle of 0°±3°, preferably 0°±1°, more preferably 0°±0.5°, particularly preferably 0° (perfectly parallel).

The axis azimuth herein means, unless otherwise specified, the azimuth of the absorption axis of a polarizer or the optic axis (slow axis) of a birefringent layer.

The measurement wavelength for optical parameters such as a principal refractive index and a retardation (phase difference) herein is 550 nm unless otherwise specified.

Herein, the retardation Rth in the thickness direction is defined by Rth=(nz−(nx+ny)/2)×d. In the formula, nx and ny each represent a principal refractive index in the in-plane direction of a birefringent layer, nz represents a principal refractive index in the out-of-plane direction, i.e., the direction perpendicular to a surface of the birefringent layer, and d represents the thickness of the birefringent layer.

Hereinafter, embodiments of the present invention are described. The present invention is not limited to the following embodiments. The design may be modified as appropriate within the range satisfying the configuration of the present invention. In the following description, components having the same or similar functions in different drawings are commonly provided with the same reference sign so as to appropriately avoid repetition of description. The embodiments in the present invention may be combined as appropriate without departing from the spirit of the present invention.

Embodiment 1

A viewing angle-controlling liquid crystal panel of Embodiment 1 sequentially includes a first polarizing plate with a first absorption axis, a first liquid crystal panel, a second polarizing plate with a second absorption axis parallel to the first absorption axis, a second liquid crystal panel, and a third polarizing plate with a third absorption axis parallel to the first absorption axis. A display device of Embodiment 1 sequentially includes a backlight located at or behind a back surface side of the first polarizing plate, the viewing angle-controlling liquid crystal panel of Embodiment 1, a display-providing liquid crystal panel in an IPS mode or an FFS mode located at or in front of a viewing surface side of the third polarizing plate, and a fourth polarizing plate with a fourth absorption axis.

Figure 1:
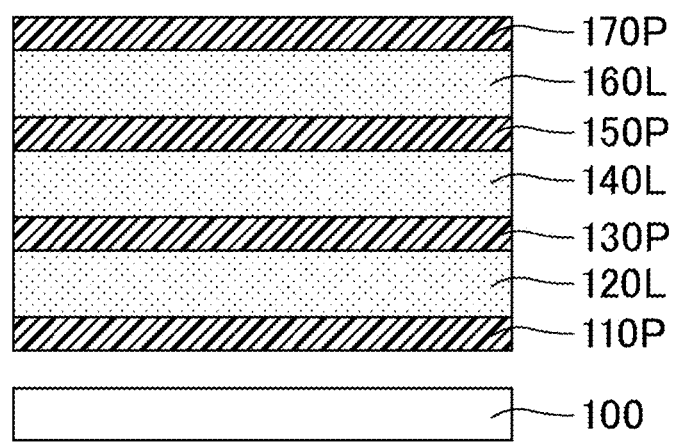
FIG. 1 is a schematic cross-sectional view illustrating an outline of a display device of Embodiment 1.

FIG. 1 is a schematic cross-sectional view illustrating an outline of a configuration of the display device of Embodiment 1. As illustrated in FIG. 1, a specific configuration of the display device of the present embodiment sequentially includes a backlight 100, a first polarizing plate 110P, a first liquid crystal panel 120L, a second polarizing plate 130P, a second liquid crystal panel 140L, a third polarizing plate 150P, a display-providing liquid crystal panel 160L in an IPS mode or an FFS mode, and a fourth polarizing plate 170P. That is, the display device includes the three liquid crystal panels 120L, 140L, and 160L. On the other hand, none of JP 2008-203565 A, U.S. Ser. No. 11/002,998 B2, and Hsinchu et al. discloses a configuration including three liquid crystal panels.

The display-providing liquid crystal panel 160L closest to the viewing surface side among the three liquid crystal panels 120L, 140L, and 160L is used for displaying an image, is driven in an in-plane switching (IPS) mode or a fringe field switching (FFS) mode, and has wide showing viewing angle characteristics.

The display device is capable of switching the mode between narrow viewing angle mode and a wide viewing angle mode. In the narrow viewing angle mode, an image displayed by the display-providing liquid crystal panel 160L is observable in a narrow viewing angle, but is difficult to observe in a wide viewing angle. The narrow viewing angle mode is also referred to as a privacy mode from the viewpoint of application. On the other hand, in the wide viewing angle mode, an image displayed by the display-providing liquid crystal panel 160L is observable in both the narrow viewing angle range and the wide viewing angle range. The wide viewing angle mode is also referred to as a public mode from the viewpoint of application. The switching of the mode is controlled by voltage application to liquid crystal layers in the first liquid crystal panel 120L and the second liquid crystal panel 140L. For example, in the privacy mode, voltage application to each liquid crystal layer may be on, whereas in the public mode, voltage application to each liquid crystal layer may be off.

The first and second liquid crystal panels 120L and 140L located at or behind the back surface side (the backlight 100 side) of the display-providing liquid crystal panel 160L serve as switching liquid crystals for switching between a wide viewing angle and a narrow viewing angle. In the privacy mode, one of the liquid crystal panels blocks light on a high polar angle side, and the other liquid crystal panel blocks light on a low polar angle side. This combination of the two liquid crystal panels 120L and 140L for controlling the viewing angle enables enhancement of a light-shielding intensity and a light-shielding angle range in the narrow viewing angle mode. The first and second liquid crystal panels 120L and 140L exhibit wide showing viewing angle characteristics in the public mode. The first and second liquid crystal panels 120L and 140L are preferably driven in an electrically controlled birefringene (ECB) mode.

Figure 2:
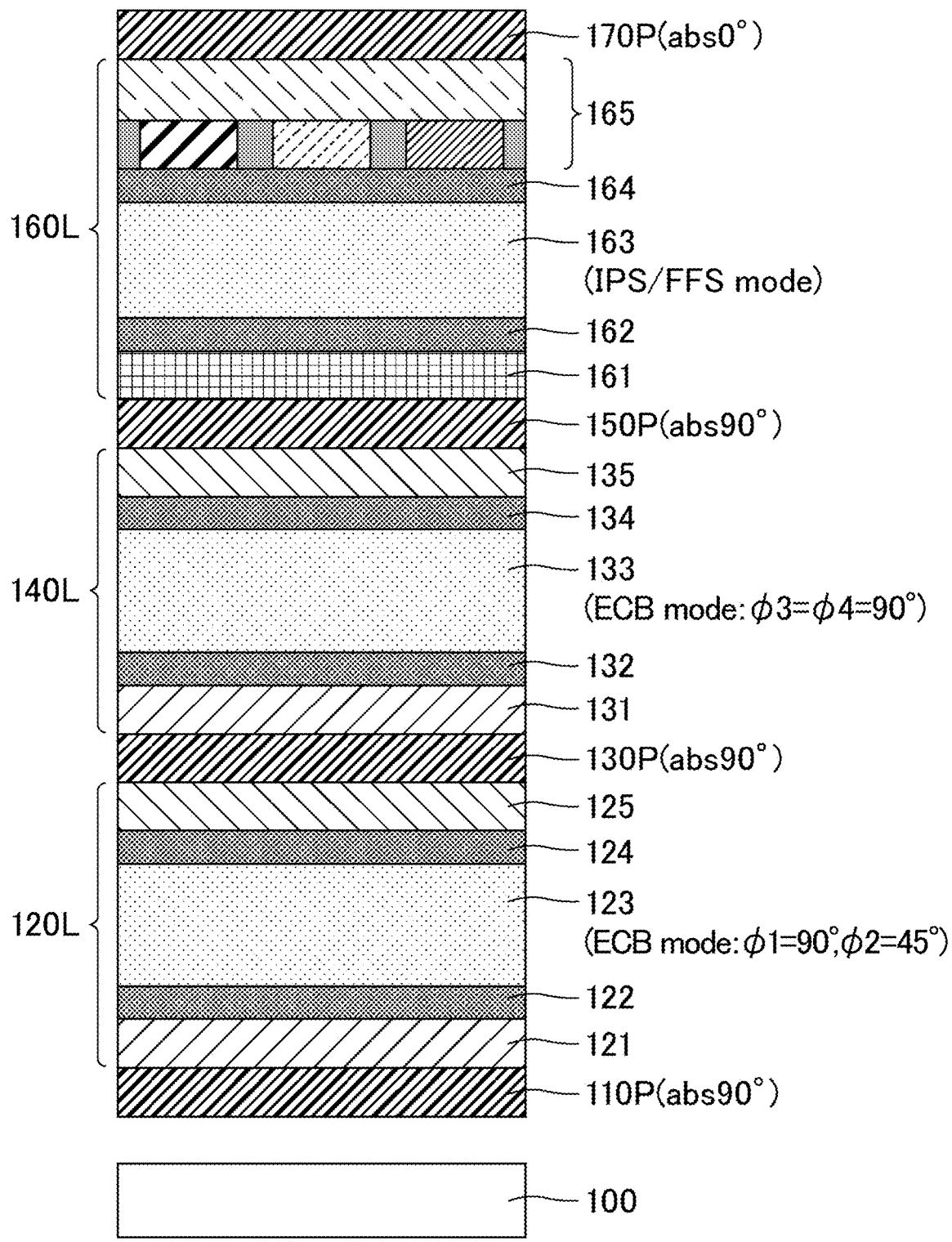
FIG. 2 is a schematic cross-sectional view illustrating a configuration of the display device of Embodiment 1.
Figure 3:
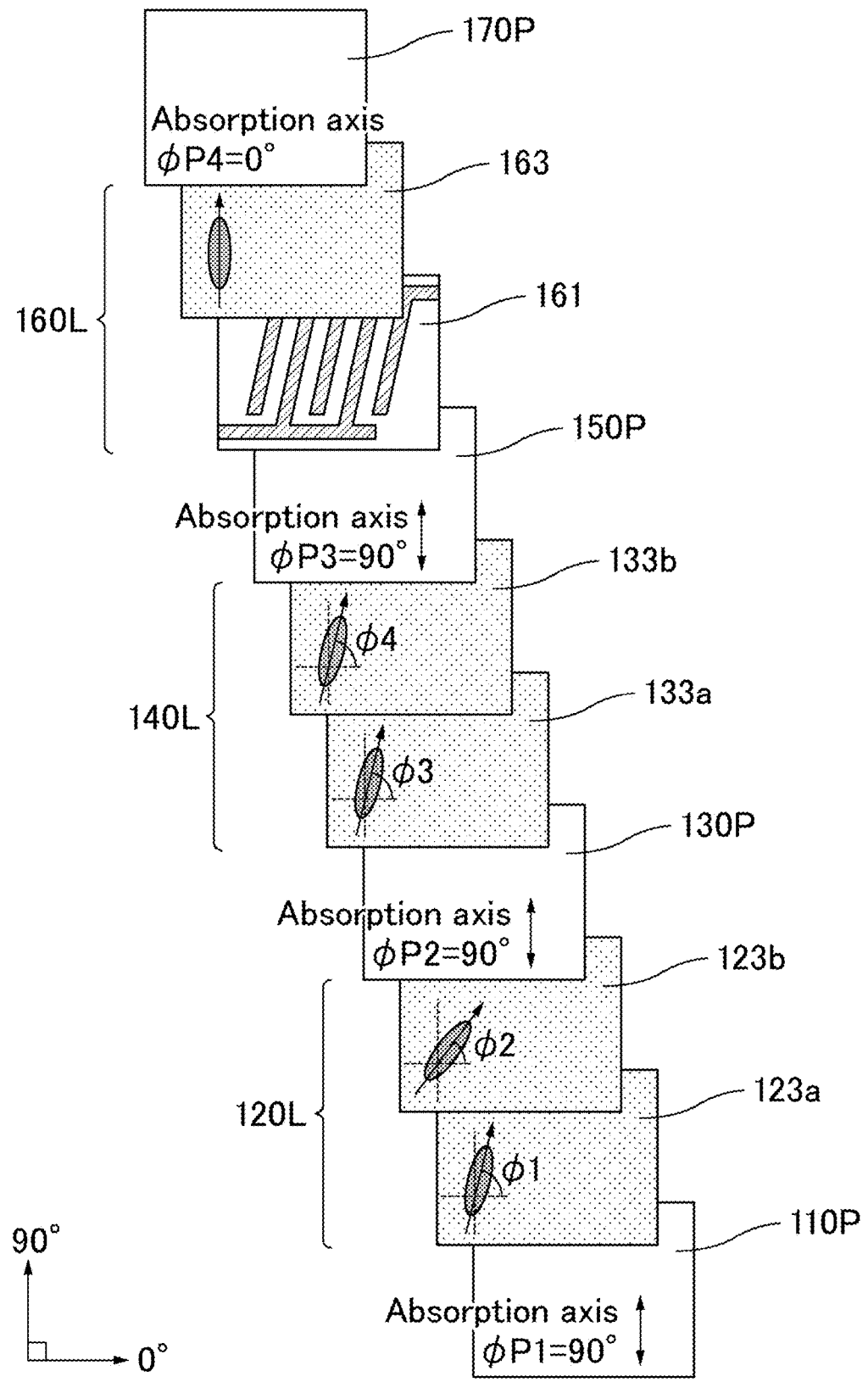
FIG. 3 is a schematic exploded view showing axial arrangement of optical members of the display device of Embodiment 1.

FIG. 2 is a schematic cross-sectional view illustrating a configuration of the display device of Embodiment 1. FIG. 3 is a schematic exploded view showing axial arrangement of optical members of the display device of Embodiment 1. As illustrated in FIGS. 2 and 3, the first liquid crystal panel 120L sequentially includes a first substrate 121 with a first electrode, a first liquid crystal layer 123 containing first liquid crystal molecules, and a second substrate 125 with a second electrode. The second liquid crystal panel 140L sequentially includes a third substrate 131 with a third electrode, a second liquid crystal layer 133 containing second liquid crystal molecules, and a fourth substrate 135 with a fourth electrode. The display-providing liquid crystal panel 160L sequentially includes a fifth substrate 161 with a pixel electrode, a third liquid crystal layer 163 containing third liquid crystal molecules, and a sixth substrate 165 with color filters of a plurality of colors.

Figure 4:
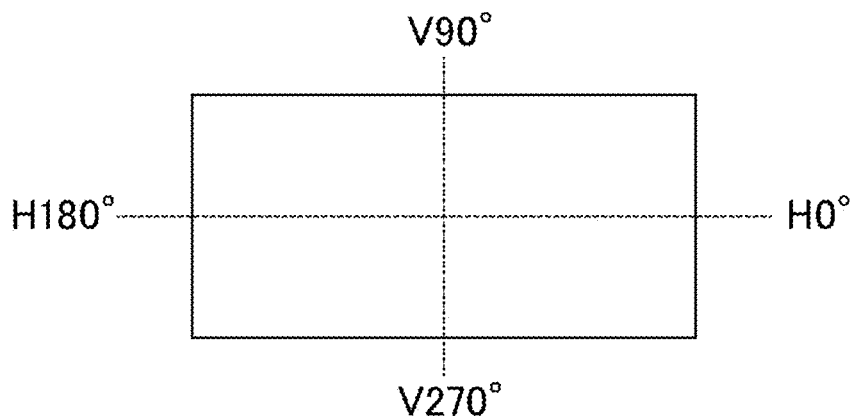
FIG. 4 is a view showing azimuthal angles when a screen of the display device or a panel screen of a viewing angle-controlling liquid crystal panel of Embodiment 1 is seen from a viewing surface side (front).

FIG. 4 is a view showing an azimuthal angle when a screen of the display device or a panel screen of a viewing angle-controlling liquid crystal panel of Embodiment 1 is seen from a viewing surface side (front). In the drawings, H represents a horizontal direction, and V represents a vertical direction. As illustrated in FIG. 4, the reference azimuth is set to the right in the horizontal direction (H 0°) when the screen of the display device or the panel screen of the viewing angle-controlling liquid crystal panel is viewed from the viewing surface side (front). The azimuthal angle measures positive in the counterclockwise direction and measures negative in the clockwise direction. Both counterclockwise and clockwise directions are rotation directions when the screen of the display device is viewed from the viewing surface side (front).

The display device of Embodiment 1 satisfies the following Formula (1) as well as the following Formula (2) or Formula (3):

$$40° \leq |\varphi 1 - \varphi 2| \leq 50°$$ Formula (1)

$$0° \leq |\varphi P1 - \varphi 1| \leq 5°$$ Formula (2)

$$40° \leq |\varphi P2 - \varphi 2| \leq 50°$$ Formula (3)

wherein φP1 represents an azimuthal angle of a first absorption axis (abs) of the first polarizing plate 110P; φ1 represents an azimuthal angle of a director of first liquid crystal molecules 123a near the first substrate 121 and φ2 represents an azimuthal angle of a director of first liquid crystal molecules 123b near the second substrate 125, each with no voltage applied to the first liquid crystal layer 123; and φP2 represents an azimuthal angle of a second absorption axis of the second polarizing plate 130P.

Formula (1) shows that the director of the first liquid crystal molecules (back surface side liquid crystal molecules) 123a near the first substrate 121 and the director of the first liquid crystal molecules (viewing surface side liquid crystal molecules) 123b near the second substrate 125 are twisted by 40° to 50°. A preferable lower limit of |φ1−φ2| is 42°, and a preferable upper limit thereof is 48°.

Formula (2) shows that the difference in azimuthal angle between the first absorption axis of the first polarizing plate (back surface side polarizing plate) 110P and the director of the first liquid crystal molecules (back surface side liquid crystal molecules) 123a near the first substrate 121 that are adjacent to each other is within 5°. A preferable upper limit of |φP1−φ1| is 3°.

Formula (3) shows that a difference in azimuthal angle between the second absorption axis of the second polarizing plate (viewing surface side polarizing plate) 130P and the director of the first liquid crystal molecules (viewing surface side liquid crystal molecules) 123b near the second substrate 125 that are adjacent to each other is 40° to 50°. A preferable lower limit of |φP2−φ2| is 42°, and a preferable upper limit thereof is 48°.

The display device of Embodiment 1 satisfies the following Formula (4) as well as Formula (5):

$$0° \leq |\varphi 3 - \varphi 4| \leq 20°$$ Formula (4)

$$0° \leq |\varphi P3 - \varphi 3| \leq 5°$$ Formula (5)

wherein φ3 represents an azimuthal angle of a director of second liquid crystal molecules 133a near the third substrate 131 and φ4 represents an azimuthal angle of a director of second liquid crystal molecules 133b near the fourth substrate 135, each with no voltage applied to the second liquid crystal layer 133; and φP3 represents an azimuthal angle of the third absorption axis of the third polarizing plate 150P.

Formula (4) shows that an angle formed by the director of the second liquid crystal molecules (back surface side liquid crystal molecules) 133a near the third substrate 131 and the director of the second liquid crystal molecules (viewing surface side liquid crystal molecules) 133b near the fourth substrate 135 is within 20°. A preferable upper limit of |φ3−φ4| 18°.

Formula (5) shows that a difference in azimuthal angle between the third absorption axis of the third polarizing plate (viewing surface side polarizing plate) 150P and the director of the second liquid crystal molecules (back surface side liquid crystal molecules) 133a near the third substrate 131 is within 5°. A preferable upper limit of |φP3−φ3| is 3°.

The display device of Embodiment 1 satisfies the following Formula (6):

$$85° \leq |\varphi P3 - \varphi P4| \leq 90°$$ Formula (6)

wherein φP3 represents an azimuthal angle of the third absorption axis of the third polarizing plate 150P, and φP4 represents an azimuthal angle of the fourth absorption axis of the fourth polarizing plate 170P.

Formula (6) shows that the third absorption axis of the third polarizing plate (back surface side polarizing plate) 150P and the fourth absorption axis of the fourth polarizing plate (viewing surface side polarizing plate) 170P are substantially perpendicular to each other.

In the display device of Embodiment 1, the azimuthal angle φP1 of the first absorption axis of the first polarizing plate 110P, the azimuthal angle φ1 of the director of the first liquid crystal molecules 123a near the first substrate 121 and the azimuthal angle φ2 of the director of the first liquid crystal molecules 123b near the second substrate 125, each with no voltage applied to the first liquid crystal layer 123, the azimuthal angle φP2 of the second absorption axis of the second polarizing plate 130P, the azimuthal angle φ3 of the director of the second liquid crystal molecules 133a near the third substrate 131 and the azimuthal angle φ4 of the director of the second liquid crystal molecules 133b near the fourth substrate 135, each with no voltage applied to the second liquid crystal layer 133, the azimuthal angle φP3 of the third absorption axis of the third polarizing plate 150P, and the azimuthal angle φP4 of the fourth absorption axis of the fourth polarizing plate 170P may be any angle as long as these angles satisfy Formula (1), Formula (4), Formula (5), and Formula (6) as well as Formula (2) or Formula (3). FIGS. 2 and 3 show, as an example, a case where the azimuthal angle φP1 of the first absorption axis of the first polarizing plate 110P is 90°; the azimuthal angle φ1 of the director of the first liquid crystal molecules 123a near the first substrate 121 is 90°, the azimuthal angle φ2 of the first liquid crystal molecules 123b near the second substrate 125 is 45°, each with no voltage applied to the first liquid crystal layer 123; the azimuthal angle φP2 of the second absorption axis of the second polarizing plate 130P is 90°; the azimuthal angle φ3 of the director of the second liquid crystal molecules 133a near the third substrate 131 is 90°, the azimuthal angle φ4 of the director of the second liquid crystal molecules 133b near the fourth substrate 135 is 90°, each with no voltage applied to the second liquid crystal layer 133; the azimuthal angle φP3 of the third absorption axis of the third polarizing plate 150P is 90°; and the azimuthal angle φP4 of the fourth absorption axis of the fourth polarizing plate 170P is 0°.

The display device of Embodiment 1 can enhance light-shielding intensity and the light-shielding angle range in the narrow viewing angle mode. Principles of this enhancement will be specifically described later with reference to simulation results in examples below.

Members constituting the display device of Embodiment 1 will be described.

(Backlight)

The backlight 100 may be one commonly used in the field of liquid crystal display devices. The backlight 100 may be any one that can be located at or behind the back surface side of the viewing angle-controlling liquid crystal panel and emit light from the backlight 100 to the viewing surface side. The backlight 100 may be a direct-lit one or an edge-lit one. The light source of the backlight 100 may be of any type such as a light emitting diode (LED) or a cold cathode fluorescent lamp cathode (CCFL).

The backlight 100 may include a louver film to improve the directivity. Preferably, the backlight 100 includes two light guide plates, and one of the two light guide plates has a function for the wide viewing angle mode and the other of the two light guide plates has a function for the narrow viewing angle mode. Specifically, for example, the backlight 100 may include a light guide plate laminate of a diffusing light guide plate and a non-diffusing light guide plate and independently control the LEDs arranged at the end of each of the two light guide plates, so as to be able to switch the mode of the backlight between the public mode and the privacy mode.

(Polarizing Plate)

The first polarizing plate 110P, the second polarizing plate 130P, the third polarizing plate 150P, and the fourth polarizing plate 170P are all absorptive polarizers. Each of these polarizing plates may be, for example, a polarizer obtained by dyeing a polyvinyl alcohol (PVA) film with an anisotropic material such as an iodine complex or dye to adsorb the anisotropic material on the PVA film, and stretching the film for alignment. Each of the first polarizing plate 110P, the second polarizing plate 130P, the third polarizing plate 150P, and the fourth polarizing plate 170P has an absorption axis extending along a specific azimuth and a transmission axis perpendicular to the absorption axis. These polarizing plates absorb polarization components vibrating in an azimuth parallel to the absorption axis (Viewing Angle-Controlling Liquid Crystal Panel)

Figure 5:
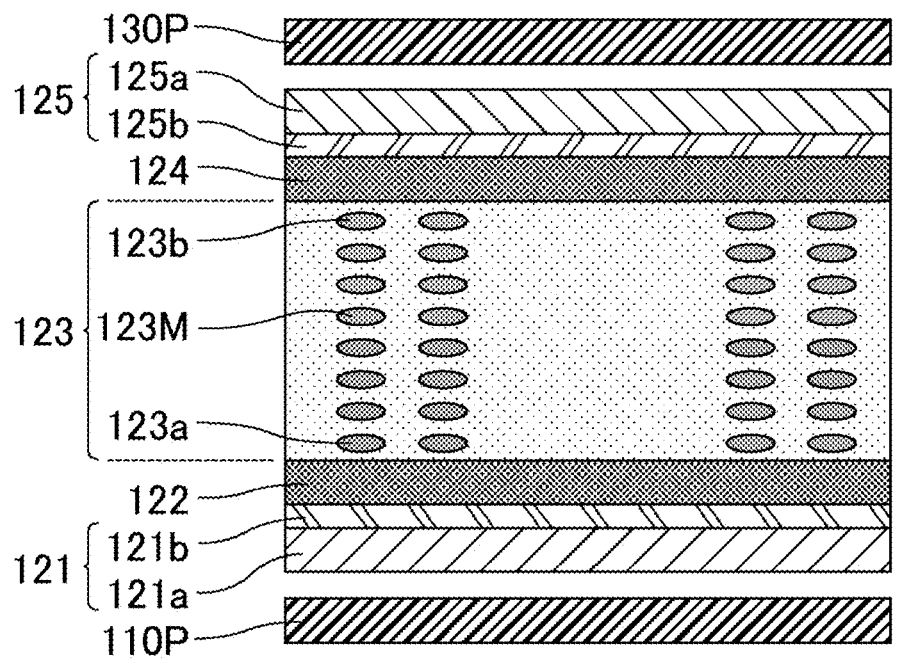
FIG. 5 is a schematic cross-sectional view illustrating a state of a first liquid crystal panel of Embodiment 1 with no voltage applied.
Figure 6:
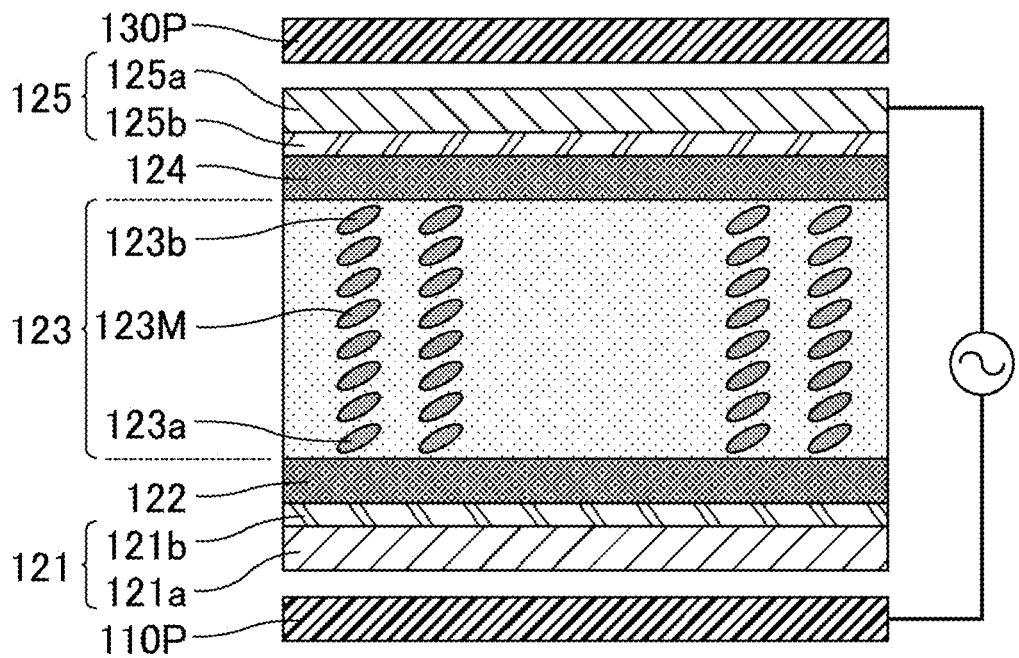
FIG. 6 is a schematic cross-sectional view of the first liquid crystal panel of Embodiment 1 with voltage applied.

FIG. 5 is a schematic cross-sectional view illustrating a state of a first liquid crystal panel of Embodiment 1 with no voltage applied. FIG. 6 is a schematic cross-sectional view of the first liquid crystal panel of Embodiment 1 with voltage applied. The first liquid crystal panel 120L includes, sequentially from the back surface side toward the viewing surface side, a first substrate 121 with a support substrate 121a and a first electrode 121b, an alignment film 122, a first liquid crystal layer 123 containing first liquid crystal molecules 123M, an alignment film 124, and a second substrate 125 with a second electrode 125b and a support substrate 125a. The second liquid crystal panel 140L may have a configuration similar to that of the first liquid crystal panel 120L except that azimuthal angles of directors of liquid crystal molecules with no voltage applied to the liquid crystal layer are controlled independently of each other. That is, the second liquid crystal panel 140L includes, sequentially from the back surface side toward the viewing surface side, a third substrate with a support substrate and a third electrode, an alignment film, a second liquid crystal layer containing second liquid crystal molecules, an alignment film, a fourth substrate with a fourth electrode and a support substrate.

The azimuthal angle of a director of liquid crystal molecules with no voltage applied to the liquid crystal layer can be controlled by using an alignment film adjacent to the liquid crystal layer, and a desired azimuthal angle is obtained by adjusting an alignment treatment on the alignment film. A method for the alignment treatment can be appropriately selected depending on a material for the alignment film, and may be, for example, rubbing or optical illumination.

The first and second liquid crystal panels 120L and 140L can each change retardation of the liquid crystal layer by changing voltage applied between a pair of electrodes located at the viewing surface side and the back surface side of the liquid crystal layer. The change of retardation of the liquid crystal layer controls the amount of transmission of light through the polarizing plate. The first liquid crystal panel 120L uses a combination of the first electrode 121b and the second electrode 125b as a pair of electrodes, and the second liquid crystal panel 140L uses the third electrode and the fourth electrode as a pair of electrodes.

Examples of the support substrates include substrates such as glass substrates and plastic substrates. Examples of the material for the glass substrates include glass such as float glass and soda-lime glass. Examples of the material for the plastic substrates include plastics such as polyethylene terephthalate, polybutylene terephthalate, polyethersulfone, polycarbonate, and alicyclic polyolefin.

The pair of electrodes may be transparent electrodes that can be formed from, for example, a transparent conductive material such as indium tin oxide (ITO), indium zinc oxide (IZO), zinc oxide (ZnO), or tin oxide (SnO) or an alloy of any of these materials.

The alignment films control the alignment azimuth and the tilt angle of the liquid crystal molecules with no voltage applied. The alignment films may be horizontal alignment films or vertical alignment films. In order to increase the transmittance with no voltage applied, the alignment films are preferably horizontal alignment films.

A horizontal alignment film, when provided to a substrate in a liquid crystal panel, exerts an alignment control force of aligning the liquid crystal molecules in the liquid crystal layer substantially horizontally thereto, with no voltage applied to the liquid crystal layer. A vertical alignment film, when provided to a substrate in a liquid crystal panel, exerts an alignment control force of aligning the liquid crystal molecules in the liquid crystal layer substantially vertically thereto, with no voltage applied to the liquid crystal layer.

The expression "substantially horizontally" means that the tilt angle is not smaller than 0° and not greater than 10°, preferably not smaller than 0° and not greater than 5°, more preferably not smaller than 0° and not greater than 2°. The expression "substantially vertically" means that the tilt angle is not smaller than 83° and not greater than 90°, preferably not smaller than 85° and not greater than 90°, more preferably not smaller than 87.5° and not greater than 88.0°.

The "tilt angle" herein does not mean the angle formed by the director of liquid crystal molecules and the principal surface of each substrate, but means the average angle formed by the director of liquid crystal molecules in the thickness direction of the liquid crystal layer and the principal surface of each substrate, with the angle parallel to the substrate surface measuring 0° and the angle of the line normal to the substrate surface measuring 90°. In particular, the tilt angle of the liquid crystal molecules with no voltage applied is also referred to as a pre-tilt angle. The alignment azimuth of liquid crystal molecules with no voltage applied is also referred to as an initial alignment azimuth. The tilt angle can be measured by the rotating crystal method with, for example, Axoscan (available from Axometrics, Inc.). The director of liquid crystal molecules in the present embodiment means the direction of the principal axes of alignment (the average direction of the long axes of molecules in nematic liquid crystal). For example, in a plan view, the director of liquid crystal molecules with no voltage applied coincides with the alignment treatment direction for the alignment films.

The alignment films can be made of a material commonly used in the field of liquid crystal panels, such as a polymer having a polyimide structure in its main chain, a polymer having a polyamic acid structure in its main chain, or a polymer having a polysiloxane structure in its main chain. The alignment films can be formed by, for example, applying an alignment film material to a substrate. The application method may be any method such as flexo printing or inkjet coating.

The alignment films may each be a photoalignment film containing a photo-functional group and having undergone a photoalignment treatment as the alignment treatment, a rubbed alignment film having undergone a rubbing treatment as the alignment treatment, or an alignment film having undergone no alignment treatment.

The first and second liquid crystal panels 120L and 140L may be passive liquid crystal panels that are passively driven or active matrix liquid crystal panels that are driven by an active matrix driving method. In the case of the passive liquid crystal panels, switching between the public mode and the privacy mode can be performed on the entire screen. In the case of the active matrix liquid crystal panels, switching between the public mode and the privacy mode can be performed not on the entire but on a portion of the screen.

In the case of the passive liquid crystal panels, the pair of electrodes may be solid electrodes that cover the entire screen. This configuration enables switching between the public mode and the privacy mode on the entire screen.

In the case of the active matrix liquid crystal panels, the support substrate 121a is disposed such that gate lines and source lines arranged perpendicularly to each other form a grid pattern, and thin film transistors (TFTs) as switching elements are located at or near the intersections. Regions surrounded by the gate lines and the source lines define pixels, and each pixel includes, as the first electrode 121b, a pixel electrode connected to the corresponding TFT. The support substrate 125a includes, as the second electrode 125b, a common electrode that is a solid electrode covering the entire screen.

The first and second liquid crystal panels 120L and 140L may be driven by any method such as a typical active matrix driving method. In other words, the TFTs in the respective pixels are switched on or off (turned on or off) via a gate driver. The switching is followed by application of voltage to the switched-on pixel via the source driver so as to store electric charge in the storage capacitor in the pixel via the drain bus of the corresponding TFT. The storage capacitance maintains the pixel turned on.

The gate lines are conductive lines connected to the gate electrodes of the respective TFTs (typically, the bus lines connected to the gate electrodes). Scanning signals (signals that control the on and off states of the TFTs) are supplied to the connected gate electrodes of the TFTs. The source lines are conductive lines connected to the source electrodes of the respective TFTs (typically, bus lines connected to the source electrodes). Data signals (e.g., video signals) are supplied to the connected TFTs. Typically, either the gate lines or the source lines are in the form of lines vertically crossing an array region with the TFTs arranged in a matrix pattern while the others are in the form of lines horizontally crossing the array region.

The gate lines, the source lines, and the conductive lines and electrodes of the TFTs can be formed by forming a single- or multi-layered film of a metal such as copper, titanium, aluminum, molybdenum, or tungsten, or an alloy of any of these metals by a method such as sputtering, followed by patterning of the film by a method such as photolithography. Various conductive lines and electrodes to be formed in the same layer are produced from the same material for a higher efficiency of production.

The first liquid crystal panel 120L includes the first liquid crystal layer 123 containing the first liquid crystal molecules 123M. The second liquid crystal panel includes the second liquid crystal layer 133 containing the second liquid crystal molecules. The first liquid crystal layer 123 and the second liquid crystal layer 133 may be the same as or different from each other except that the azimuthal angles of the directors of the liquid crystal molecules with no voltage applied are controlled independently of each other. Liquid crystal molecules have positive or negative anisotropy of dielectric constant, and the alignment state of liquid crystal molecules changes according to the voltage applied to the liquid crystal layer. The anisotropy of dielectric constant ($\Delta\varepsilon$) of liquid crystal molecules is defined by Formula (L) below. Liquid crystal molecules having a positive anisotropy of dielectric constant will be referred to as positive liquid crystal molecules, and liquid crystal molecules having a negative anisotropy of dielectric constant will be referred to as negative liquid crystal molecules. The direction of the long axes of the liquid crystal molecules with no voltage applied is also referred to as the initial alignment direction of the liquid crystal molecules.

$$\Delta\varepsilon = \text{(dielectric constant in long axis direction of liquid crystal molecules)} - \text{(dielectric constant in short axis direction of liquid crystal molecules)} \qquad (L)$$

The first liquid crystal molecules and the second liquid crystal molecules may be negative liquid crystal molecules or positive liquid crystal molecules, but are preferably negative liquid crystal molecules. The negative liquid crystal molecules are suitable for the case of performing photoalignment treatment on an alignment film. The photoalignment treatment is suitable for panel fabrication using a larger-side substrate as compared to rubbing treatment, and can obtain a high yield.

The liquid crystal molecules are homogeneously aligned with no voltage applied and thus can achieve the ECB mode when the liquid crystal molecules have a positive anisotropy of dielectric constant. Herein, the homogeneous alignment means an alignment state where the liquid crystal molecules are aligned horizontally to the surfaces of a substrate constituting the viewing angle-controlling liquid crystal panel (e.g., the surfaces of at least one of the first substrate 121 or the second substrate 125) and the orientations of the liquid crystal molecules are the same. The state with no voltage applied (during no voltage application) herein means a state where voltage of not lower than the threshold for the liquid crystal molecules is not applied to the liquid crystal layer. For example, the same constant voltage may be applied to the first electrode 121b and the second electrode 125b, or a constant voltage may be applied to one of the first electrode 121b and the second electrode 125b while a voltage lower than the threshold for the liquid crystal molecules relative to the constant voltage may be applied to the other of the electrodes. The state with voltage applied (during voltage application) herein means a state where a voltage of not lower than the threshold for the liquid crystal molecules is applied to the liquid crystal layer. The state with voltage applied is, for example, a state where the optimal voltage is applied. The optimal voltage means the voltage that causes the liquid crystal panel (e.g., in the ECB mode) to introduce a retardation of $\lambda/2$ [nm] at the light-shielding angle (e.g., angle falling within a polar angle range of −40° to −30°.

(Display-Providing Liquid Crystal Panel)

Figure 7:
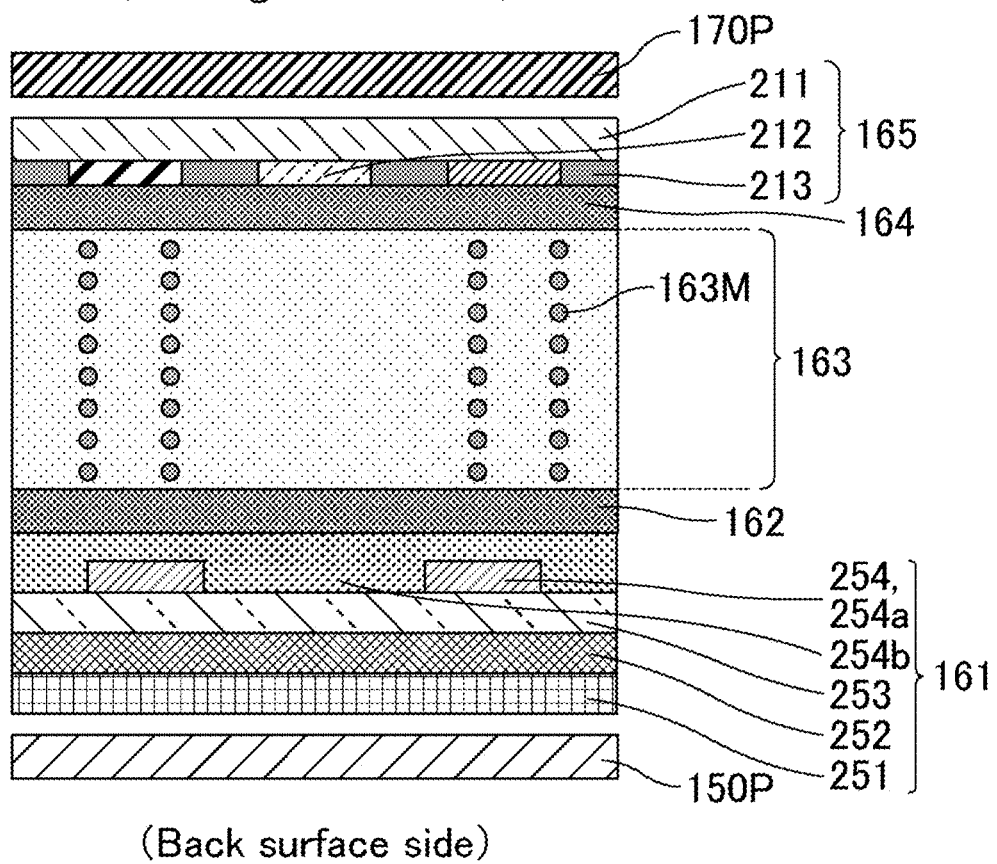
FIG. 7 is a schematic cross-sectional view illustrating a display-providing liquid crystal panel of Embodiment 1.

FIG. 7 is a schematic cross-sectional view illustrating a display-providing liquid crystal panel of Embodiment 1. The display-providing liquid crystal panel 160L is located between the third polarizing plate 150P and the fourth polarizing plate 170P, and includes, sequentially from the back surface side toward the viewing surface side, the fifth substrate 161 with pixel electrodes 252, an alignment film 162, the third liquid crystal layer 163 containing third liquid crystal molecules 163M, an alignment film 164, and the sixth substrate 165 with color filters of a plurality of colors (color filter layer 212). The display-providing liquid crystal panel 160L includes a plurality of pixels arranged in the in-plane direction in a matrix pattern, and is driven in an IPS mode or an FFS mode.

The fifth substrate 161 includes the pixel electrodes 252 and common electrodes 254. This configuration can achieve the display-providing liquid crystal panel 160L in the in-plane switching (IPS) mode or the fringe field switching (FFS) mode, and allows the display-providing liquid crystal panel 160L alone to achieve a wide viewing angle. The present embodiment is described based on a case where the display-providing liquid crystal panel 160L is in the FFS mode.

As illustrated in FIG. 7, the fifth substrate 161 includes, sequentially from the back surface side toward the viewing surface side, a support substrate 251, the pixel electrodes 252 arranged in the respective pixels, an insulating layer 253, and the common electrodes 254 each including linear electrodes 254a. In other words, the fifth substrate 161 has an FFS electrode structure in which the pixel electrodes 252 and the common electrodes 254 are stacked with the insulating layer 253 in between. The fifth substrate 161 is also referred to as an active matrix substrate.

The fifth substrate 161 includes, on the support substrate 251, parallel gate lines and parallel source lines crossing the gate lines via an insulating film. The gate lines and the source lines as a whole are formed in a grid pattern. TFTs are arranged as switching elements at the respective intersections of the gate lines and the source lines.

The present embodiment is described with reference to the display-providing liquid crystal panel 160L having an FFS-mode electrode structure as an example. Yet, the concept of the present embodiment is also applicable to an IPS-mode electrode structure in which the pixel electrodes 252 and the common electrodes 254 are both comb-teeth electrodes, and the pixel electrodes 252 as comb-teeth electrodes and the common electrodes 254 as comb-teeth electrodes are formed in the same electrode layer such that their comb teeth fit each other.

Non-limiting examples of the support substrate 251 of the fifth substrate 161 include the same support substrates in the first and second liquid crystal panels 120L and 140L.

The pixel electrodes 252 and the common electrodes 254 are arranged in the respective pixels. The pixel electrodes 252 are preferably planar electrodes. Herein, the "planar electrode" means an electrode without any slit or aperture in a plan view. The pixel electrodes 252 preferably overlap at least the later-described linear electrodes 254a of the common electrodes 254 in a plan view.

The common electrodes 254 are electrically connected to one another over the pixels. The common electrodes 254 each include the linear electrodes 254a. The planar shape of the common electrodes 254 may be, for example, a structure in which the ends of the linear electrodes 254a are both closed. The common electrodes 254 may each be provided with an aperture 254b surrounded by its electrode portion.

The common electrodes 254 arranged in the respective pixels may be electrically connected to one another and a common constant voltage may be applied to the pixels, while each of the pixel electrodes 252 arranged in the respective pixels may be electrically connected to the corresponding source line via the semiconductor layer of the corresponding TFT and different voltages may be applied to the respective pixels according to the respective image signals.

Materials for the pixel electrodes 252 and the common electrodes 254 are not particularly limited, and may be similar to the material for the pair of electrodes in the first and second liquid crystal panels 120L and 140L, for example.

Examples of the insulating layer 253 include inorganic insulating films and organic insulating films. The inorganic insulating films may be, for example, inorganic films (relative dielectric constant ε=5 to 7) such as a silicon nitride (SiNx) film or a silicon oxide ($SiO_2$) film, or a laminate of these films. The organic insulating films may be, for example, organic films such as an acrylic resin film, a polyimide resin film, or a novolac resin film, or a laminate of any of these films.

The alignment films 162 and 164 control the alignment azimuth and the tilt angle of the third liquid crystal molecules 163M with no voltage applied. The alignment films 162 and 164 are horizontal alignment films.

The alignment films 162 and 164 may be rubbed alignment films or photoalignment films. The alignment films 162 and 164 contain, for example, a polymer for an alignment film such as a polymer having a polyimide structure in its main chain, a polymer having a polyamic acid structure in its main chain, or a polymer having a polysiloxane structure in its main chain. The alignment films 162 and 164 can be formed by, for example, applying an alignment film material containing the polymer for an alignment film to the substrates. The application method may be any method such as flexo printing or inkjet coating.

The third liquid crystal layer 163 contains the third liquid crystal molecules 163M and controls the amount of light passing therethrough by changing the alignment of the third liquid crystal molecules 163M according to the voltage applied to the third liquid crystal layer 163. The anisotropy of dielectric constant (Δε) of the third liquid crystal molecules 163M defined by the formula (L) may be positive or negative, and is preferably positive.

The sixth substrate 165 incudes, sequentially from the back surface side toward the viewing surface side, a color filter layer 212, a black matrix layer 213, and a support substrate 211. The sixth substrate 162 is also referred to as a color filter substrate.

The support substrate 211 of the sixth substrate 165 is not limited and may be, for example, the same substrate as the support substrates in the first and second liquid crystal panels 120L and 140L.

The color filter layer 212 is defined by, for example, red color filters, green color filters, and blue color filters. The red color filters, the green color filters, and the blue color filters each are made of, for example, a transparent resin containing a pigment.

The black matrix layer 213 is disposed in a grid-like pattern to partition the color filters of a plurality of colors in the color filter layer 212. The black matrix layer 213 may be made of any material capable of blocking light and may preferably be made of a resin material containing a black pigment or a metal material capable of blocking light. The black matrix layer 213 is formed by, for example, applying a photosensitive resin containing a black pigment to form a film, followed by photolithography including exposure and development.

Preferred aspects of the display device of Embodiment 1 will now be described.

(1) Preferably, in the first liquid crystal panel, the first electrode and the second electrode are solid electrodes, the first liquid crystal layer provides a retardation of not less than 600 nm and not more than 1200 nm, and in the second liquid crystal panel, the third electrode and the fourth electrode are solid electrodes, and the second liquid crystal layer provides a retardation of not less than 300 nm and not more than 700 nm. In this aspect, light-shielding intensity and light-shielding angle range in the narrow viewing angle mode can be effectively enhanced. The retardation provided by the first liquid crystal layer is more preferably not less than 700 nm and not more than 1000 nm. The retardation provided by the second liquid crystal layer is more preferably not less than 400 nm and not more than 600 nm. The retardation provided by the liquid crystal layer is obtained by the product (Δn×d) of an anisotropy of refractive index Δn and a thickness d of the liquid crystal layer.

(2) The first liquid crystal panel or the second liquid crystal panel preferably includes a negative C plate. The negative C plate is a birefringent member satisfying nx=ny>nz (wherein nx and ny each represent a principal refractive index in the in-plane direction of the birefringent member, nz represents a principal refractive index in the out-of-plane direction, i.e., the direction perpendicular to a surface of the birefringent member. The retardation Rth in the thickness direction provided by the negative C plate is preferably not less than 350 nm, more preferably not less than 500 nm, even more preferably not less than 550 nm. The upper limit of the retardation Rth in the thickness direction provided by the negative C plate is not limited and may be, for example, not more than 1000 nm, preferably not more than 750 nm.

Figure 8:
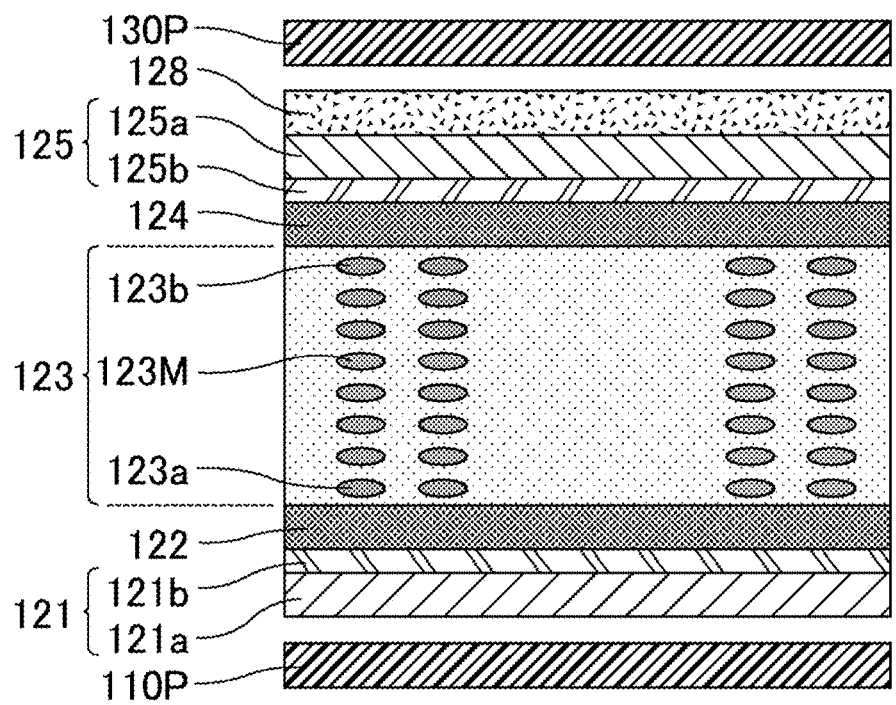
FIG. 8 is a schematic cross-sectional view of first and second liquid crystal panels of Modified Example 1 of Embodiment 1.

FIG. 8 is a schematic cross-sectional view of first and second liquid crystal panels of Modified Example 1 of Embodiment 1. As illustrated in FIG. 8, each of the first and second liquid crystal panels 120L and 140L may include a negative C plate 128. The negative C plate 128 providing a retardation Rth in the thickness direction of not less than 350 nm and not more than 750 nm is preferably used. This configuration can further enlarge the light-shielding region in the narrow viewing angle mode (enhance capability of blocking light especially at azimuths of 135° and 225°). The negative C plate 128 may be a single-layered plate or a laminate of a plurality of layers. The negative C plate 128 is preferably located between the first substrate 121 of the first liquid crystal panel 120L and the first polarizing plate 110P or between the second substrate 125 of the first liquid crystal panel 120L and the second polarizing plate 130P. An additional negative C plate is preferably provided between the third substrate of the second liquid crystal panel 140L and the second polarizing plate 130P or between the fourth substrate of the second liquid crystal panel 140L and the third polarizing plate 150P. The additional negative C plate can further enlarge the light-shielding region (enhance capability of blocking light especially at azimuths of 135° and 225°).

Examples of the negative C plate include stretched cycloolefin polymer films.

(3) In the display-providing liquid crystal panel, the color filters of a plurality of colors and the pixel electrodes may each have an elongated shape, and the lengthwise direction of each of the color filters of a plurality of colors and the pixel electrodes may lie in the top-bottom direction of the display-providing liquid crystal panel. In other words, the display-providing liquid crystal panel may adopt a vertical (lengthwise) pixel arrangement.

Figure 9:
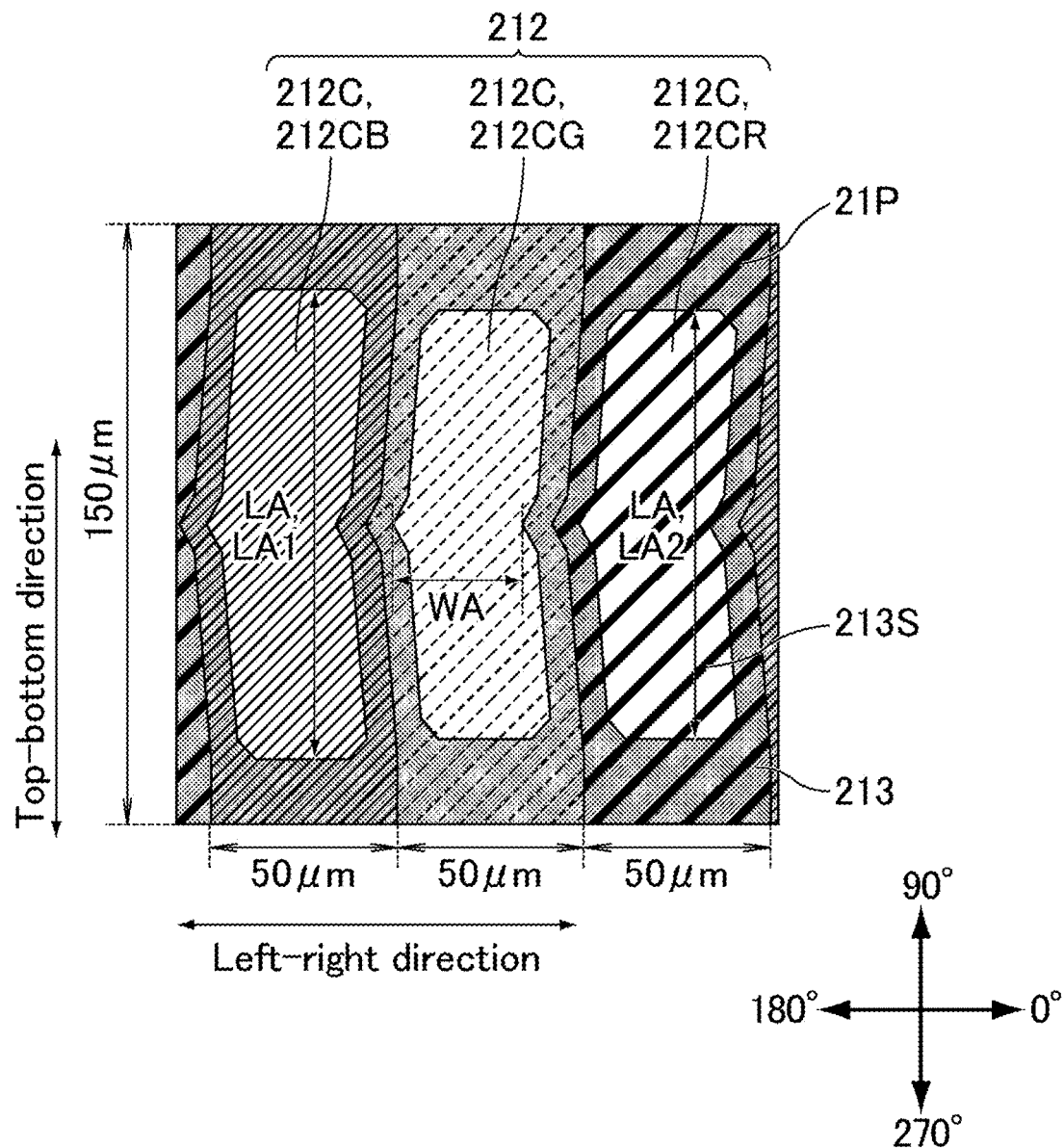
FIG. 9 is a schematic plan view of a sixth substrate in a display-providing liquid crystal panel of Modified Example 2 of Embodiment 1.
Figure 10:
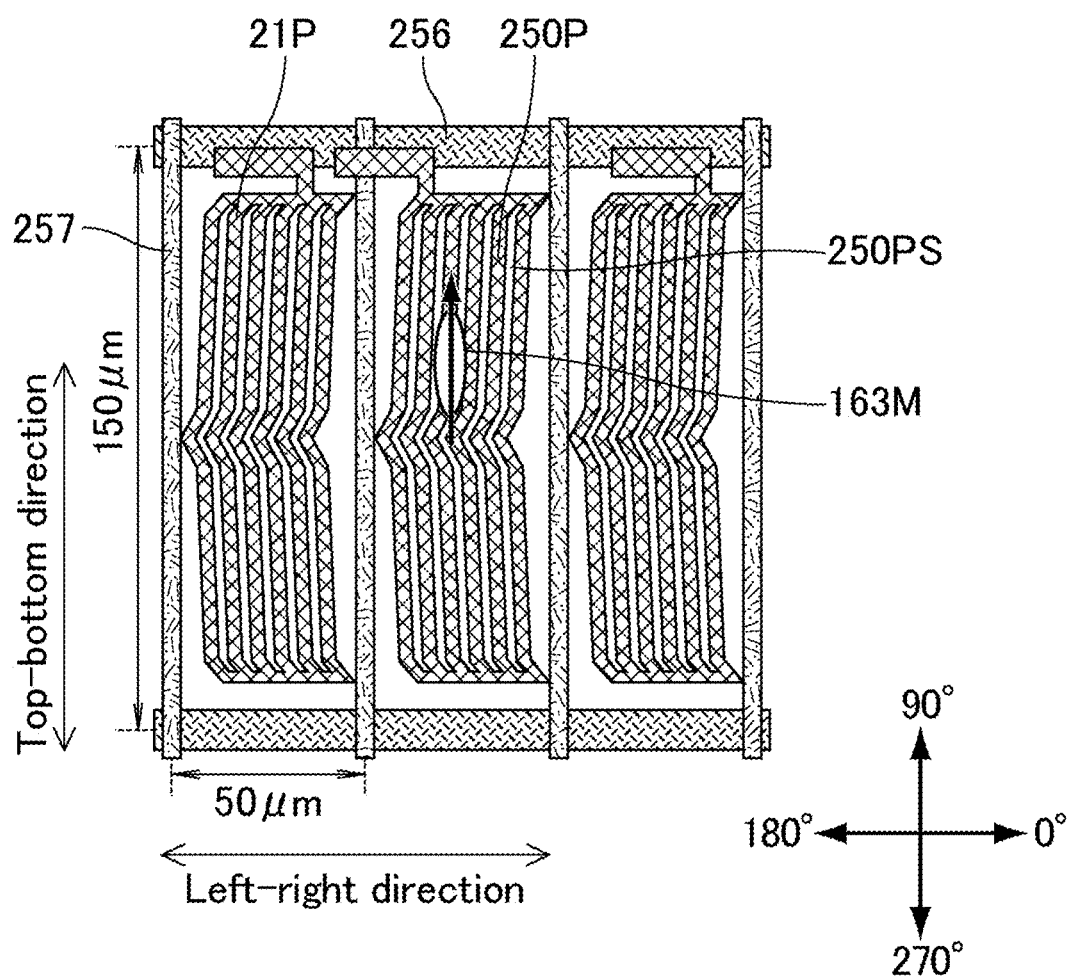
FIG. 10 is a schematic plan view of a fifth substrate in the display-providing liquid crystal panel of Modified Example 2 of Embodiment 1.

FIG. 9 is a schematic plan view of a sixth substrate in a display-providing liquid crystal panel of Modified Example 2 of Embodiment 1. FIG. 10 is a schematic plan view of a fifth substrate in the display-providing liquid crystal panel of Modified Example 2 of Embodiment 1.

As illustrated in FIGS. 7, 9, and 10, the display-providing liquid crystal panel 160L includes the fifth substrate 161, the third liquid crystal layer 163, and the sixth substrate 165, the fifth substrate 161 includes the pixel electrodes 252 (250P) and the common electrodes 254, and the sixth substrate 165 includes the color filters 212C of a plurality of colors. The color filters 212C of a plurality of colors and the pixel electrodes 250P each have an elongated shape, and a lengthwise direction of each of the color filters 212C of a plurality of colors and the pixel electrodes 250P lies in the top-bottom direction of the display-providing liquid crystal panel 160L. In this manner, the vertical pixel arrangement in which the lengthwise direction of each of the color filters 212C of a plurality of colors and the pixel electrodes 250P lies in the top-bottom direction of the display-providing liquid crystal panel 160L can prevent or reduce an increase in width of the frame region, where modules are arranged, on the left and right sides of the display-providing liquid crystal panel 160L.

Herein, the top of the display-providing liquid crystal panel 160L means an azimuthal angle of 90° of the display-providing liquid crystal panel 160L. The bottom of the display-providing liquid crystal panel 160L means an azimuthal angle of 270° of the display-providing liquid crystal panel 160L. The right of the display-providing liquid crystal panel 160L means an azimuthal angle of 0° of the display-providing liquid crystal panel 160L. The left of the display-providing liquid crystal panel 160L means an azimuthal angle of 180° of the display-providing liquid crystal panel 160L. In other words, the top-bottom direction of the display-providing liquid crystal panel 160L means the direction of 90°-270° azimuthal angle of the display-providing liquid crystal panel 160L. The left-right direction of the display-providing liquid crystal panel 160L means the direction of 0°-180° azimuthal angle, i.e., the horizontal direction, of the display-providing liquid crystal panel 160L.

The fifth substrate 161 includes the gate lines 256 and the source lines 257 arranged perpendicularly to each other and forming a grid pattern, and TFTs as switching elements at or near the respective intersections. Regions surrounded by the gate lines 256 and the source lines 257 define pixels 21P, and each pixel 21P includes a pixel electrode 252 and a common electrode 254 connected to a corresponding TFT. The fifth substrate 161 is also referred to as a TFT substrate.

Each pixel electrode 250P has an elongated shape, and the lengthwise direction of each pixel electrode 250P lies in the top-bottom direction of the display-providing liquid crystal panel 160L. In other words, each pixel electrode 250P lies in the top-bottom direction of the display-providing liquid crystal panel 160L.

Each pixel 21P has an elongated shape, and the lengthwise direction of each pixel 21P lies in the top-bottom direction of the display-providing liquid crystal panel 160L. In other words, each pixel 21P lies in the top-bottom direction of the display-providing liquid crystal panel 160L.

The length of each pixel 21P in the lengthwise direction (top-bottom direction) is not shorter than 130 μm and not longer than 170 μm, preferably not shorter than 140 μm and not longer than 160 μm, and is 150 μm, for example. The length of each pixel 21P in the widthwise direction (left-right direction) is not shorter than 30 μm and not longer than 70 µm, preferably not shorter than 40 µm and not longer than 60 µm, and is 50 µm, for example.

Each pixel electrode 250P is provided with a slit 250PS in the lengthwise direction (top-bottom direction) of the pixel electrode 250P. The third liquid crystal molecules 163M in the third liquid crystal layer 163 with no voltage applied are aligned along the slits 250PS.

The sixth substrate 165 includes the color filter layer 212 with the color filters 212C of a plurality of different colors, and the black matrix layer 213. The color filters 212C of a plurality of colors include, for example, red color filters 212CR, green color filters 212CG, and blue color filters 212CB. Each pixel 21P includes a color filter 212C of one of these colors. The sixth substrate 165 is also referred to as a color filter substrate.

The red color filters 212CR, the green color filters 212CG, and the blue color filters 212CB each have an elongated shape, and the lengthwise direction of each of the filters lies in the top-bottom direction of the display-providing liquid crystal panel 160L. In other words, the red color filters 212CR, the green color filters 212CG, and the blue color filters 212CB each lie in the top-bottom direction of the display-providing liquid crystal panel 160L.

The sixth substrate 165 includes the black matrix layer 213 provided with a plurality of apertures 213S corresponding to the respective color filters 212C of a plurality of colors. The width LA of each of the apertures 213S in the top-bottom direction of the display-providing liquid crystal panel 160L is not smaller than 80 µm and not greater than 140 µm, and the width WA of each of the apertures 213S in the left-right direction of the display-providing liquid crystal panel 160L is preferably not greater than 80 µm. This configuration can effectively prevent or reduce light diffraction caused by the black matrix layer 213. As a result, the configuration can achieve better blocking of light, leading to better privacy protection.

The width LA (also referred to as "LA1") of each aperture 213S corresponding to a blue color filter 212CB in the top-bottom direction of the display-providing liquid crystal panel 160L is greater than the width LA (also referred to as "LA2") of each aperture 213S corresponding to a green color filter 212CG and the width LA (LA2) of each aperture 213S corresponding to a red color filter 212CR in the top-bottom direction of the display-providing liquid crystal panel 160L. The width LA (LA1) of each aperture 213S corresponding to a blue color filter 212CB in the top-bottom direction of the display-providing liquid crystal panel 160L is 120 µm, for example. The width LA (LA2) of each aperture 213S corresponding to a green color filter 212CG and the width LA (LA2) of each aperture 213S corresponding to a red color filter 212CR in the top-bottom direction of the display-providing liquid crystal panel 160L are 100 µm, for example.

The width WA of each aperture 213S corresponding to a blue color filter 212CB, the width WA of each aperture 213S corresponding to a green color filter 212CG, and the width WA of each aperture 213S corresponding to a red color filter 212CR in the left-right direction of the display-providing liquid crystal display panel 160L are 40 µm, for example.

(4) In the display-providing liquid crystal panel, the color filters of a plurality of colors and the pixel electrodes may each have an elongated shape, and the lengthwise direction of each of the color filters of a plurality of colors and the pixel electrodes may lie in the left-right direction of the display-providing liquid crystal panel.

In other words, the display-providing liquid crystal panel may adopt a horizontal (widthwise) pixel arrangement.

Figure 11:
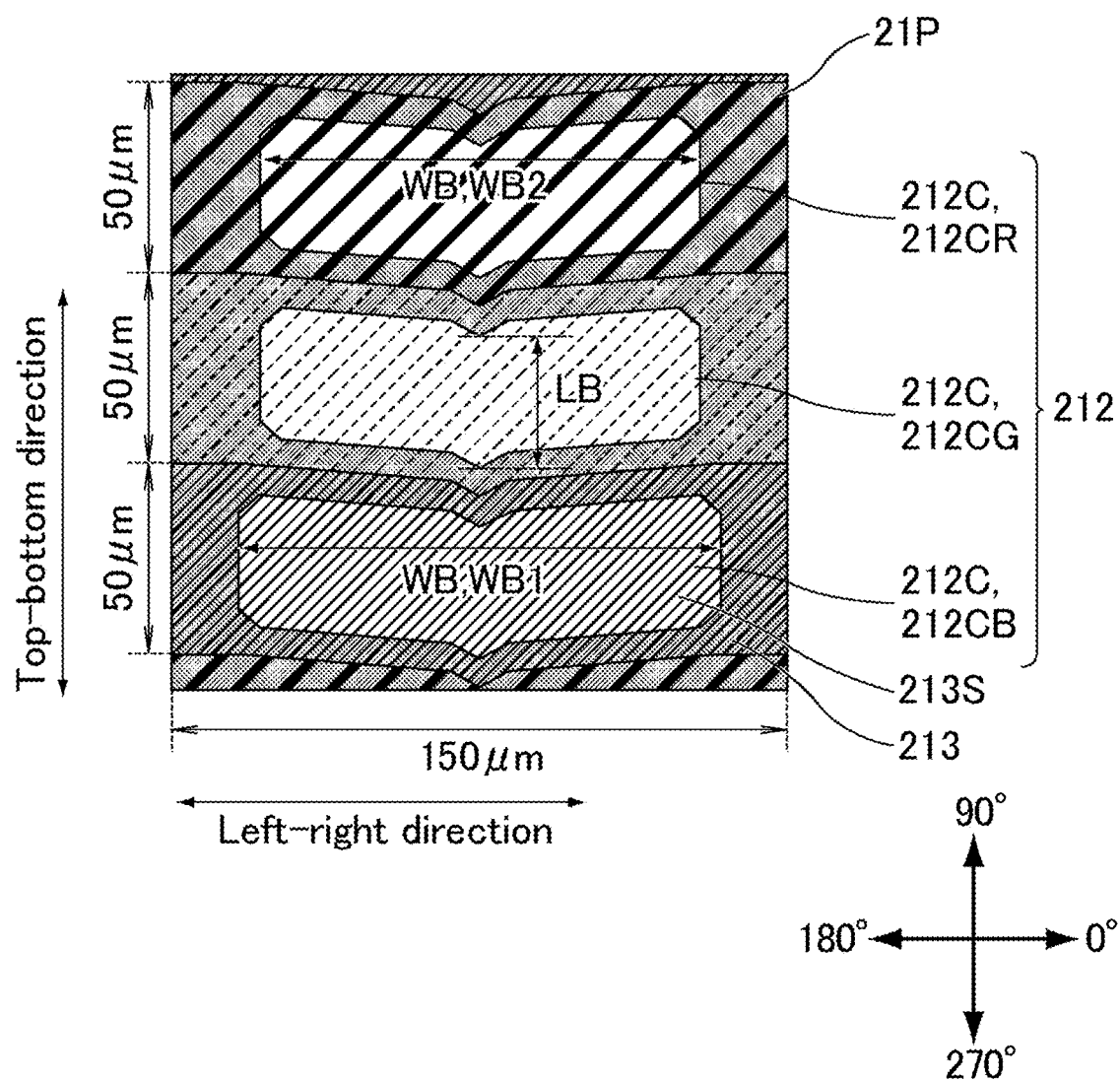
FIG. 11 is a schematic plan view of a sixth substrate in a display-providing liquid crystal panel of Modified Example 3 of Embodiment 1.
Figure 12:
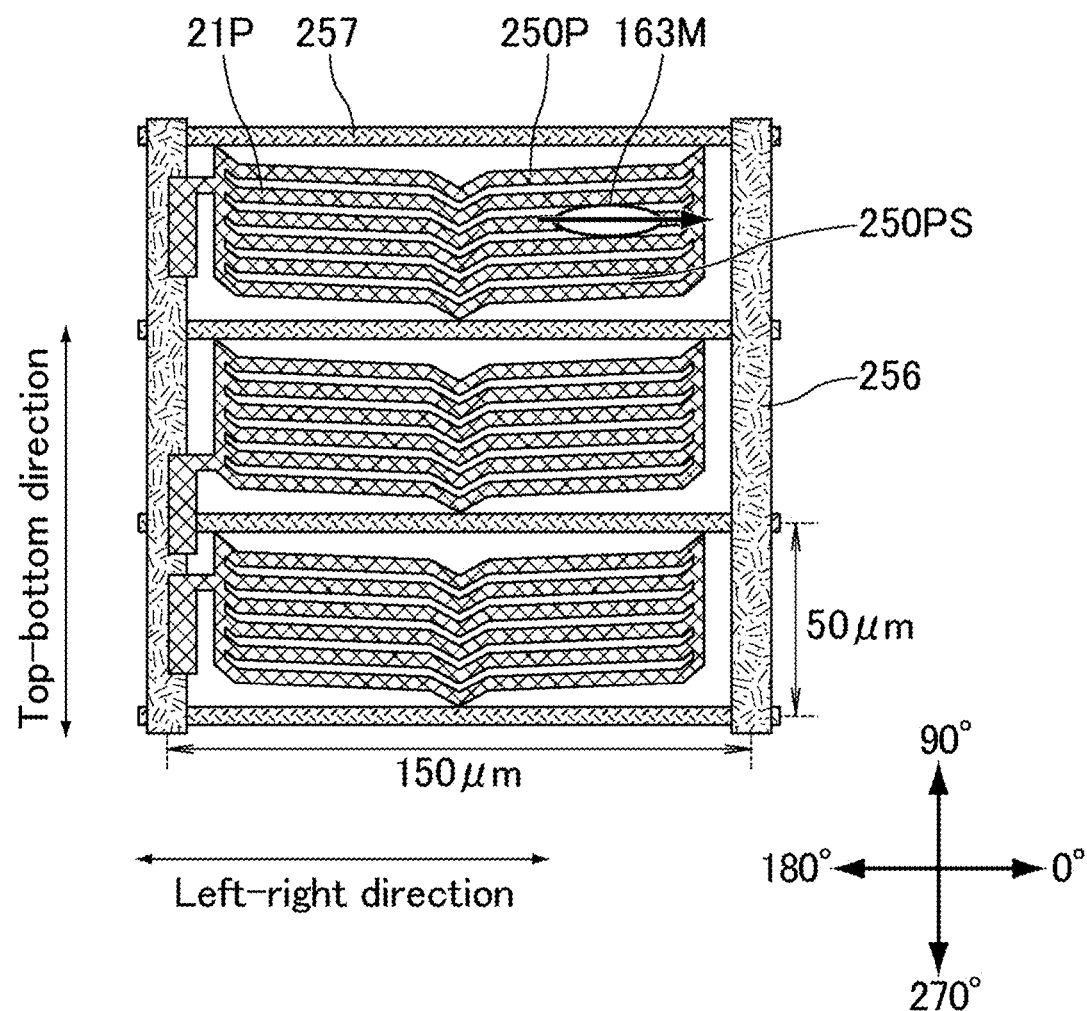
FIG. 12 is a schematic plan view of a fifth substrate in the display-providing liquid crystal panel of Modified Example 3 of Embodiment 1.

FIG. 11 is a schematic plan view of a sixth substrate of a display-providing liquid crystal panel of Modified Example 3 of Embodiment 1. FIG. 12 is a schematic plan view of a fifth substrate of the display-providing liquid crystal panel of Modified Example 3 of Embodiment 1.

As illustrated in FIGS. 7, 11, and 12, the display-providing liquid crystal panel 160L includes the fifth substrate 161, the third liquid crystal layer 163, and the sixth substrate 165, the fifth substrate 161 includes the pixel electrodes 252 (250P) and the common electrodes 254, and the sixth substrate 165 includes the color filters 212C of a plurality of colors. The color filters 212C of a plurality of colors and the pixel electrodes 250P each have an elongated shape, and the lengthwise direction of each of the color filters 212C of a plurality of colors and the pixel electrodes 250P lies in the left-right direction of the display-providing liquid crystal panel 160L.

In the vertical pixel arrangement shown in Modified Example 2, polarized light passing through the third polarizing plate 150P is likely to be diffracted due to the pitch of the conductive lines in the left-right direction in the fifth substrate 161, i.e., the pitch (e.g., about 50 µm) between the source lines 257 in FIG. 10, and the width (e.g., about 40 µm) in the left-right direction (widthwise direction) of the apertures 213S of the black matrix layer 213 in FIG. 9. The vertical pixel arrangement is therefore likely to involve a decline in capability of blocking light.

In contrast, when the horizontal pixel arrangement is adopted where the lengthwise direction of each of the color filters 212C of a plurality of colors and the pixel electrodes 250P lies in the left-right direction of the display-providing liquid crystal panel 160L as in the present modified example, the pitch of the conductive lines in the fifth substrate 161 in the left-right direction and the width of the apertures 213S of the black matrix layer 213 in the left-right direction can be widened, so that light diffraction can be reduced as compared with the vertical pixel arrangement. As a result, the horizontal pixel arrangement can achieve better blocking of light than the vertical pixel arrangement, leading to better privacy protection.

For example, in a 12.3-inch/170-ppi display device, the pitch of the conductive lines in the left-right direction in the fifth substrate 161, i.e., the pitch between the gate lines 256 in FIG. 12, is widened to approximately 150 µm. Also, the width of the apertures 213S in the left-right direction (lengthwise direction) of the black matrix layer 213 in FIG. 11 is widened to not smaller than 100 µm and not greater than 120 µm. As a result, the horizontal pixel arrangement is less likely to cause light diffraction than the vertical pixel arrangement, and thus can achieve better blocking of light. As described above, the present modified example adopting the horizontal pixel arrangement can provide better privacy protection than Modified Example 2 adopting the vertical pixel arrangement. In a display device with a resolution lower than the resolution described above (e.g., <100 ppi), the pixel shape is not necessarily a horizontally long rectangular shape and may be a square-like shape as long as its width WB in the left-right direction is not smaller than 80 µm and not greater than 140 µm.

In a 12.3-inch/170-ppi display device, for example, privacy protection (blocking of light) in the screen horizontal direction (0°-180° azimuthal angle) at a polar angle of −30° is achieved about twice better in the horizontal pixel arrangement than in the vertical pixel arrangement. In other words, the luminance in the horizontal pixel arrangement in the screen horizontal direction (0°-180° azimuthal angle) at a polar angle of −30° is substantially half the luminance in the vertical pixel arrangement.

The horizontal pixel arrangement corresponds to an arrangement obtained by rotating the display-providing liquid crystal panel 160L in the vertical pixel arrangement shown in Modified Example 2 above by an azimuth of 90°. The display-providing liquid crystal panel 160L alone is rotated without any change in the third absorption axis of the third polarizing plate 150P and the fourth absorption axis of the fourth polarizing plate 170P.

In the present modified example, an increase in width of the frame region, where modules are arranged, on the upper and lower sides of the display-providing liquid crystal panel 160L can be prevented or reduced. However, the number of gate lines 256 arranged in the left-right direction of the display-providing liquid crystal panel 160L increases, which may increase the width of the frame region, where modules are arranged, on at least one of the left side or the right side of the display-providing liquid crystal panel 160L.

In both of the structures of Modified Examples 2 and 3, the display-providing liquid crystal panel 160L is in the IPS mode or the FFS mode, so that the display device 1 has a sufficiently wide viewing angle range in the public mode.

The fifth substrate 161 includes the gate lines 256 and the source lines 257 arranged perpendicularly to each other and forming a grid pattern, and TFTs as switching elements at or near the respective intersections. Regions surrounded by the gate lines 256 and the source lines 257 define pixels 21P, and each pixel 21P includes a pixel electrode 252 and a common electrode 254 connected to a corresponding TFT. The fifth substrate 161 is also referred to as a TFT substrate. In the present modified example, the gate lines 256 are arranged in the top-bottom direction and the source lines 257 are arranged in the left-right direction. The arrangement of the gate lines 256 and the source lines 257 is not limited thereto, and the gate lines 256 may be arranged in the left-right direction and the source lines 257 may be arranged in the top-bottom direction.

Each pixel electrode 250P has an elongated shape, and the lengthwise direction of each pixel electrode 250P lies in the left-right direction of the display-providing liquid crystal panel 160L. In other words, each pixel electrode 250P lies in the left-right direction of the display-providing liquid crystal panel 160L.

Each pixel 21P has an elongated shape, and the lengthwise direction of each pixel 21P lies in the left-right direction of the display-providing liquid crystal panel 160L. In other words, each pixel 21P lies in the left-right direction of the display-providing liquid crystal panel 160L.

The length of each pixel 21P in the lengthwise direction (left-right direction) is not shorter than 130 μm and not longer than 170 μm, preferably not shorter than 140 μm and not longer than 160 μm, and is 150 μm, for example. The length of each pixel 21P in the widthwise direction (top-bottom direction) is not shorter than 30 μm and not longer than 70 μm, preferably not shorter than 40 μm and not longer than 60 μm, and is 50 μm, for example.

Each pixel electrode 250P is provided with a slit 250PS in the lengthwise direction (left-right direction) of the pixel electrode 250P. The third liquid crystal molecules 163M in the third liquid crystal layer 163 with no voltage applied are aligned along the slits 250PS.

The sixth substrate 165 includes the color filter layer 212 with the color filters 212C of a plurality of different colors, and the black matrix layer 213. The color filters 212C of a plurality of colors include, for example, the red color filters 212CR, the green color filters 212CG, and the blue color filters 212CB. Each pixel 21P includes a color filter 212C of one of these colors. The sixth substrate 165 is also referred to as a color filter substrate.

The red color filters 212CR, the green color filters 212CG, and the blue color filters 212CB each have an elongated shape, and the lengthwise direction of each of the filters lies in the left-right direction of the display-providing liquid crystal panel 160L. In other words, the red color filters 212CR, the green color filters 212CG, and the blue color filters 212CB each lie in the left-right direction of the display-providing liquid crystal panel 160L.

Preferably, the sixth substrate 165 includes the black matrix layer 213 provided with the apertures 213S corresponding to the respective color filters 212C of a plurality of colors. A width WB of each of the apertures 213S in the left-right direction of the display-providing liquid crystal panel 160L is not smaller than 80 μm and not greater than 140 μm, and a width LB of each of the apertures 213S in the top-bottom direction of the display-providing liquid crystal panel 160L is not greater than 80 μm. This configuration can effectively prevent or reduce light diffraction due to the black matrix layer 213. As a result, the configuration can achieve better blocking of light, leading to better privacy protection.

The width WB (also referred to as "WB1") of each aperture 213S corresponding to a blue color filter 212CB in the left-right direction of the display-providing liquid crystal panel 160L is greater than the width WB (also referred to as "WB2") of each aperture 213S corresponding to a green color filter 212CG and the width WB (WB2) of each aperture 213S corresponding to a red color filter 212CR in the left-right direction of the display-providing liquid crystal panel 160L. The width WB (WB1) of each aperture 213S corresponding to a blue color filter 212CB in the left-right direction of the display-providing liquid crystal panel 160L is 120 for example. The width WB (WB2) of each aperture 213S corresponding to a green color filter 212CG and the width WB (WB2) of each aperture 213S corresponding to a red color filter 212CR in the left-right direction of the display-providing liquid crystal panel 160L is 100 for example.

The width LB of each aperture 213S corresponding to a blue color filter 212CB, the width LB of each aperture 213S corresponding to a green color filter 212CG, and the width LB of each aperture 213S corresponding to a red color filter 212CR in the top-bottom direction of the display-providing liquid crystal panel 160L are 40 μm, for example.

EXAMPLES

Hereinafter, the effects of the present invention are described with reference to examples and comparative examples. The present invention is not limited to these examples.

Example 1

A display device of Example 1 corresponds to a specific example of the display device of Embodiment 1, and has the configuration illustrated in FIGS. 1 through 3.

Figure 13:
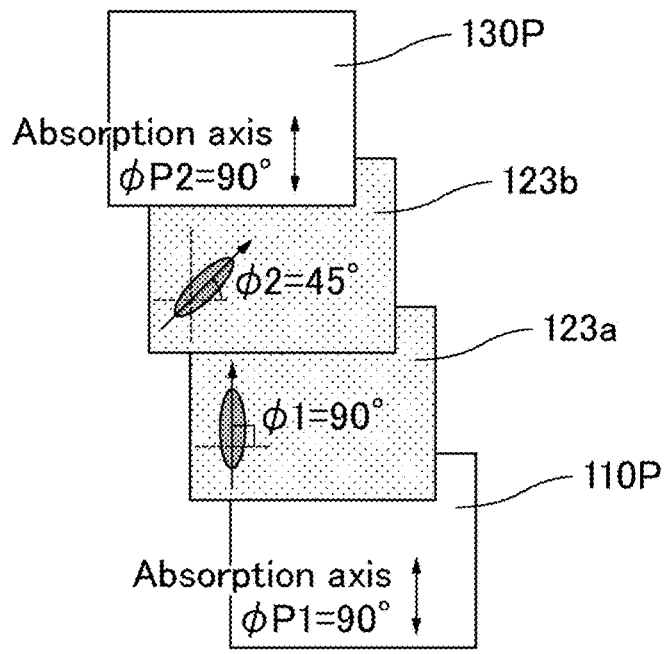
FIG. 13 is a view illustrating configurations of a first liquid crystal panel and first and second polarizing plates in Example 1.

FIG. 13 is a view illustrating configurations of a first liquid crystal panel and first and second polarizing plates in Example 1. In a first liquid crystal layer, with no voltage applied, an azimuthal angle (liquid crystal director angle) φ1 of a director of first liquid crystal molecules near a first substrate is 90°, an azimuthal angle φ2 of a director of first liquid crystal molecules near a second substrate is 45°, and a retardation (anisotropy of refractive index Δn×thickness d) with voltage applied (applied voltage: 3 V) is 630 nm. In this manner, in the first liquid crystal layer, |φ1−φ2| is 45°, and conditions of Formula (1) (not smaller than 40° and not greater than) 50° are satisfied. Azimuthal angles φ1 and φ2 of the directors of the first liquid crystal molecules may be adjusted by any method. A negative C plate (not shown) is inserted between the second polarizing plate and the first liquid crystal layer. A retardation Rth in the thickness direction provided by the negative C plate was 500 nm, and a retardation in the in-plane direction was 30 nm.

Figure 14:
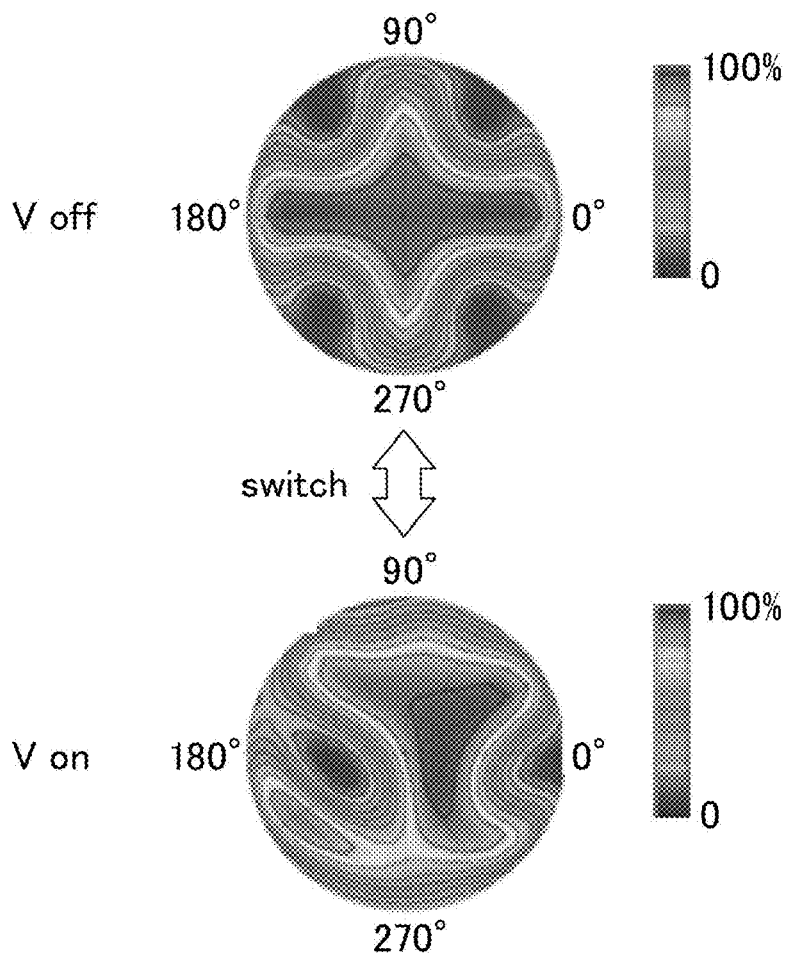
FIG. 14 is a contour view showing viewing angle characteristics of the configuration illustrated in FIG. 13 relative to azimuthal angles when the first liquid crystal layer in Example 1 is in a no-voltage application state (Voff) and a voltage application state (Von).

FIG. 14 is a contour view showing viewing angle characteristics of the configuration illustrated in FIG. 13 relative to azimuthal angles when the first liquid crystal layer in Example 1 is in a no-voltage application state (Voff) and a voltage application state (Von). In FIG. 14, the right in the horizontal direction corresponds to an azimuthal angle of 0°, the upward direction corresponds to an azimuthal angle of 90°, the left in the horizontal direction corresponds to an azimuthal angle of 180°, the downward direction corresponds to an azimuthal angle of 270°, and a difference in transmittance (i.e., luminance of transmitted backlight illumination) is indicated by contour lines.

Figure 15:
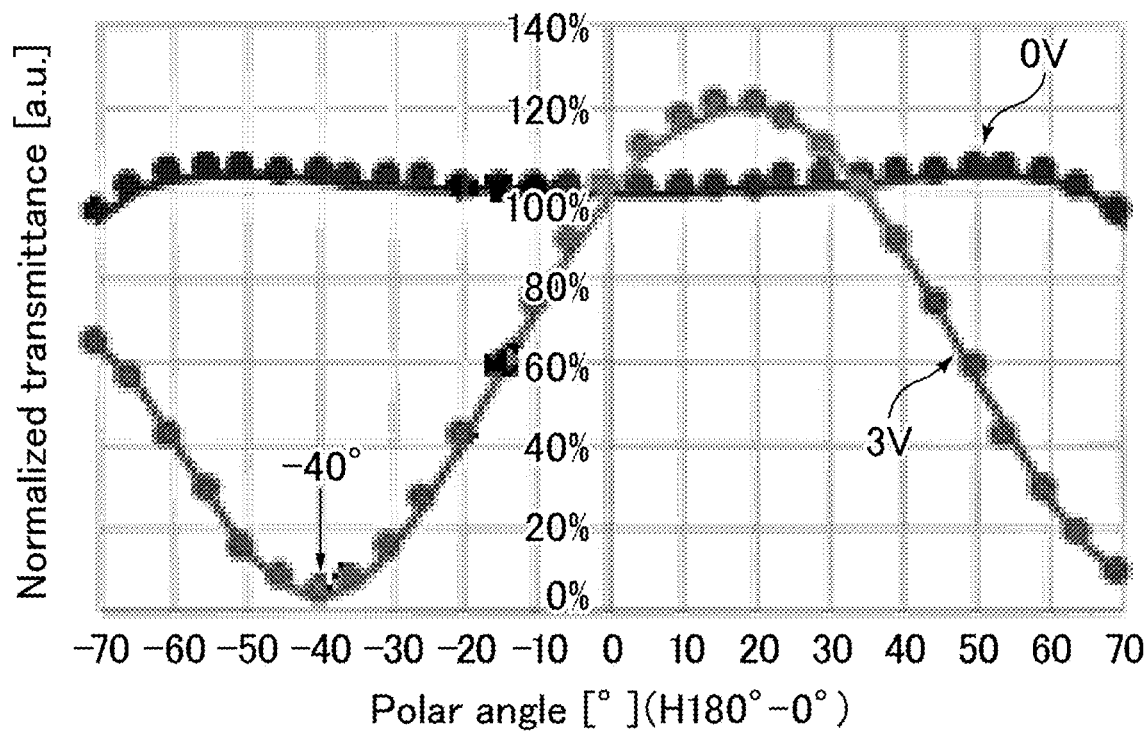
FIG. 15 is a graph showing viewing angle characteristics of the configuration illustrated in FIG. 13 relative to polar angles when the first liquid crystal layer in Example 1 is in a no-voltage application state (Voff) and a voltage application state (Von).

FIG. 15 is a graph showing viewing angle characteristics of the configuration illustrated in FIG. 13 relative to polar angles when the first liquid crystal layer in Example 1 is in a no-voltage application state (Voff) and a voltage application state (Von). In the voltage application state (Von), polar angles at which the transmittance is minimum (light-shielding angle in narrow viewing angle mode) are −40° and +70°.

As shown in FIGS. 14 and 15, in Example 1, the first liquid crystal panel functions as a liquid crystal panel in an ECB mode having an asymmetric viewing angle for blocking light in a low polar angle side (direction near a polar angle of)−40°.

Figure 16:
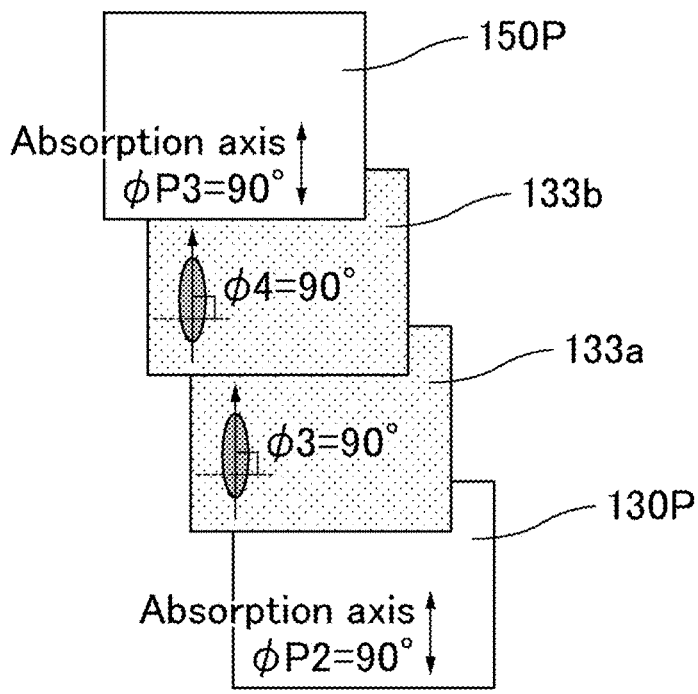
FIG. 16 is a view showing configurations of a second liquid crystal panel and second and third polarizing plates in Example 1.

FIG. 16 is a view showing configurations of a second liquid crystal panel and second and third polarizing plates in Example 1. In the second liquid crystal layer, with no voltage applied, an azimuthal angle φ3 of second liquid crystal molecules near a third substrate is 90°, an azimuthal angle φ4 of a director of second liquid crystal molecules near a fourth substrate is 90°, a retardation (anisotropy of refractive index Δn×thickness d) with voltage applied (applied voltage: 4.5 V) is 500 nm. In this manner, in the second liquid crystal layer, |φ3−φ4| is 0°, and conditions of Formula (4) (not smaller than 0° and not greater than 20°) are satisfied.

Figure 17:
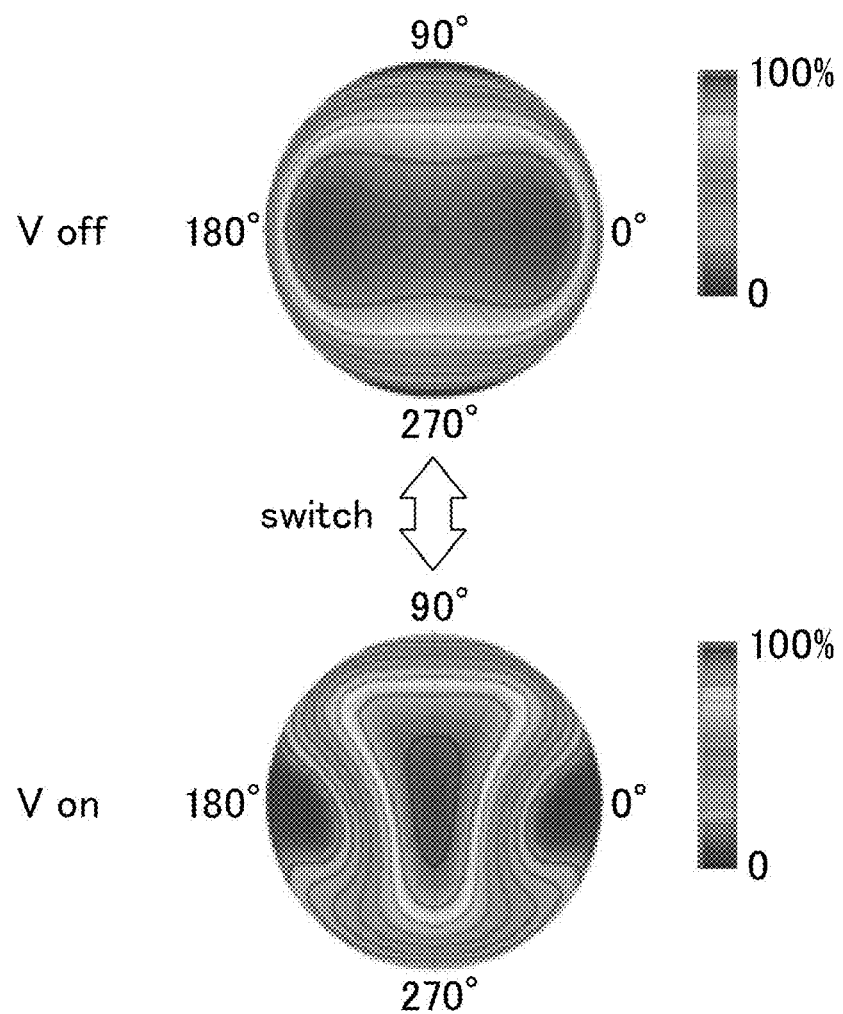
FIG. 17 is a contour view showing viewing angle characteristics of the configuration illustrated in FIG. 16 relative to azimuthal angles when the second liquid crystal layer in Example 1 is in a no-voltage application state (Voff) and a voltage application state (Von).

FIG. 17 is a contour view showing viewing angle characteristics of the configuration illustrated in FIG. 16 relative to azimuthal angles when the second liquid crystal layer in Example 1 is in a no-voltage application state (Voff) and a voltage application state (Von). In FIG. 16, the right in the horizontal direction corresponds to an azimuthal angle of 0°, the upward direction corresponds to an azimuthal angle of 90°, the left in the horizontal direction corresponds to an azimuthal angle of 180°, the downward direction corresponds to an azimuthal angle of 270°, and a difference in transmittance (i.e., luminance of transmitted backlight illumination) is indicated by contour lines.

Figure 18:
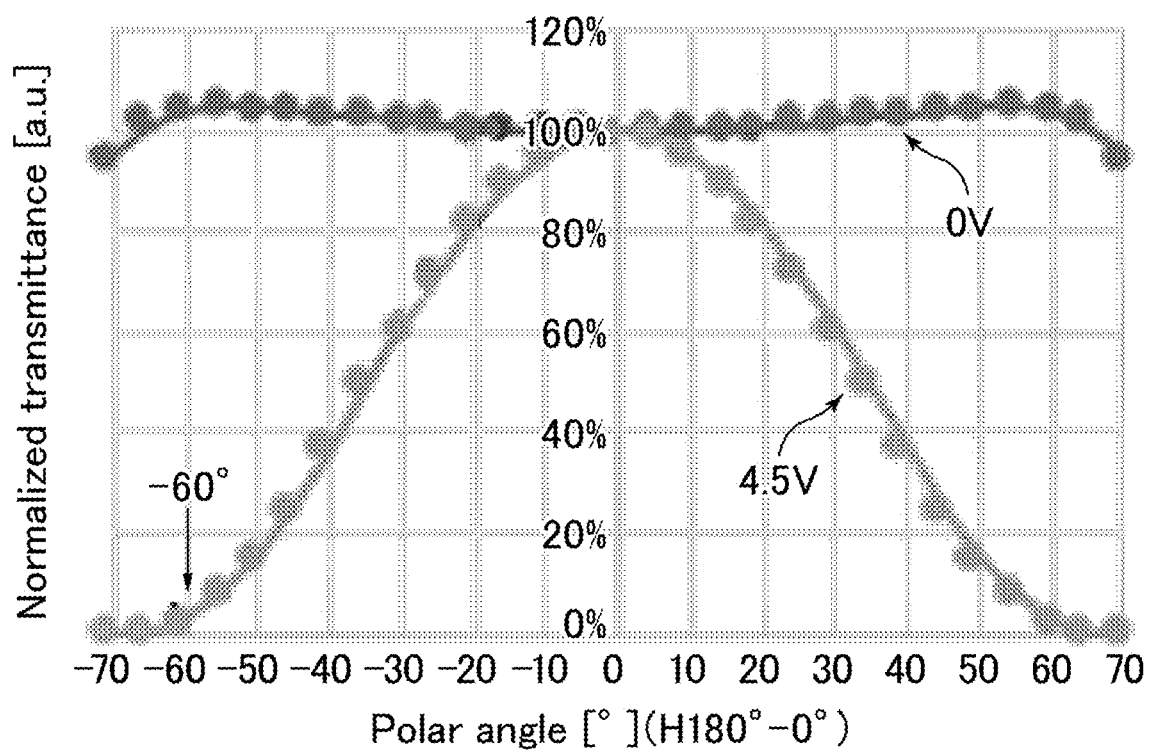
FIG. 18 is a graph showing viewing angle characteristics of the configuration illustrated in FIG. 16 relative to polar angles when the second liquid crystal layer in Example 1 is in a no-voltage application state (Voff) and a voltage application state (Von).

FIG. 18 is a graph showing viewing angle characteristics of the configuration illustrated in FIG. 16 relative to polar angles when the second liquid crystal layer in Example 1 is in a no-voltage application state (Voff) and a voltage application state (Von). In the voltage application state (Von), polar angles at which the transmittance is minimum (light-shielding angle in the narrow viewing angle mode) are −60° and +60°.

As shown in FIGS. 17 and 18, in Example 1, the second liquid crystal panel functions as a liquid crystal panel in an ECB mode having a symmetric viewing angle for blocking light in a high polar angle side (direction near a polar angle of)−60°.

Figure 19:
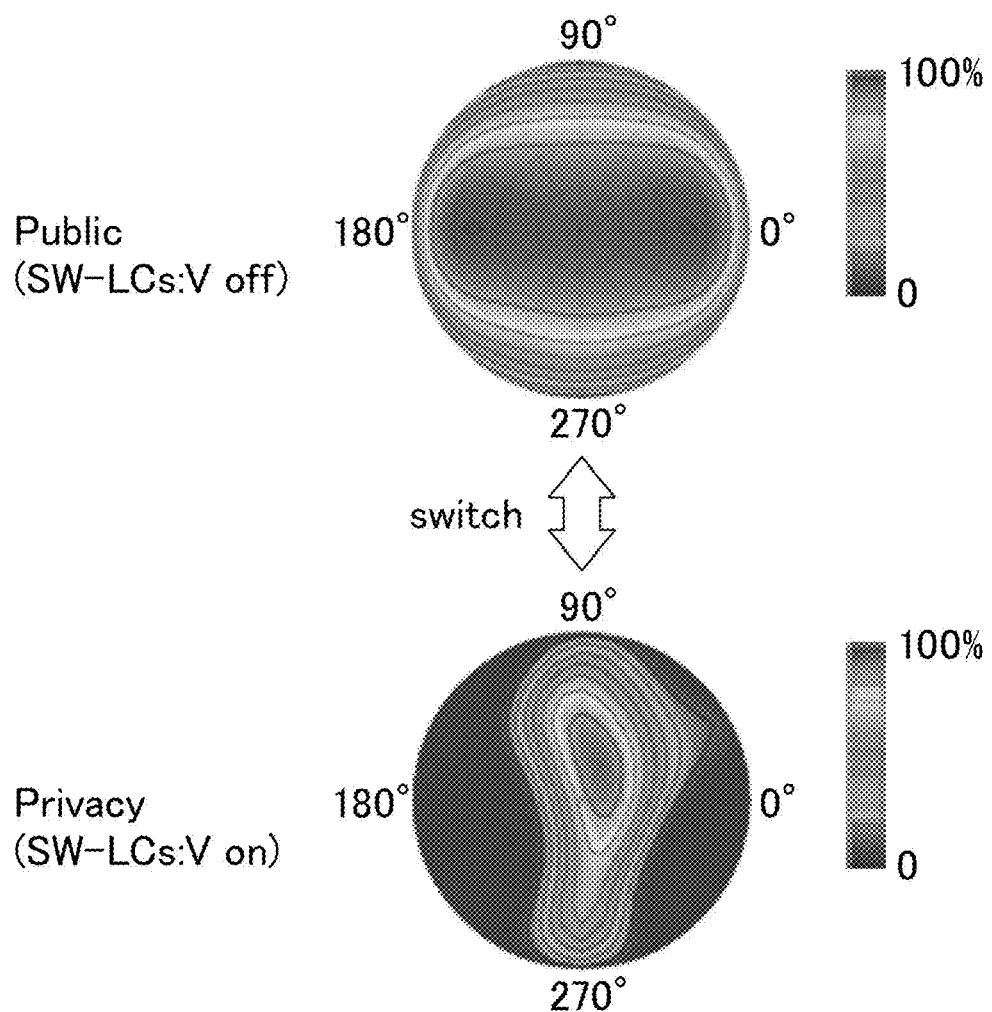
FIG. 19 is a contour view showing viewing angle characteristics of a combination of the configuration illustrated in FIG. 13 and the configuration illustrated in FIG. 16 relative to azimuthal angles when the first and second liquid crystal layers in Example 1 are in a no-voltage application state (Voff) and a voltage application state (Von).

FIG. 19 is a contour view showing viewing angle characteristics of a combination of the configuration illustrated in FIG. 13 and the configuration illustrated in FIG. 16 relative to azimuthal angles when the first and second liquid crystal layers in Example 1 are in a no-voltage application state (Voff) and a voltage application state (Von). In FIG. 19, the right in the horizontal direction corresponds to an azimuthal angle of 0°, the upward direction corresponds to an azimuthal angle of 90°, the left in the horizontal direction corresponds to an azimuthal angle of 180°, the downward direction corresponds to an azimuthal angle of 270°, and a difference in transmittance (i.e., luminance of transmitted backlight illumination) is indicated by contour lines. That is, data shown in FIG. 19 corresponds to an integrated value of data shown in FIG. 14 and data shown in FIG. 17.

Figure 20:
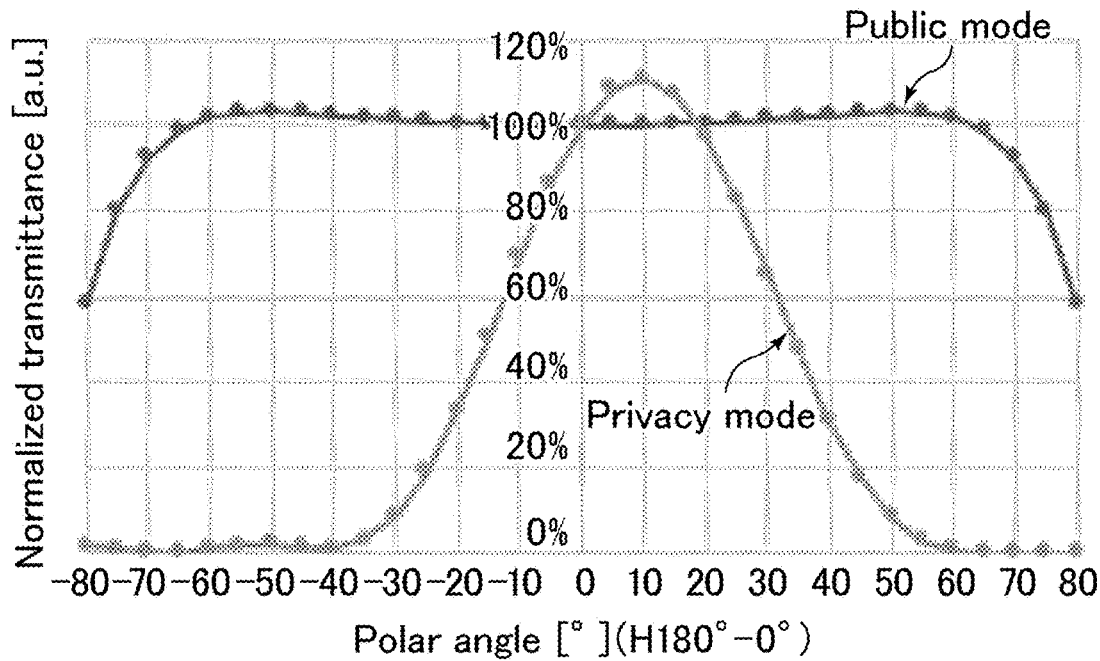
FIG. 20 is a graph showing viewing angle characteristics of the combination of the configuration illustrated in FIG. 13 and the configuration illustrated in FIG. 16 relative to polar angles when the first and second liquid crystal layers in Example 1 are in a no-voltage application state (Voff) and a voltage application state (Von).

FIG. 20 is a graph showing viewing angle characteristics of the combination of the configuration illustrated in FIG. 13 and the configuration illustrated in FIG. 16 relative to polar angles when the first and second liquid crystal layers in Example 1 are in a no-voltage application state (Voff) and a voltage application state (Von). That is, data shown in FIG. 20 corresponds to an integrated value of data shown in FIG. 15 and data shown in FIG. 18.

Figure 21:
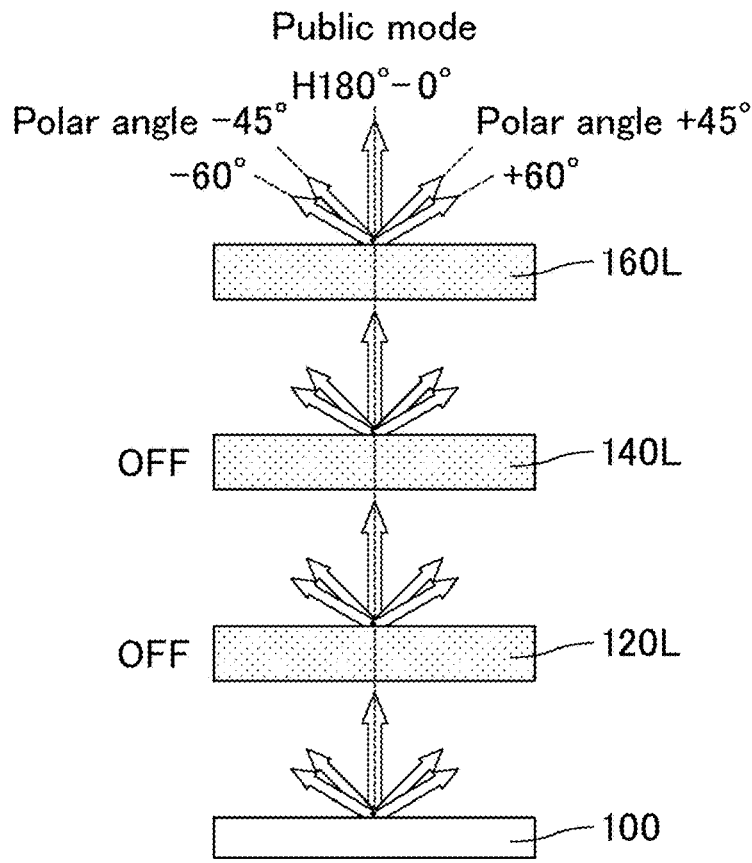
FIG. 21 is a view schematically illustrating an intensity variation of light passing through each member in a public mode at different polar angles in a horizontal direction (direction of 0°-180° azimuthal angle) of the display device of Example 1.

FIG. 21 is a view schematically illustrating an intensity variation of light passing through each member in a public mode at different polar angles in a horizontal direction (direction of 0°-180° azimuthal angle) of the display device of Example 1.

Figure 22:
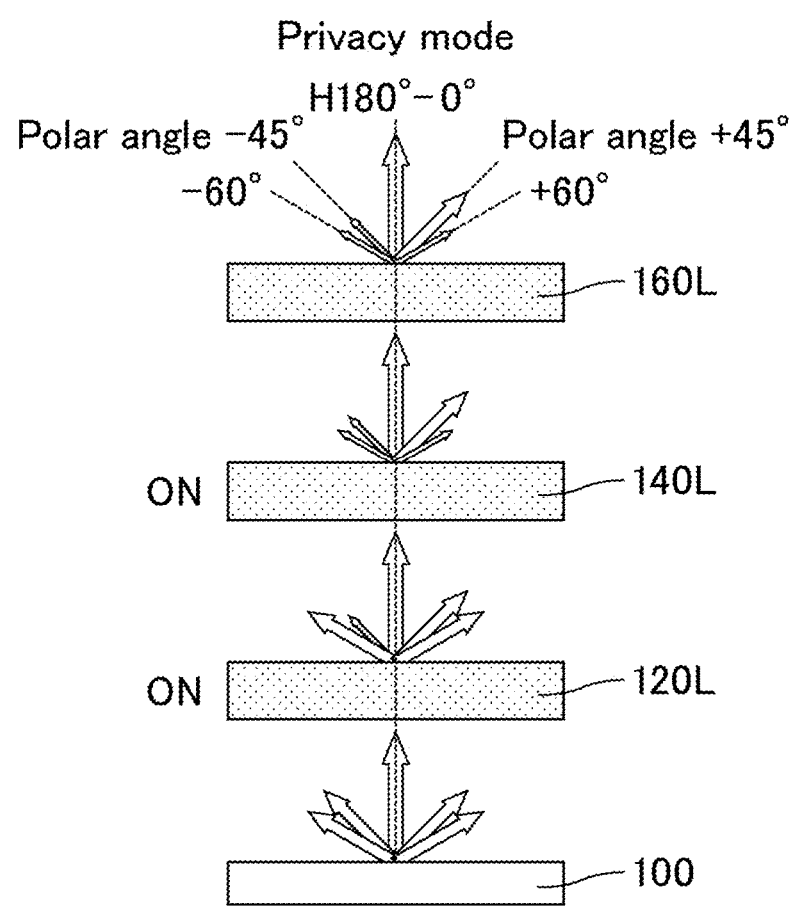
FIG. 22 is a view schematically illustrating an intensity variation of light passing through each member in a privacy mode at different polar angles in a horizontal direction (direction of 0°-180° azimuthal angle) of the display device of Example 1.

FIG. 22 is a view schematically illustrating an intensity variation of light passing through each member in a privacy mode at different polar angles in a horizontal direction (direction of 0°-180° azimuthal angle) of the display device of Example 1.

As shown in FIGS. 19 through 22, in the display device of Example 1, when the mode is switched from the public mode (wide viewing angle mode) to the privacy mode (narrow viewing angle mode), a transmittance is reduced to substantially 0% in a wide angle range of a polar angle from −60° to −40°, and enhancement of light-shielding intensity and light-shielding angle range is achieved.

Table 1 to 3 below show detailed design conditions and evaluation results of the display device of Example 1.

Example 2

A display device of Example 2 has a configuration similar to that of the display device of Example 1 except that the retardation provided by the first liquid crystal layer in the first liquid crystal panel was 800 nm.

Figure 23:
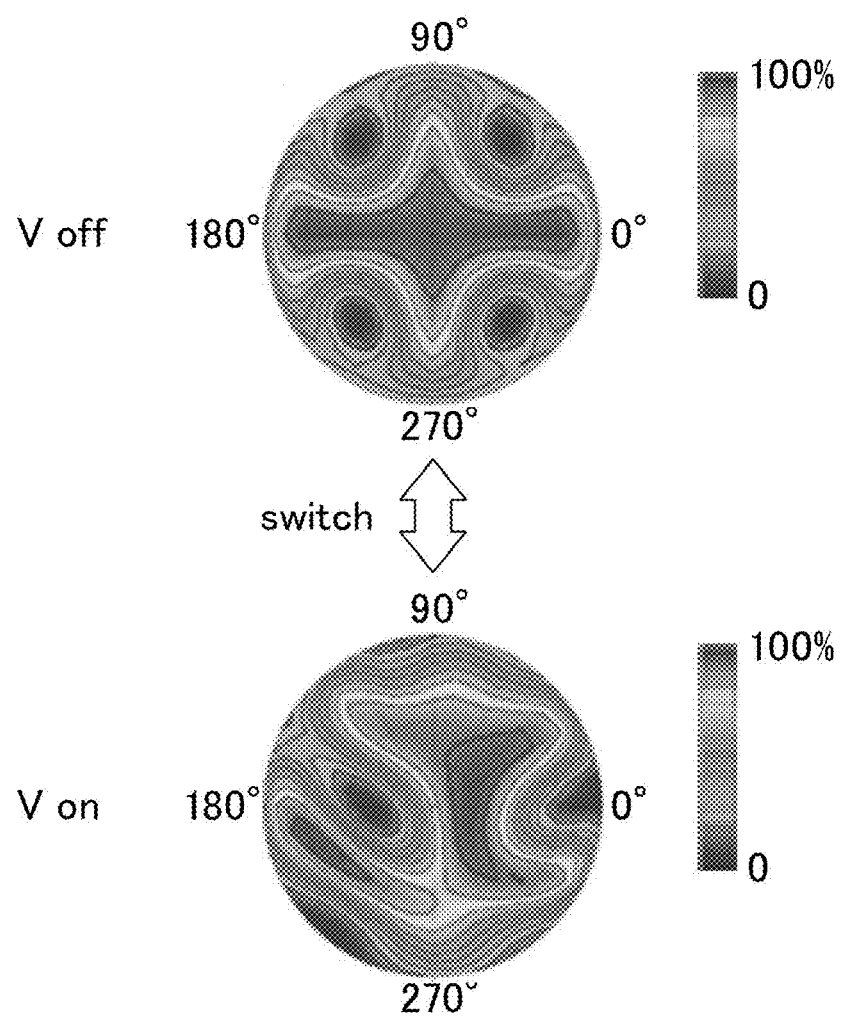
FIG. 23 is a contour view showing viewing angle characteristics of the configuration illustrated in FIG. 13 relative to azimuthal angles when a first liquid crystal layer in Example 2 is in a no-voltage application state (Voff) and a voltage application state (Von).

FIG. 23 is a contour view showing viewing angle characteristics of the configuration illustrated in FIG. 13 relative to azimuthal angles when a first liquid crystal layer in Example 2 is in a no-voltage application state (Voff) and a voltage application state (Von). In FIG. 23, the right in the horizontal direction corresponds to an azimuthal angle of 0°, the upward direction corresponds to an azimuthal angle of 90°, the left in the horizontal direction corresponds to an azimuthal angle of 180°, the downward direction corresponds to an azimuthal angle of 270°, and a difference in transmittance (i.e., luminance of transmitted backlight illumination) is indicated by contour lines.

Figure 24:
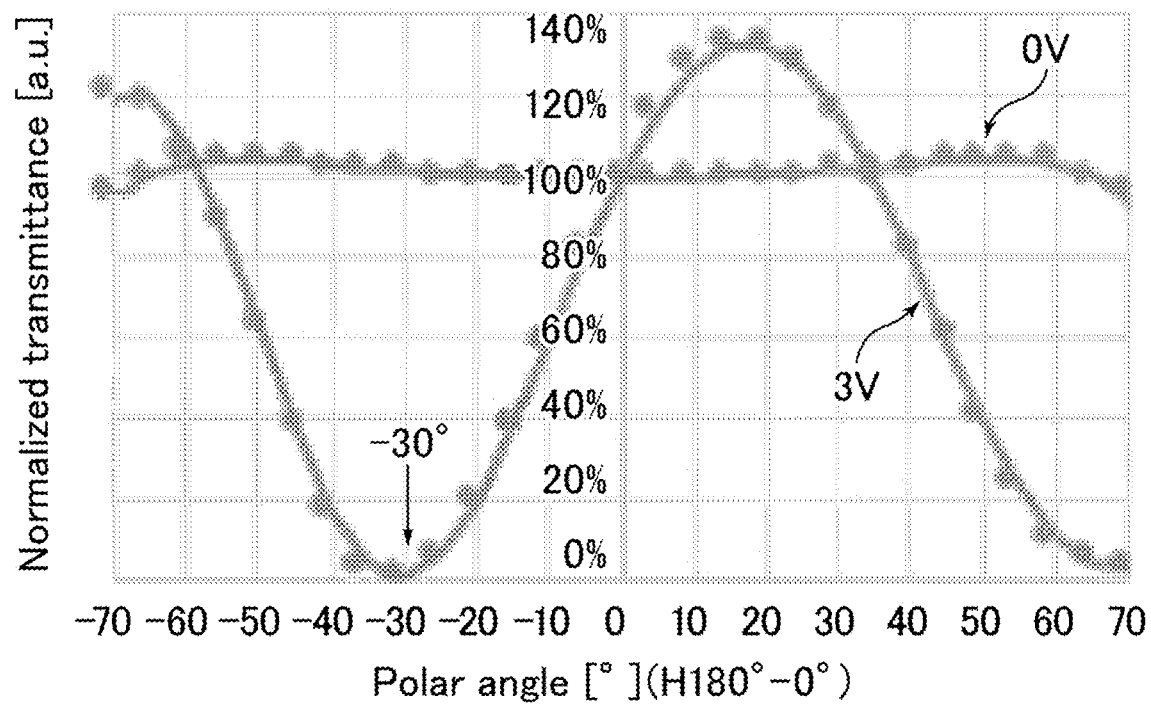
FIG. 24 is a graph showing viewing angle characteristics of the configuration illustrated in FIG. 13 relative to polar angles when a first liquid crystal layer in Example 2 is in a no-voltage application state (Voff) and a voltage application state (Von).

FIG. 24 is a graph showing viewing angle characteristics of the configuration illustrated in FIG. 13 relative to polar angles when a first liquid crystal layer in Example 2 is in a no-voltage application state (Voff) and a voltage application state (Von). In the voltage application state (Von), polar angles at which the transmittance is minimum (light-shielding angle in narrow viewing angle mode) are −30° and +70°.

As shown in FIGS. 23 and 24, in Example 2, the first liquid crystal panel functions as a liquid crystal panel in an ECB mode having an asymmetric viewing angle for blocking light in a low polar angle side (direction near a polar angle of)−30°.

Figure 25:
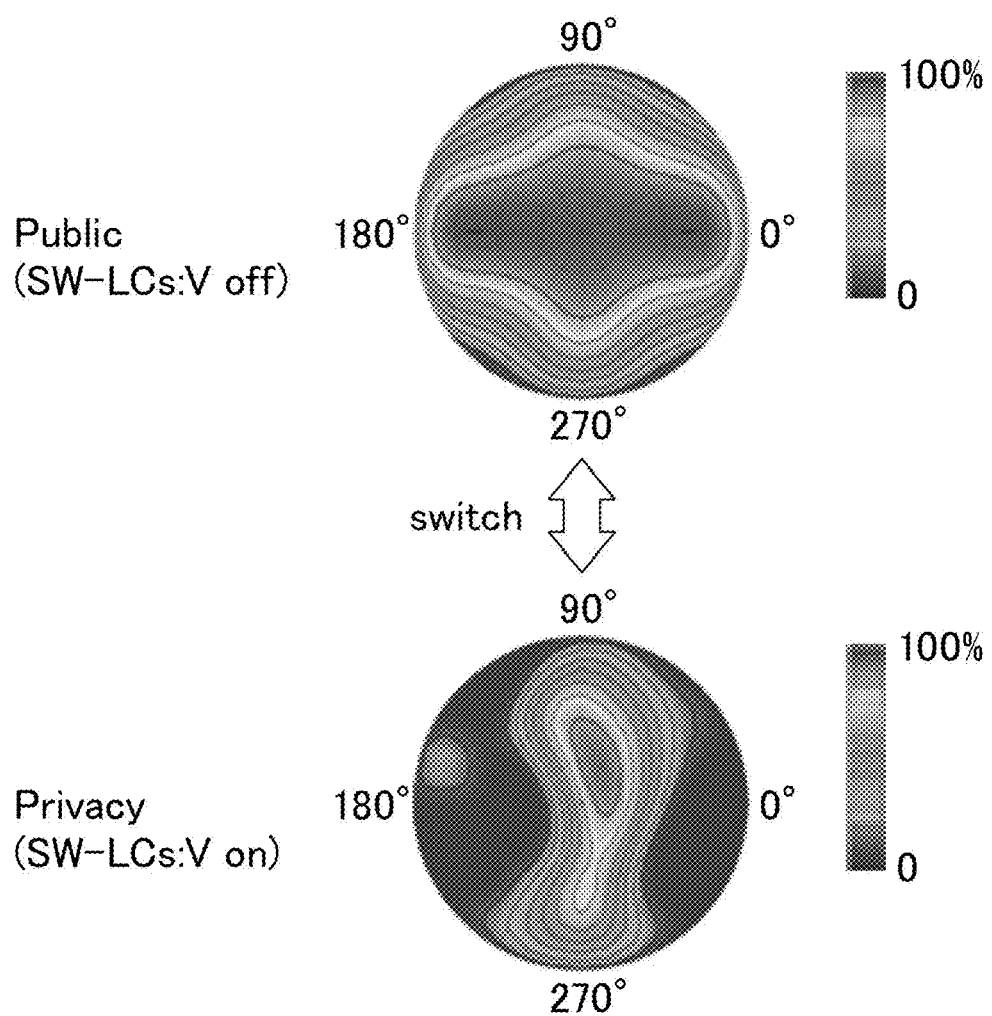
FIG. 25 is a contour view showing viewing angle characteristics of the combination of the configuration illustrated in FIG. 13 and the configuration illustrated in FIG. 16 relative to azimuthal angles when the first and second liquid crystal layers in Example 2 are in a no-voltage application state (Voff) and a voltage application state (Von).

FIG. 25 is a contour view showing viewing angle characteristics of the combination of the configuration illustrated in FIG. 13 and the configuration illustrated in FIG. 16 relative to azimuthal angles when the first and second liquid crystal layers in Example 2 are in a no-voltage application state (Voff) and a voltage application state (Von). In FIG. 25, the right in the horizontal direction corresponds to an azimuthal angle of 0°, the upward direction corresponds to an azimuthal angle of 90°, the left in the horizontal direction corresponds to an azimuthal angle of 180°, the downward direction corresponds to an azimuthal angle of 270°, and a difference in transmittance (i.e., luminance of transmitted backlight illumination) is indicated by contour lines. That is, data shown in FIG. 25 corresponds to an integrated value of data shown in FIG. 23 and data shown in FIG. 17.

Figure 26:
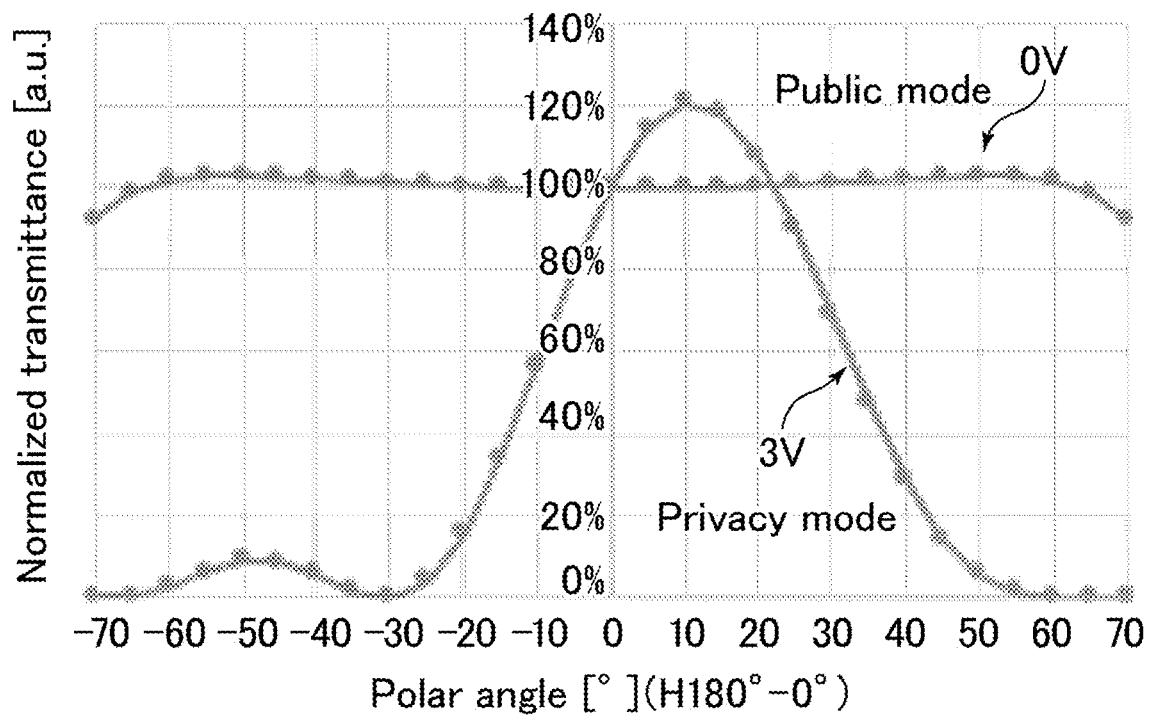
FIG. 26 is a graph showing viewing angle characteristics of the combination of the configuration illustrated in FIG. 13 and the configuration illustrated in FIG. 16 relative to polar angles when the first and second liquid crystal layers in Example 2 are in a no-voltage application state (Voff) and a voltage application state (Von).

FIG. 26 is a graph showing viewing angle characteristics of the combination of the configuration illustrated in FIG. 13 and the configuration illustrated in FIG. 16 relative to polar angles when the first and second liquid crystal layers in Example 2 are in a no-voltage application state (Voff) and a voltage application state (Von). That is, data shown in FIG. 26 corresponds to an integrated value of data shown in FIG. 24 and data shown in FIG. 18.

Figure 27:
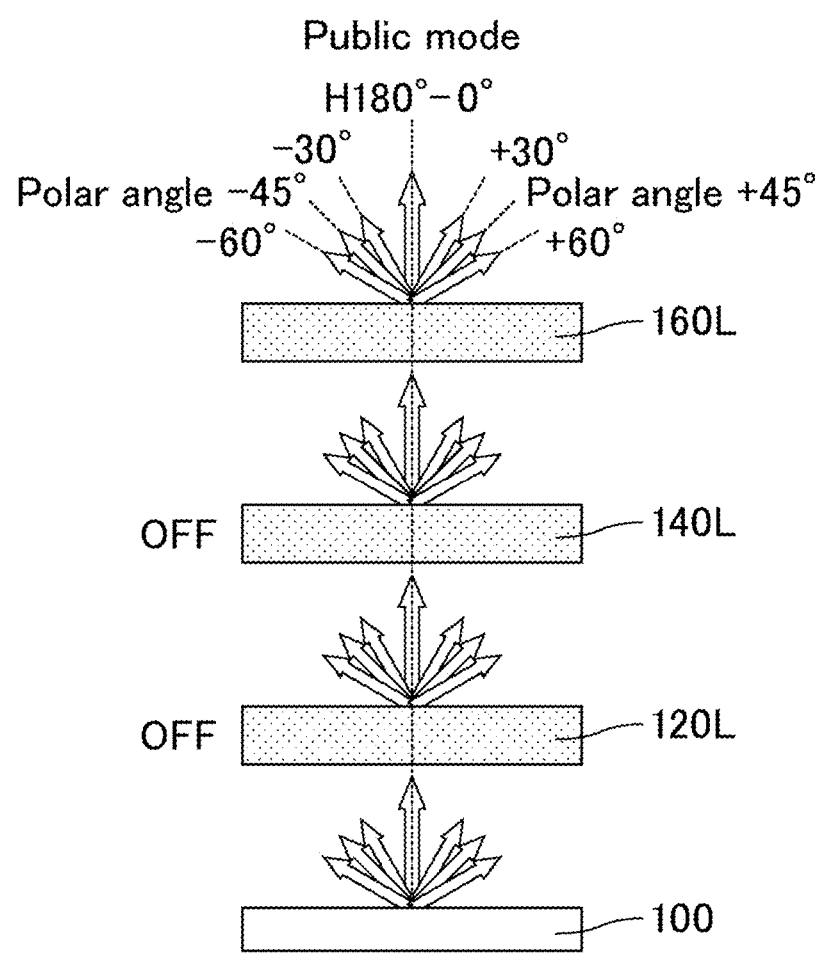
FIG. 27 is a view schematically illustrating an intensity variation of light passing through each member in a public mode at different polar angles in a horizontal direction (direction of 0°-180° azimuthal angle) of the display device of Example 2.

FIG. 27 is a view schematically illustrating an intensity variation of light passing through each member in a public mode at each polar angle in a horizontal direction (direction of 0°-180° azimuthal angle) of the display device of Example 2.

Figure 28:
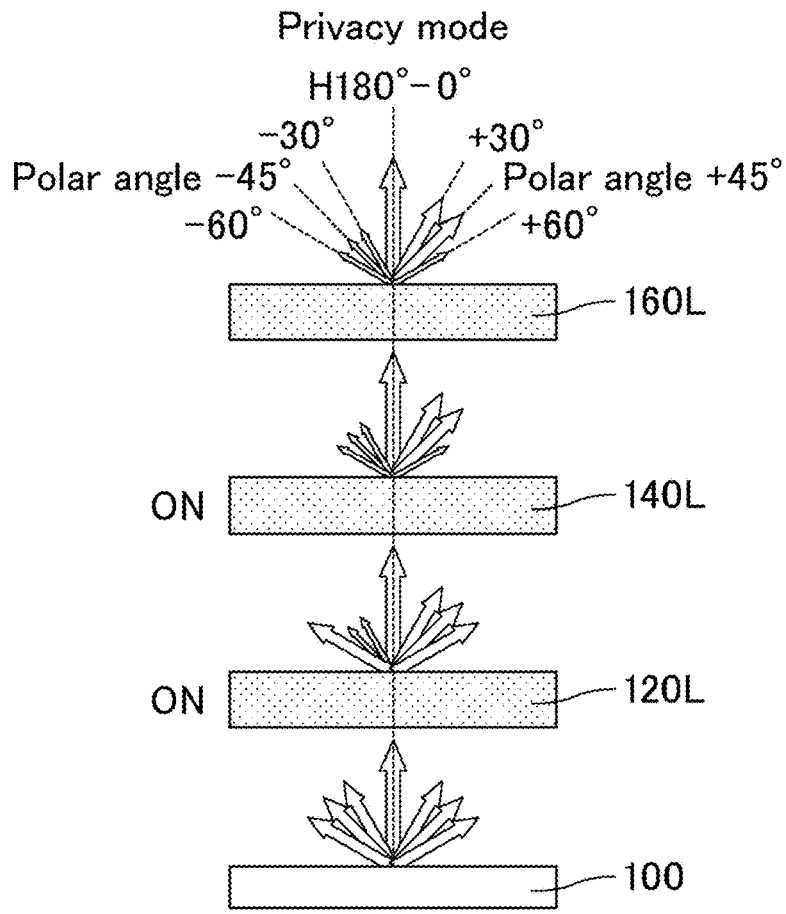
FIG. 28 is a view schematically illustrating an intensity variation of light passing through each member in a privacy mode at different polar angles in a horizontal direction (direction of 0°-180° azimuthal angle) of the display device of Example 2.

FIG. 28 is a view schematically illustrating an intensity variation of light passing through each member in a privacy mode at different polar angles in a horizontal direction (direction of 0°-180° azimuthal angle) of the display device of Example 2.

As shown in FIGS. 25 through 28, in the display device of Example 2, when the mode is switched from the public mode (wide viewing angle mode) to the privacy mode (narrow viewing angle mode), a transmittance is reduced to substantially 0% in a wide angle range of a polar angle from −60° to −30°, and enhancement of light-shielding intensity and light-shielding angle range is achieved.

In the display device of Example 2, an azimuthal angle at which transmittance is minimum in light blocking by the first liquid crystal panel is −30°, and achieves a privacy mode (narrow viewing angle mode) with a lower polar angle, as compared to the display device of Example 1. Thus, when the display device is used as a display for a passenger's seat in an automobile, for example, a light-shielding angle range in which a display image on the display for a passenger's seat cannot be visually recognized can be enlarged so that safety during driving can be thereby enhanced.

Tables 1 to 3 show details of design conditions and evaluation results of the display device of Example 2.

Example 3

A display device of Example 3 has a similar configuration to the display device of Example 2 except that azimuthal angles φ1 and φ2 of the directors of first liquid crystal molecules are adjusted by adding a chiral agent to the first liquid crystal layer of the first liquid crystal panel.

Figure 29:
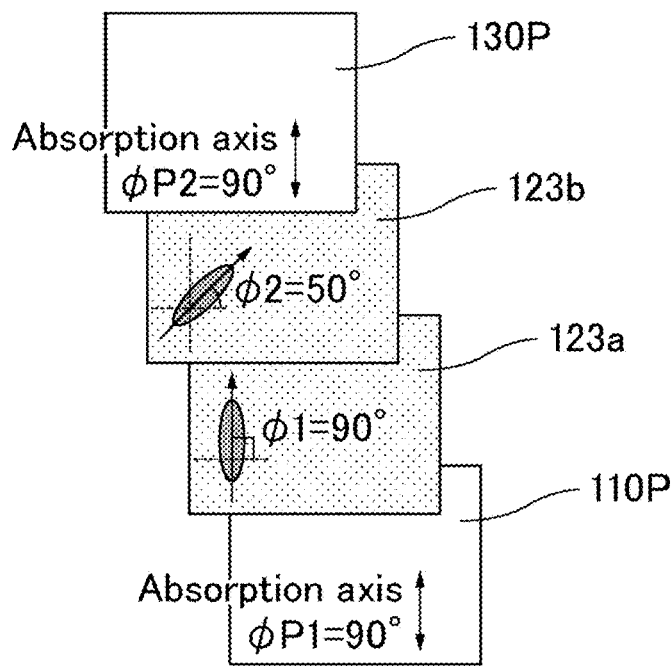
FIG. 29 is a view illustrating configurations of a first liquid crystal panel and first and second polarizing plates in Example 3.

FIG. 29 is a view illustrating configurations of a first liquid crystal panel and first and second polarizing plates in Example 3. In a first liquid crystal layer, with no voltage applied, an azimuthal angle (liquid crystal director angle) φ1 of a director of first liquid crystal molecules near a first substrate is 90°, an azimuthal angle φ2 of a director of first liquid crystal molecules near a second substrate is 50°, and a retardation (anisotropy of refractive index Δn×thickness d) with voltage applied (applied voltage: 3 V) is 800 nm. In this manner, in the first liquid crystal layer, |φ1−φ2| is 40°, and conditions of Formula (1) (not smaller than 40° and not greater than) 50° are satisfied. A method for adjusting azimuthal angles φ1 and φ2 of the director of the first liquid crystal molecules includes a method in which a counter-clockwise chiral agent (helical pitch=60 μm) is blended in a first liquid crystal layer (cell thickness=6.7 μm, Δn=0.119), and first liquid crystal molecules are twisted by 40° between the first substrate side and the second substrate side.

Figure 30:
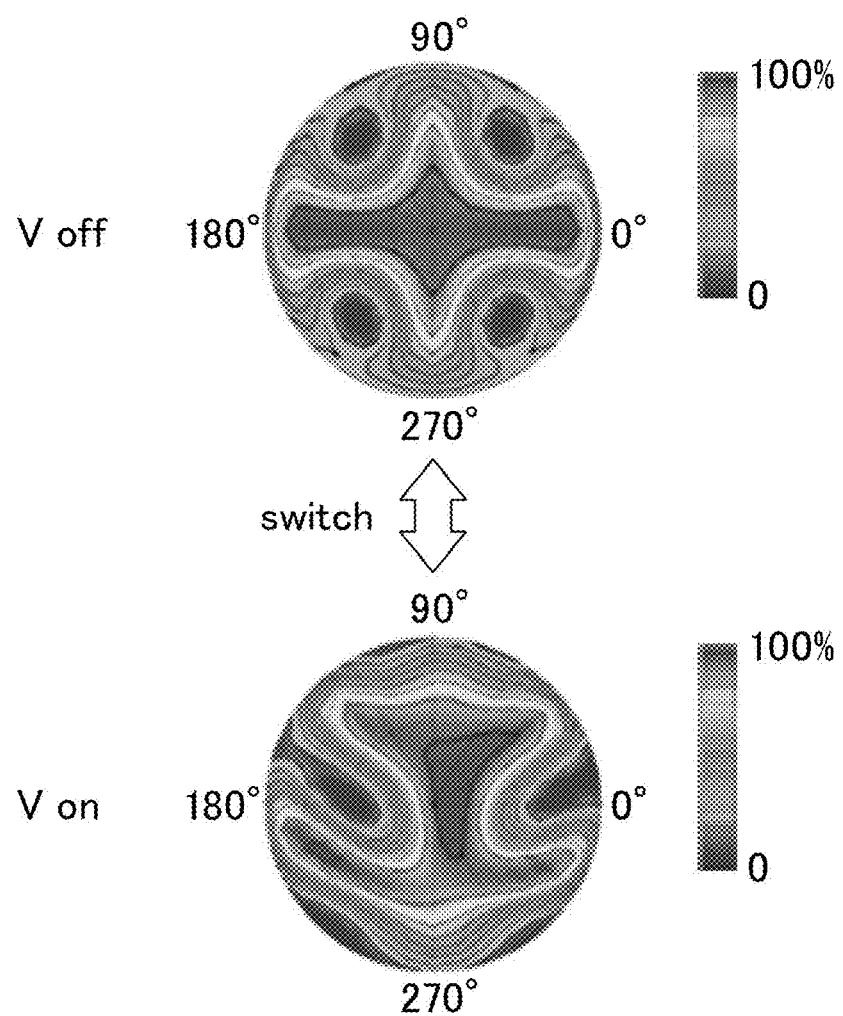
FIG. 30 is a contour view showing viewing angle characteristics of the configuration illustrated in FIG. 29 relative to azimuthal angles when a first liquid crystal layer in Example 3 is in a no-voltage application state (Voff) and a voltage application state (Von).

FIG. 30 is a contour view showing viewing angle characteristics of the configuration illustrated in FIG. 29 relative to azimuthal angles when a first liquid crystal layer in Example 3 is in a no-voltage application state (Voff) and a voltage application state (Von). In FIG. 30, the right in the horizontal direction corresponds to an azimuthal angle of 0°, the upward direction corresponds to an azimuthal angle of 90°, the left in the horizontal direction corresponds to an azimuthal angle of 180°, the downward direction corresponds to an azimuthal angle of 270°, and a difference in transmittance (i.e., luminance of transmitted backlight illumination) is indicated by contour lines.

Figure 31:
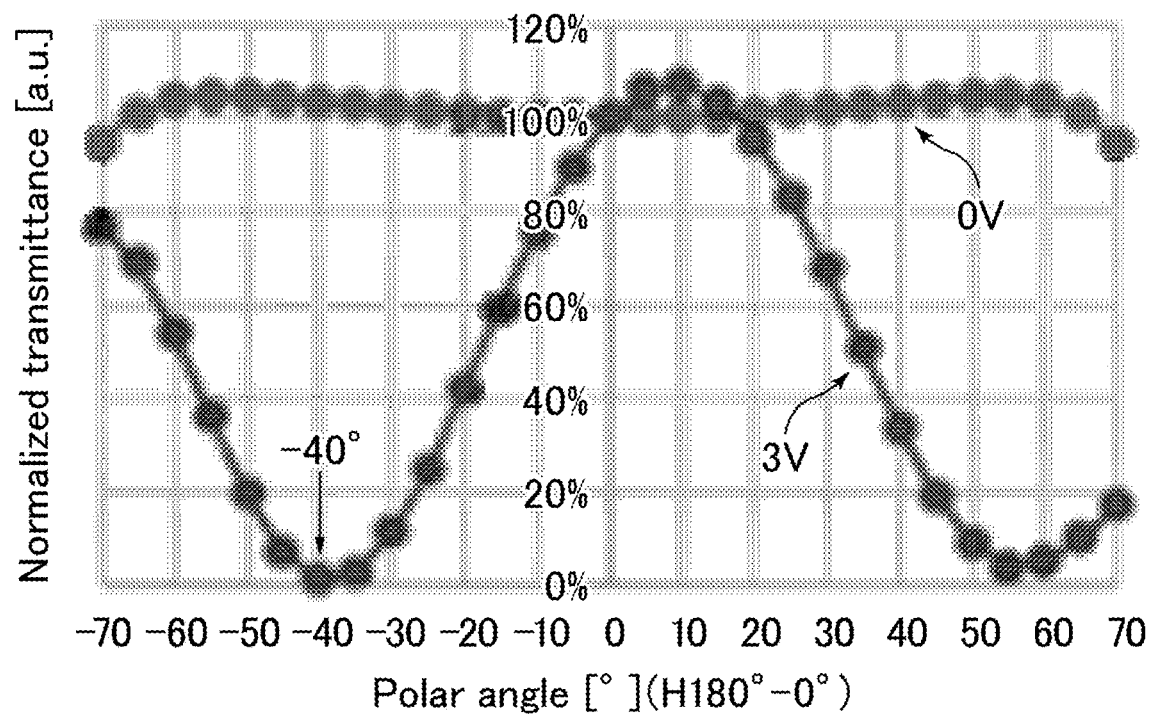
FIG. 31 is a graph showing viewing angle characteristics of the configuration illustrated in FIG. 29 relative to polar angles when a first liquid crystal layer in Example 3 is in a no-voltage application state (Voff) and a voltage application state (Von).

FIG. 31 is a graph showing viewing angle characteristics of the configuration illustrated in FIG. 29 relative to polar angles when a first liquid crystal layer in Example 3 is in a no-voltage application state (Voff) and a voltage application state (Von). In the voltage application state (Von), polar angles at which the transmittance is minimum (light-shielding angle in narrow viewing angle mode) are −40° and +70°.

As shown in FIGS. 30 and 31, in Example 3, the first liquid crystal panel functions as a liquid crystal panel in an ECB mode having an asymmetric viewing angle for blocking light in a low polar angle side (direction near a polar angle of)−40°.

Figure 32:
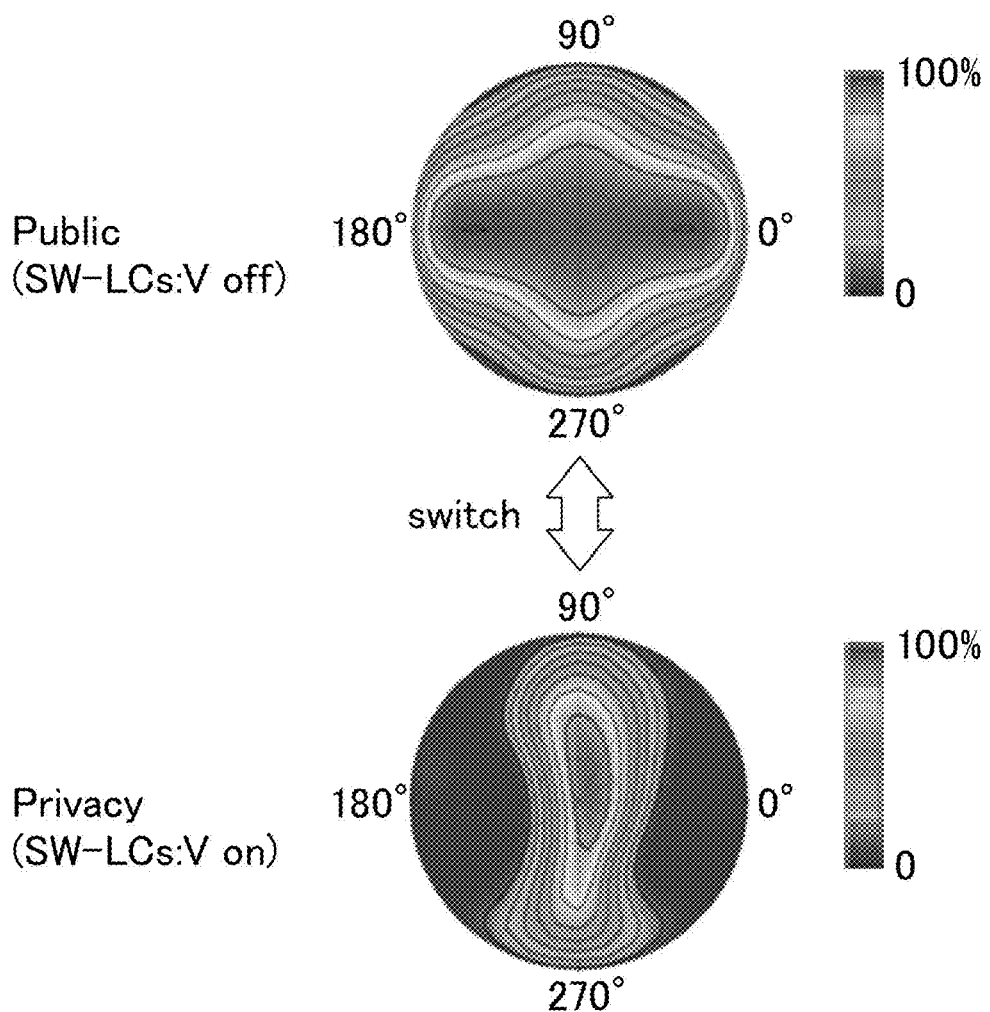
FIG. 32 is a contour view showing viewing angle characteristics of a combination of the configuration illustrated in FIG. 29 and the configuration illustrated in FIG. 16 relative to azimuthal angles when the first and second liquid crystal layers in Example 3 are in a no-voltage application state (Voff) and a voltage application state (Von).

FIG. 32 is a contour view showing viewing angle characteristics of a combination of the configuration illustrated in FIG. 29 and the configuration illustrated in FIG. 16 relative to azimuthal angles when the first and second liquid crystal layers in Example 3 are in a no-voltage application state (Voff) and a voltage application state (Von). In FIG. 32, the right in the horizontal direction corresponds to an azimuthal angle of 0°, the upward direction corresponds to an azimuthal angle of 90°, the left in the horizontal direction corresponds to an azimuthal angle of 180°, the downward direction corresponds to an azimuthal angle of 270°, and a difference in transmittance (i.e., luminance of transmitted backlight illumination) is indicated by contour lines. That is, data shown in FIG. 32 corresponds to an integrated value of data shown in FIG. 30 and data shown in FIG. 17.

Figure 33:
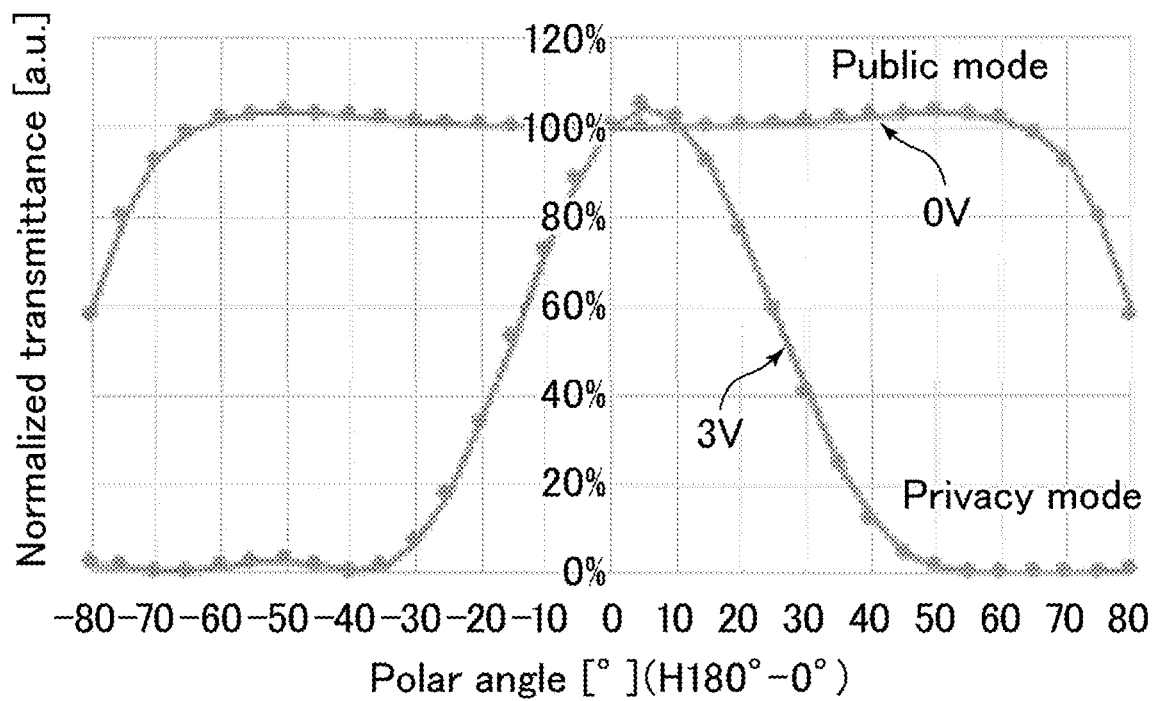
FIG. 33 is a graph showing viewing angle characteristics of the combination of the configuration illustrated in FIG. 29 and the configuration illustrated in FIG. 16 relative to polar angles when the first and second liquid crystal layers in Example 3 are in a no-voltage application state (Voff) and a voltage application state (Von).

FIG. 33 is a graph showing viewing angle characteristics of the combination of the configuration illustrated in FIG. 29 and the configuration illustrated in FIG. 16 relative to polar angles when the first and second liquid crystal layers in Example 3 are in a no-voltage application state (Voff) and a voltage application state (Von). That is, data shown in FIG. 33 corresponds to an integrated value of data shown in FIG. 31 and data shown in FIG. 18.

Figure 34:
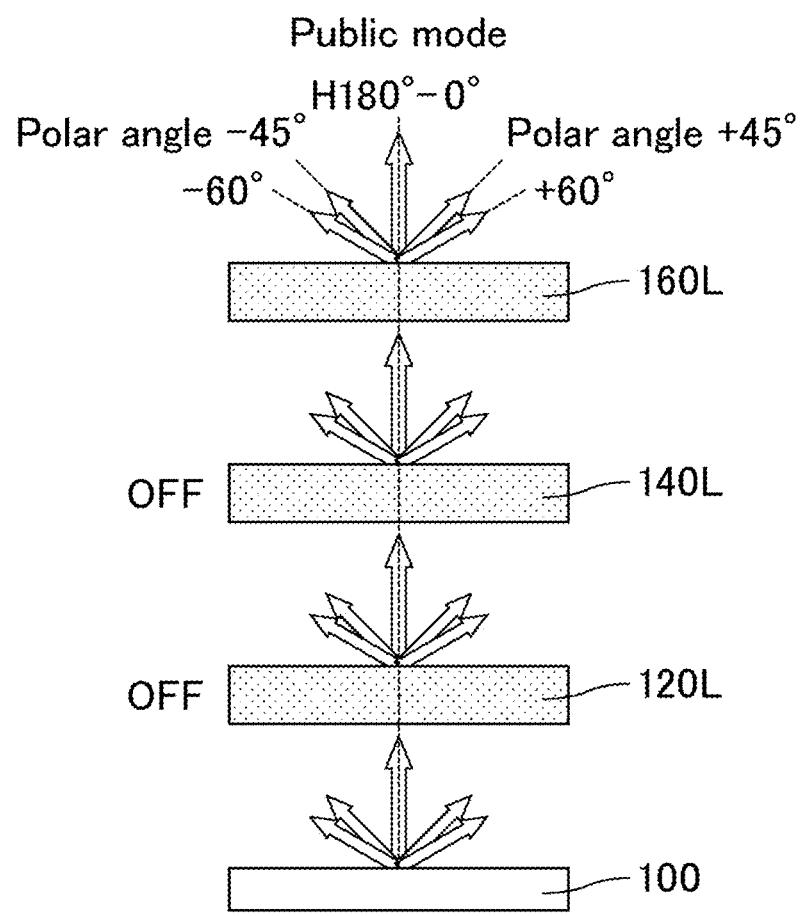
FIG. 34 is a view schematically illustrating an intensity variation of light passing through each member in a public mode at different polar angles in a horizontal direction (direction of 0°-180° azimuthal angle) of the display device of Example 3.

FIG. 34 is a view schematically illustrating an intensity variation of light passing through each member in a public mode at different polar angles in a horizontal direction (direction of 0°-180° azimuthal angle) of the display device of Example 3.

Figure 35:
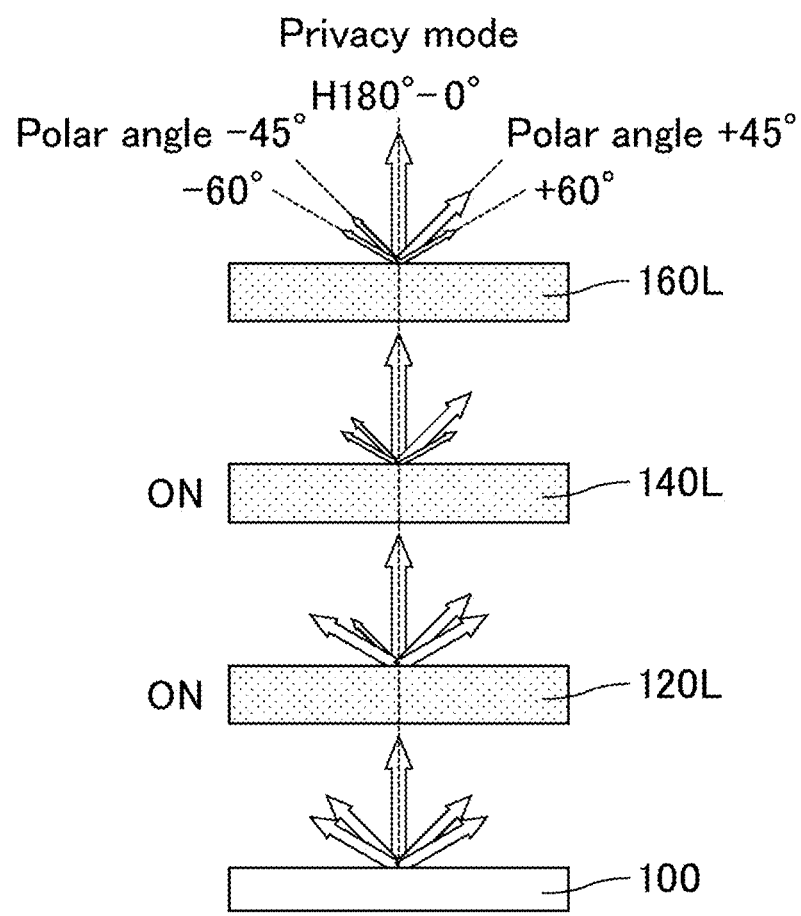
FIG. 35 is a view schematically illustrating an intensity variation of light passing through each member in a privacy mode at different polar angles in a horizontal direction (direction of 0°-180° azimuthal angle) of the display device of Example 3.

FIG. 35 is a view schematically illustrating an intensity variation of light passing through each member in a privacy mode at different polar angles in a horizontal direction (direction of 0°-180° azimuthal angle) of the display device of Example 3.

As shown in FIGS. 32 through 35, in the display device of Example 3, when the mode is switched from the public mode (wide viewing angle mode) to the privacy mode (narrow viewing angle mode), a transmittance is reduced to substantially 0% in a wide angle range of a polar angle from −60° to −40°, and enhancement of light-shielding intensity and light-shielding angle range is achieved.

Tables 1 to 3 show details of design conditions and evaluation results of the display device of Example 3.

Example 4

A display device of Example 4 has a similar configuration to the display device of Example 1 except that the retardation provided by the first liquid crystal layer in the first liquid crystal panel was 1000 nm and a retardation provided by the second liquid crystal layer in the second liquid crystal panel was 400 nm.

Figure 36:
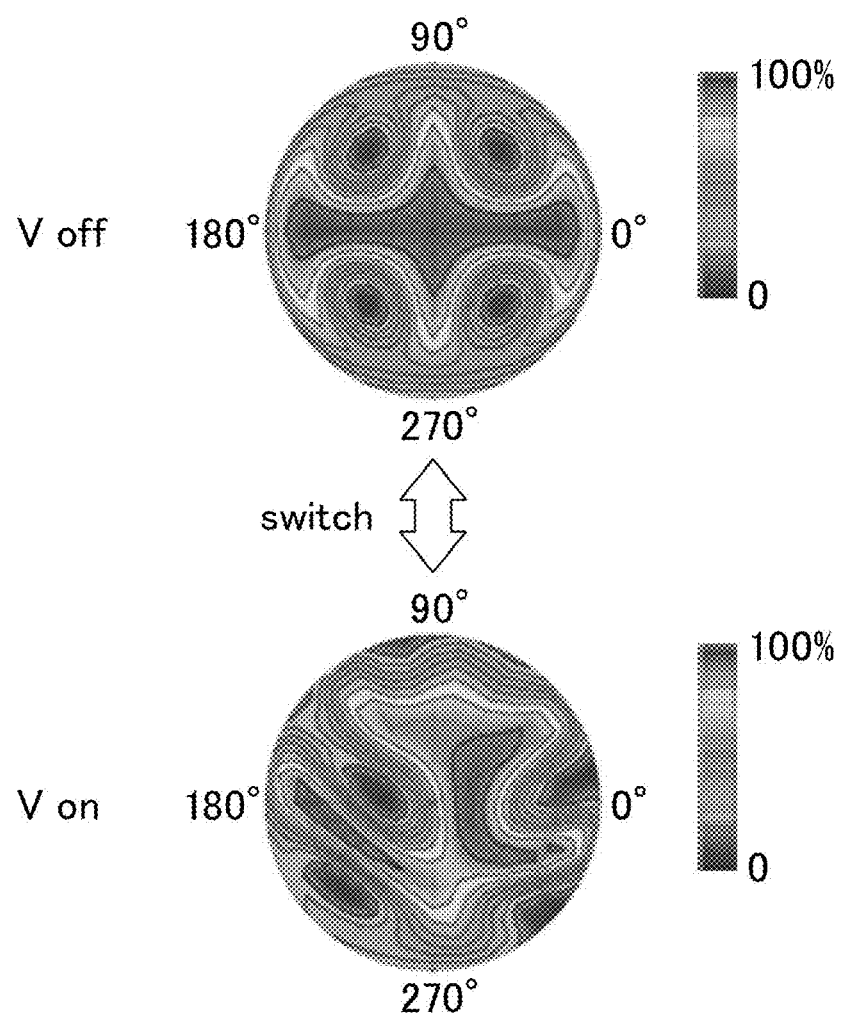
FIG. 36 is a contour view showing viewing angle characteristics of the configuration illustrated in FIG. 13 relative to azimuthal angles when a first liquid crystal layer in Example 4 is in a no-voltage application state (Voff) and a voltage application state (Von).

FIG. 36 is a contour view showing viewing angle characteristics of the configuration illustrated in FIG. 13 relative to azimuthal angles when a first liquid crystal layer in Example 4 is in a no-voltage application state (Voff) and a voltage application state (Von). In FIG. 36, the right in the horizontal direction corresponds to an azimuthal angle of 0°, the upward direction corresponds to an azimuthal angle of 90°, the left in the horizontal direction corresponds to an azimuthal angle of 180°, the downward direction corresponds to an azimuthal angle of 270°, and a difference in transmittance (i.e., luminance of transmitted backlight illumination) is indicated by contour lines.

Figure 37:
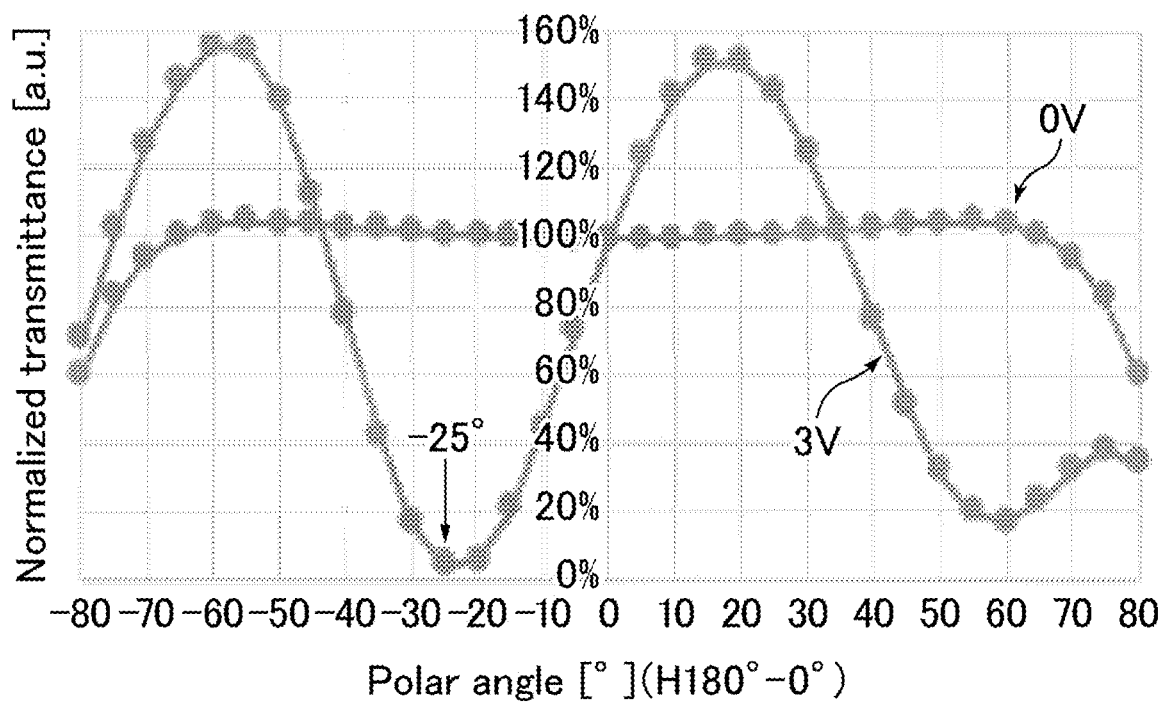
FIG. 37 is a graph showing viewing angle characteristics of the configuration illustrated in FIG. 13 relative to polar angles when the first liquid crystal layer in Example 4 is in a no-voltage application state (Voff) and a voltage application state (Von).

FIG. 37 is a graph showing viewing angle characteristics of the configuration illustrated in FIG. 13 relative to polar angles when the first liquid crystal layer in Example 4 is in a no-voltage application state (Voff) and a voltage application state (Von). In the voltage application state (Von), polar angles at which the transmittance is minimum (light-shielding angle in narrow viewing angle mode) are −25° and +60°.

As shown in FIGS. 36 and 37, in Example 4, the first liquid crystal panel functions as a liquid crystal panel in an ECB mode having an asymmetric viewing angle for blocking light in a low polar angle side (direction near a polar angle of)−25°.

Figure 38:
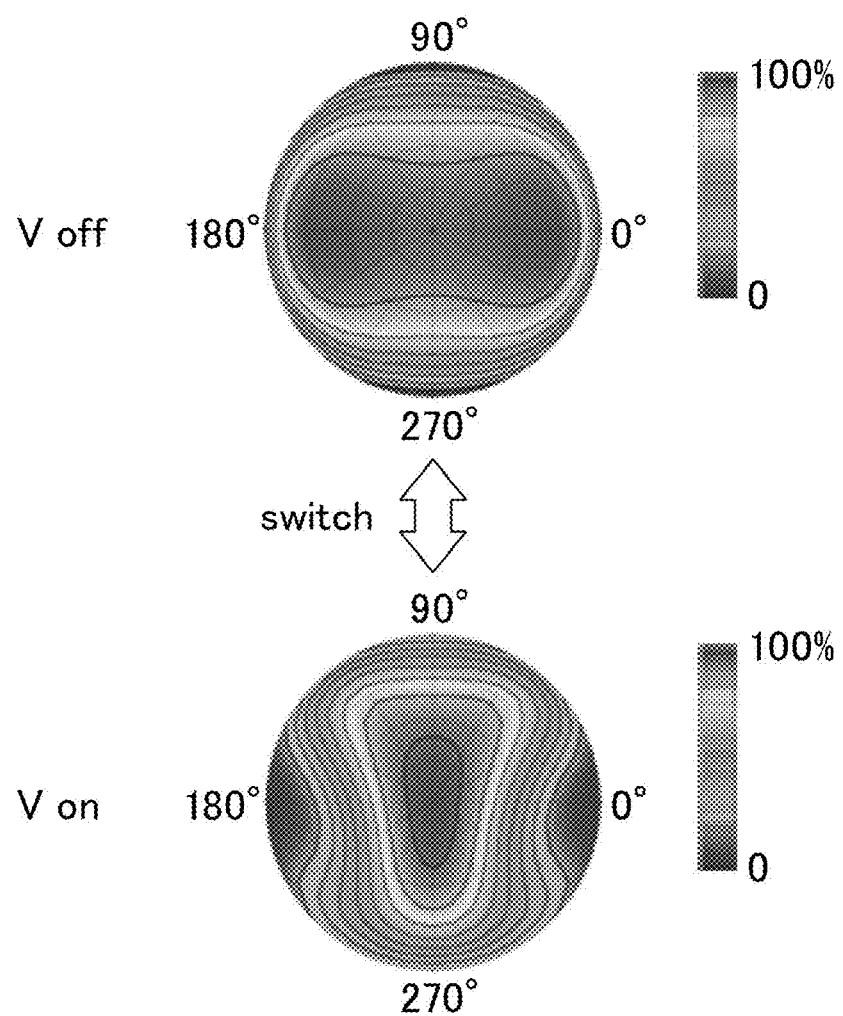
FIG. 38 is a contour view showing viewing angle characteristics of the configuration illustrated in FIG. 16 relative to azimuthal angles when a second liquid crystal layer in Example 4 is in a no-voltage application state (Voff) and a voltage application state (Von).

FIG. 38 is a contour view showing viewing angle characteristics of the configuration illustrated in FIG. 16 relative to azimuthal angles when a second liquid crystal layer in Example 4 is in a no-voltage application state (Voff) and a voltage application state (Von). In FIG. 38, the right in the horizontal direction corresponds to an azimuthal angle of 0°, the upward direction corresponds to an azimuthal angle of 90°, the left in the horizontal direction corresponds to an azimuthal angle of 180°, the downward direction corresponds to an azimuthal angle of 270°, and a difference in transmittance (i.e., luminance of transmitted backlight illumination) is indicated by contour lines.

Figure 39:
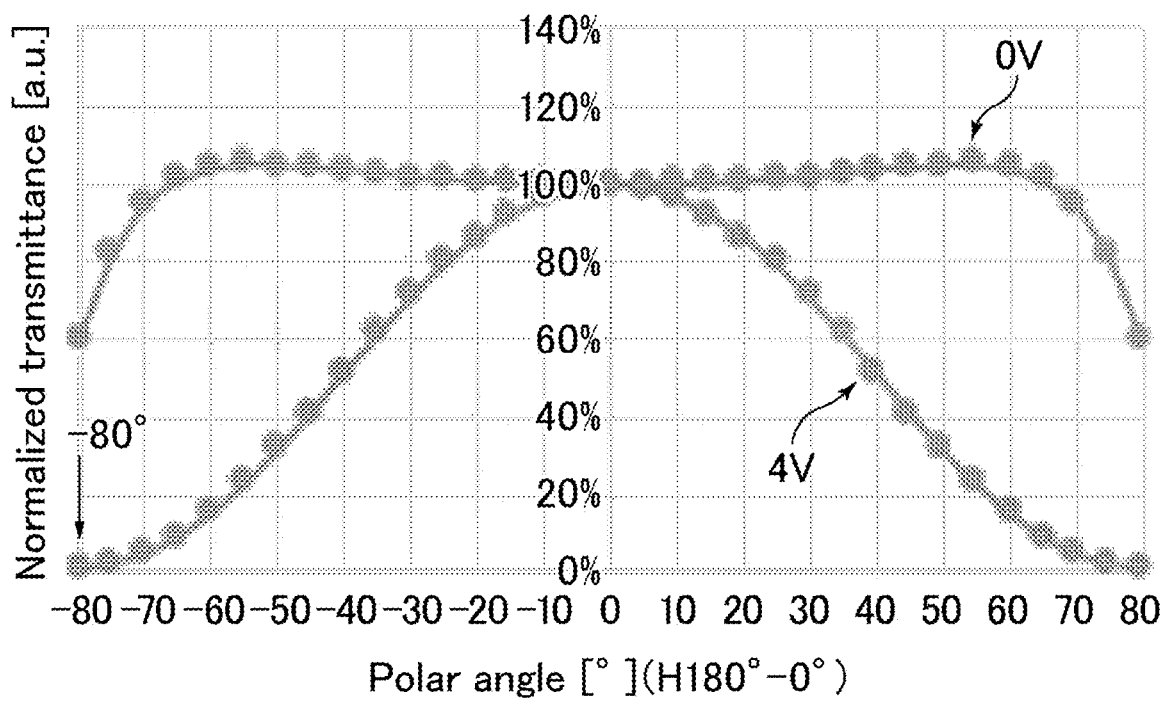
FIG. 39 is a graph showing viewing angle characteristics of the configuration illustrated in FIG. 16 relative to polar angles when the second liquid crystal layer in Example 4 is in a no-voltage application state (Voff) and a voltage application state (Von).

FIG. 39 is a graph showing viewing angle characteristics of the configuration illustrated in FIG. 16 relative to polar angles when the second liquid crystal layer in Example 4 is in a no-voltage application state (Voff) and a voltage application state (Von). In the voltage application state (Von), polar angles at which the transmittance is minimum (light-shielding angle in narrow viewing angle mode) are −80° and +80°.

As shown in FIGS. 38 and 39, in Example 4, the second liquid crystal panel functions as a liquid crystal panel in an ECB mode having a symmetric viewing angle for blocking light in a high polar angle side (direction near a polar angle of)−80°.

Figure 40:
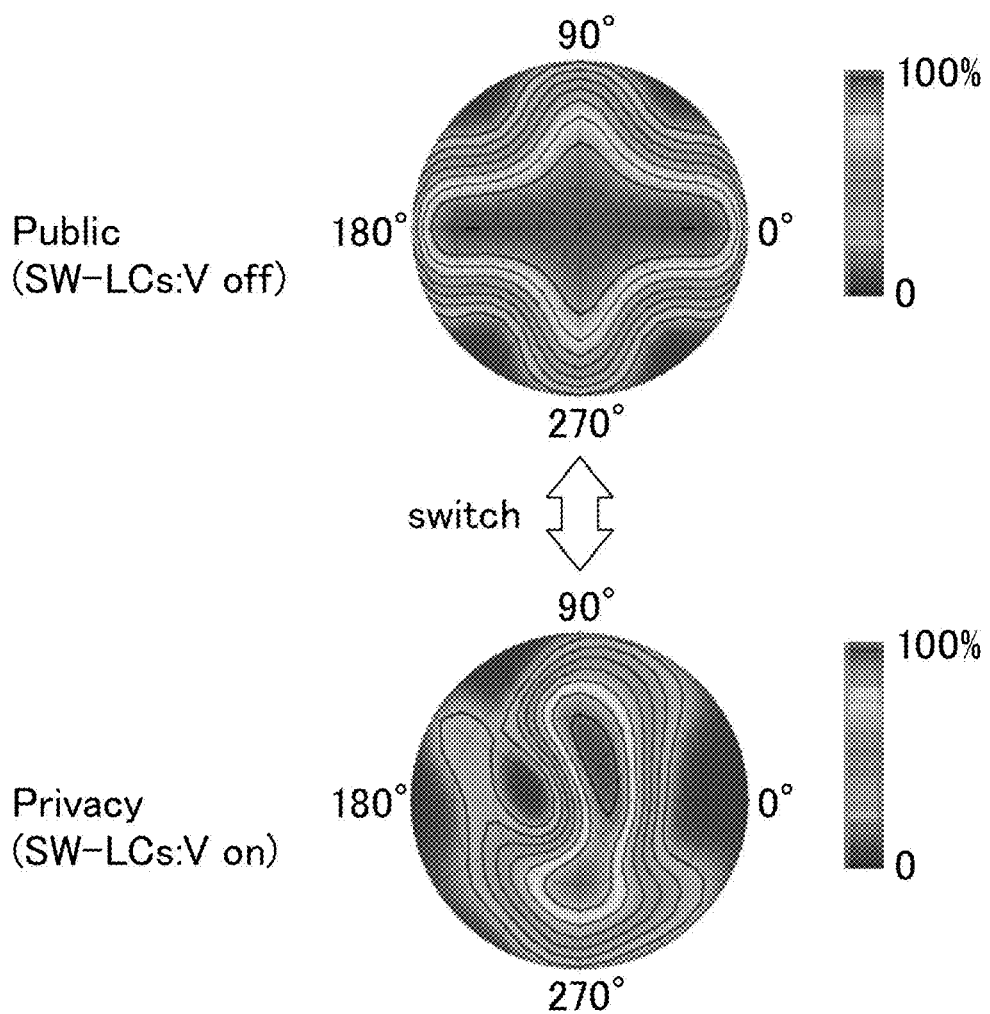
FIG. 40 is a contour view showing viewing angle characteristics of the combination of the configuration illustrated in FIG. 13 and the configuration illustrated in FIG. 16 relative to azimuthal angles when the first and second liquid crystal layers in Example 4 are in a no-voltage application state (Voff) and a voltage application state (Von).

FIG. 40 is a contour view showing viewing angle characteristics of the combination of the configuration illustrated in FIG. 13 and the configuration illustrated in FIG. 16 relative to azimuthal angles when the first and second liquid crystal layers in Example 4 are in a no-voltage application state (Voff) and a voltage application state (Von). In FIG. 40, the right in the horizontal direction corresponds to an azimuthal angle of 0°, the upward direction corresponds to an azimuthal angle of 90°, the left in the horizontal direction corresponds to an azimuthal angle of 180°, the downward direction corresponds to an azimuthal angle of 270°, and a difference in transmittance (i.e., luminance of transmitted backlight illumination) is indicated by contour lines. That is, data shown in FIG. 40 corresponds to an integrated value of data shown in FIG. 36 and data shown in FIG. 38.

Figure 41:
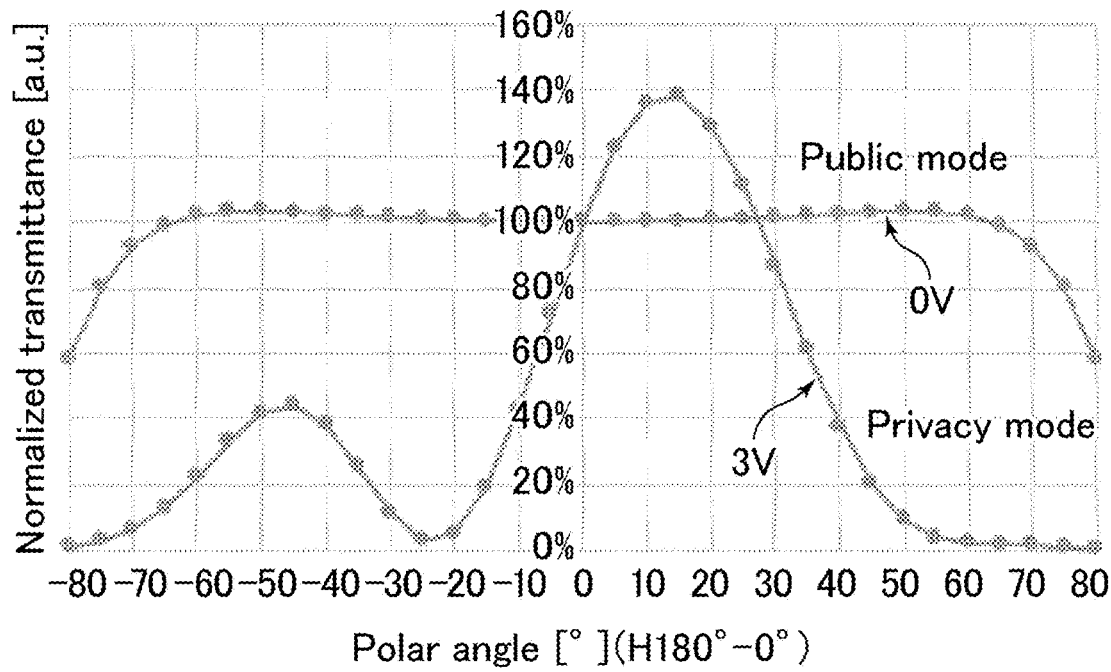
FIG. 41 is a graph showing viewing angle characteristics of the combination of the configuration illustrated in FIG. 13 and the configuration illustrated in FIG. 16 relative to polar angles when the first and second liquid crystal layers in Example 4 are in a no-voltage application state (Voff) and a voltage application state (Von).

FIG. 41 is a graph showing viewing angle characteristics of the combination of the configuration illustrated in FIG. 13 and the configuration illustrated in FIG. 16 relative to polar angles when the first and second liquid crystal layers in Example 4 are in a no-voltage application state (Voff) and a voltage application state (Von). That is, data shown in FIG. 41 corresponds to an integrated value of data shown in FIG. 37 and data shown in FIG. 39.

Figure 42:
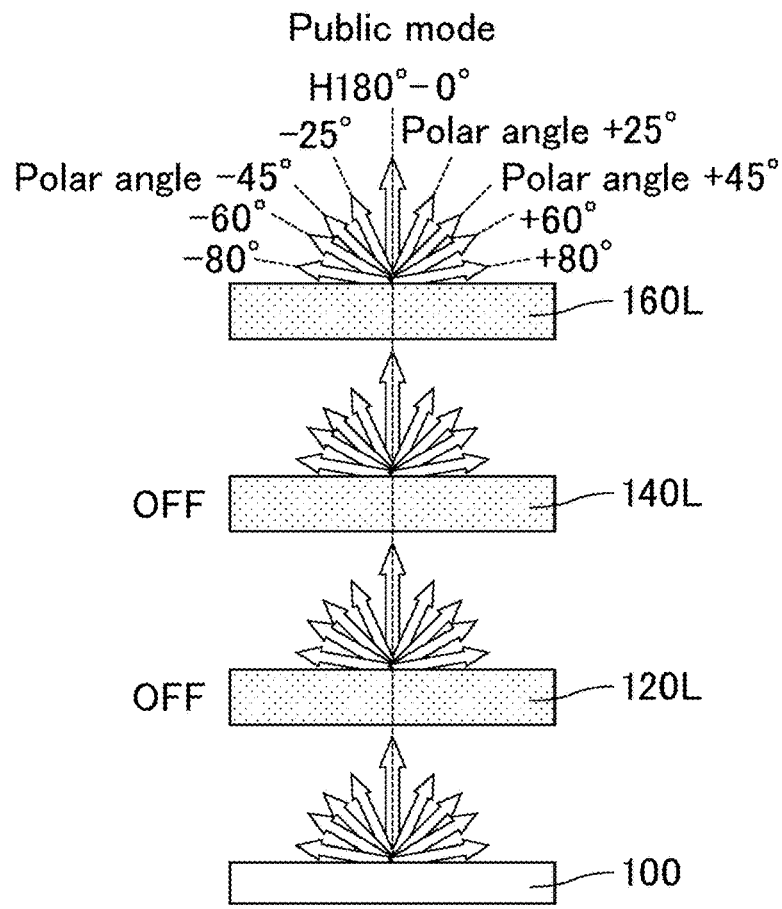
FIG. 42 is a view schematically illustrating an intensity variation of light passing through each member in a public mode at different polar angles in a horizontal direction (direction of 0°-180° azimuthal angle) of a display device of Example 4.

FIG. 42 is a view schematically illustrating an intensity variation of light passing through each member in a public mode at different polar angles in a horizontal direction (direction of 0°-180° azimuthal angle) of a display device of Example 4.

Figure 43:
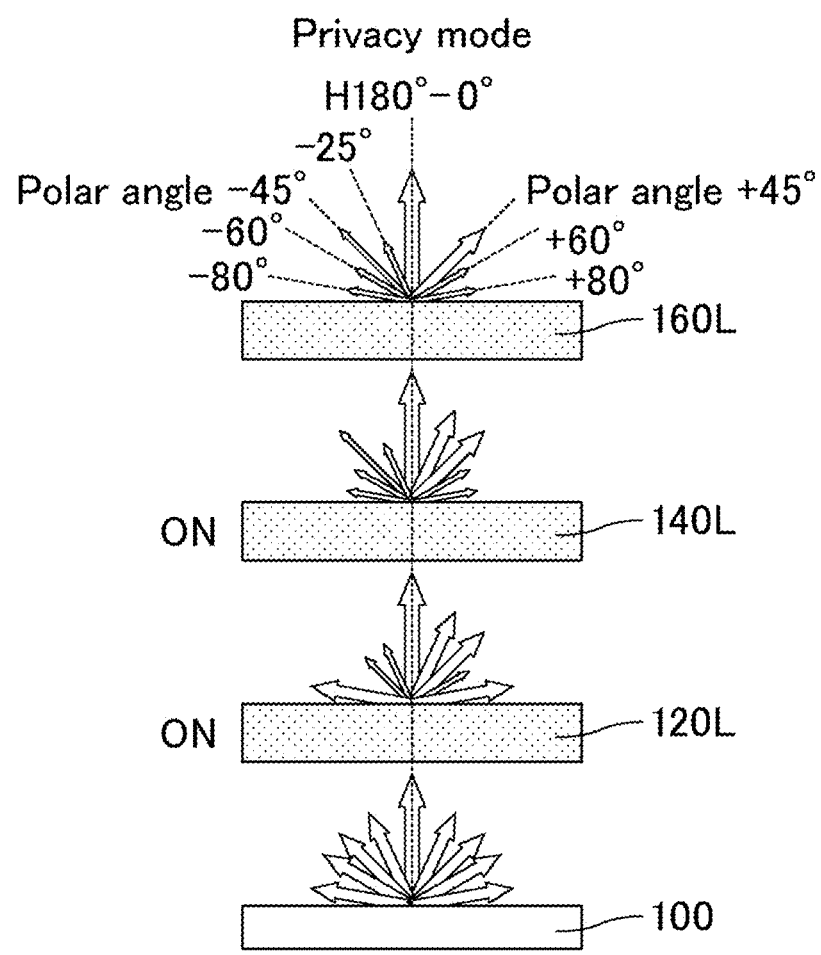
FIG. 43 is a view schematically illustrating an intensity variation of light passing through each member in a privacy mode at different polar angles in a horizontal direction (direction of 0°-180° azimuthal angle) of the display device of Example 4.

FIG. 43 is a view schematically illustrating an intensity variation of light passing through each member in a privacy mode at different polar angles in a horizontal direction (direction of 0°-180° azimuthal angle) of the display device of Example 4.

As shown in FIGS. 40 through 43, in the display device of Example 4, when the mode is switched from the public mode (wide viewing angle mode) to the privacy mode (narrow viewing angle mode), a transmittance is reduced in a wide angle range of a polar angle from −80° to −25°, and enhancement of light-shielding angle range is achieved.

In the display device of Example 4, an azimuthal angle at which transmittance is minimum in light blocking by the first liquid crystal panel is −25°, and achieves a privacy mode (narrow viewing angle mode) with a lower polar angle, as compared to the display device of Example 1. In addition, since an azimuthal angle at which transmittance is minimum in the second liquid crystal panel is −80°, the privacy mode can be achieved in a wide angle range of a light-shielding angle from −80° to −25°. Thus, when the display device is used as a display for a passenger's seat in an automobile, for example, a light-shielding angle range in which a display image on the display for a passenger's seat cannot be visually recognized can be enlarged so that safety during driving can be thereby enhanced.

Tables 1 to 3 show details of design conditions and evaluation results of the display device of Example 4.

Example 5

A display device of Example 5 has a similar configuration to the display device of Example 1 except that the retardation provided by the first liquid crystal layer in the first liquid crystal panel was 1200 nm and a retardation provided by the second liquid crystal layer in the second liquid crystal panel was 650 nm.

Figure 44:
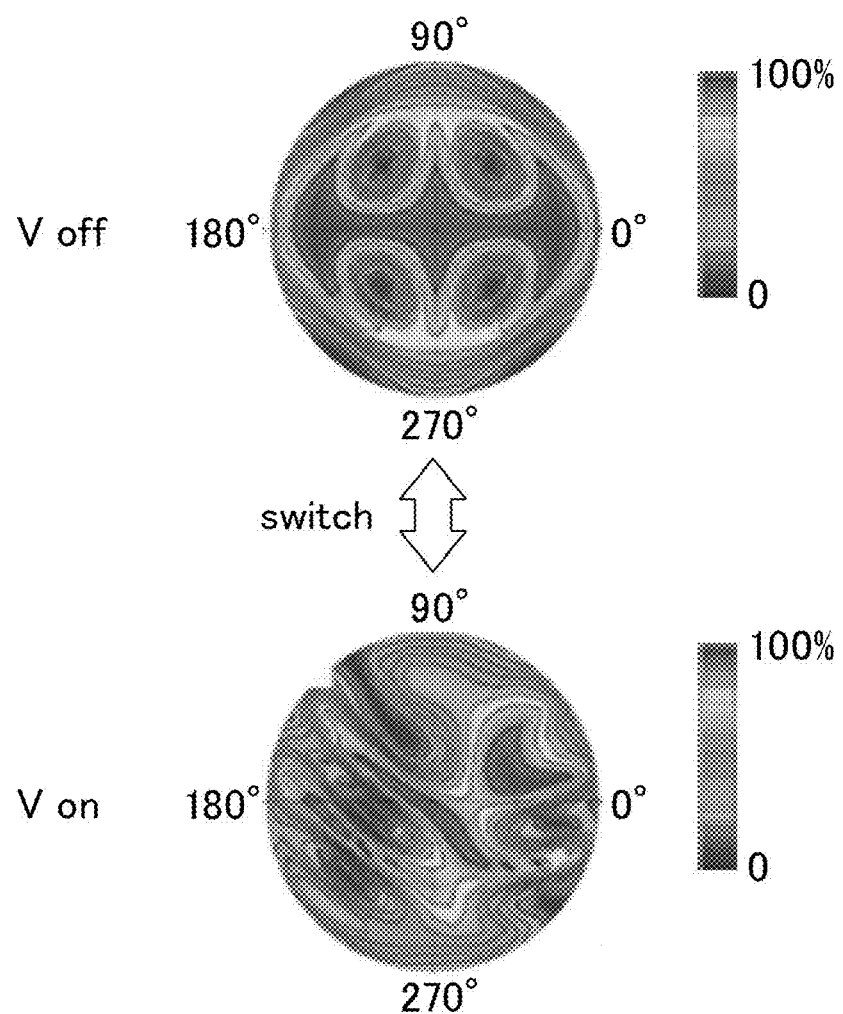
FIG. 44 is a contour view showing viewing angle characteristics of the configuration illustrated in FIG. 13 relative to azimuthal angles when a first liquid crystal layer in Example 5 is in a no-voltage application state (Voff) and a voltage application state (Von).

FIG. 44 is a contour view showing viewing angle characteristics of the configuration illustrated in FIG. 13 relative to azimuthal angles when a first liquid crystal layer in Example 5 is in a no-voltage application state (Voff) and a voltage application state (Von). In FIG. 44, the right in the horizontal direction corresponds to an azimuthal angle of 0°, the upward direction corresponds to an azimuthal angle of 90°, the left in the horizontal direction corresponds to an azimuthal angle of 180°, the downward direction corresponds to an azimuthal angle of 270°, and a difference in transmittance (i.e., luminance of transmitted backlight illumination) is indicated by contour lines.

Figure 45:
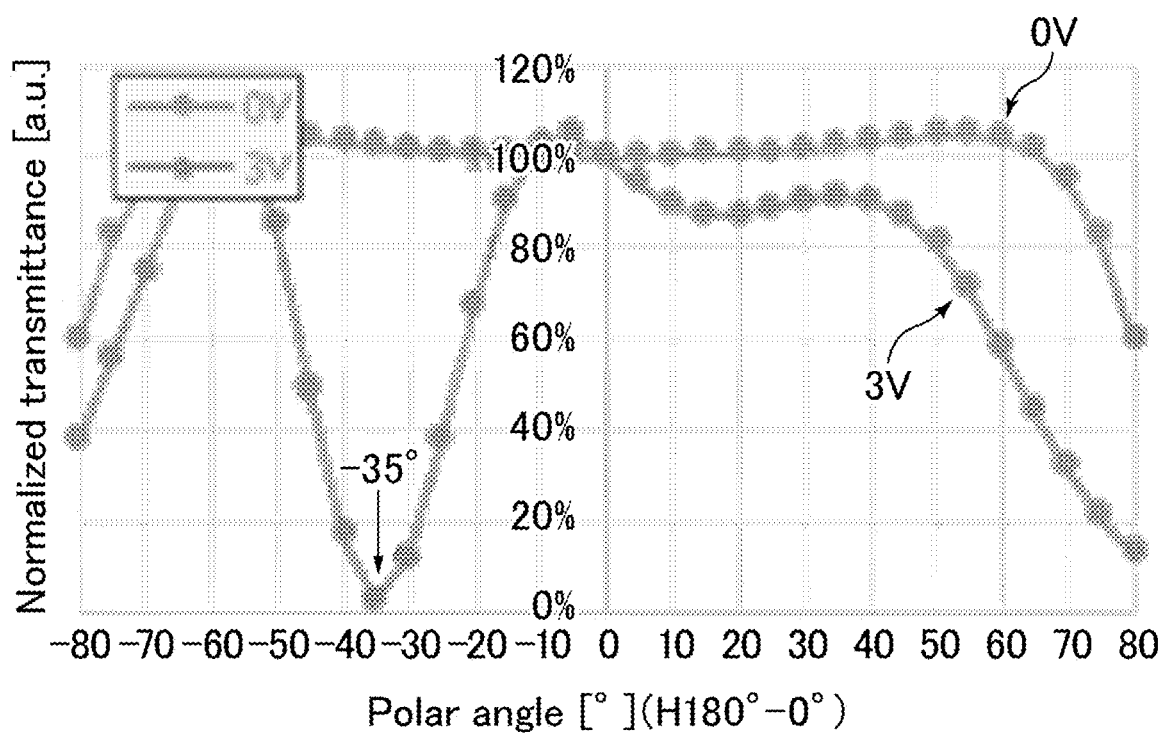
FIG. 45 is a graph showing viewing angle characteristics of the configuration illustrated in FIG. 13 relative to polar angles when a first liquid crystal layer in Example 5 is in a no-voltage application state (Voff) and a voltage application state (Von).

FIG. 45 is a graph showing viewing angle characteristics of the configuration illustrated in FIG. 13 relative to polar angles when a first liquid crystal layer in Example 5 is in a no-voltage application state (Voff) and a voltage application state (Von). In the voltage application state (Von), polar angles at which the transmittance is minimum (light-shielding angle in narrow viewing angle mode) are −35° and +80°.

As shown in FIGS. 44 and 45, in Example 5, the first liquid crystal panel functions as a liquid crystal panel in an ECB mode having an asymmetric viewing angle for blocking light in a low polar angle side (direction near a polar angle of)−35°.

Figure 46:
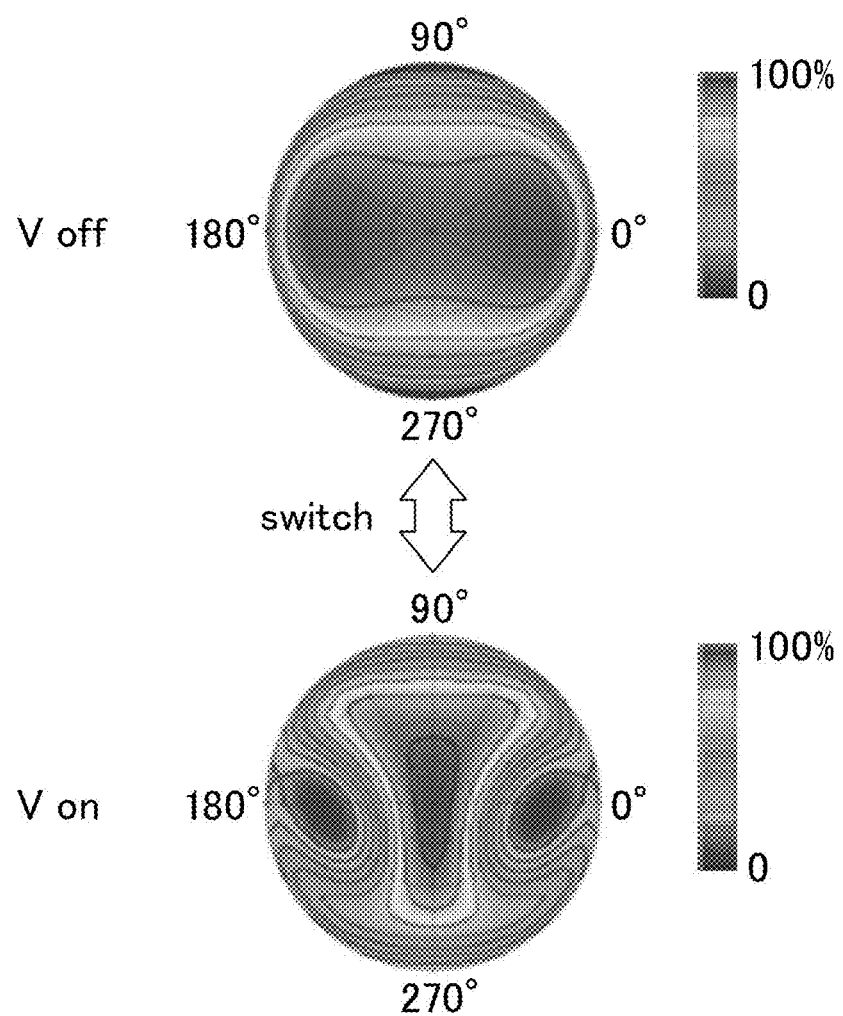
FIG. 46 is a contour view showing viewing angle characteristics of the configuration illustrated in FIG. 16 relative to azimuthal angles when a second liquid crystal layer in Example 5 is in a no-voltage application state (Voff) and a voltage application state (Von).

FIG. 46 is a contour view showing viewing angle characteristics of the configuration illustrated in FIG. 16 relative to azimuthal angles when a second liquid crystal layer in Example 5 is in a no-voltage application state (Voff) and a voltage application state (Von). In FIG. 46, the right in the horizontal direction corresponds to an azimuthal angle of 0°, the upward direction corresponds to an azimuthal angle of 90°, the left in the horizontal direction corresponds to an azimuthal angle of 180°, the downward direction corresponds to an azimuthal angle of 270°, and a difference in transmittance (i.e., luminance of transmitted backlight illumination) is indicated by contour lines.

Figure 47:
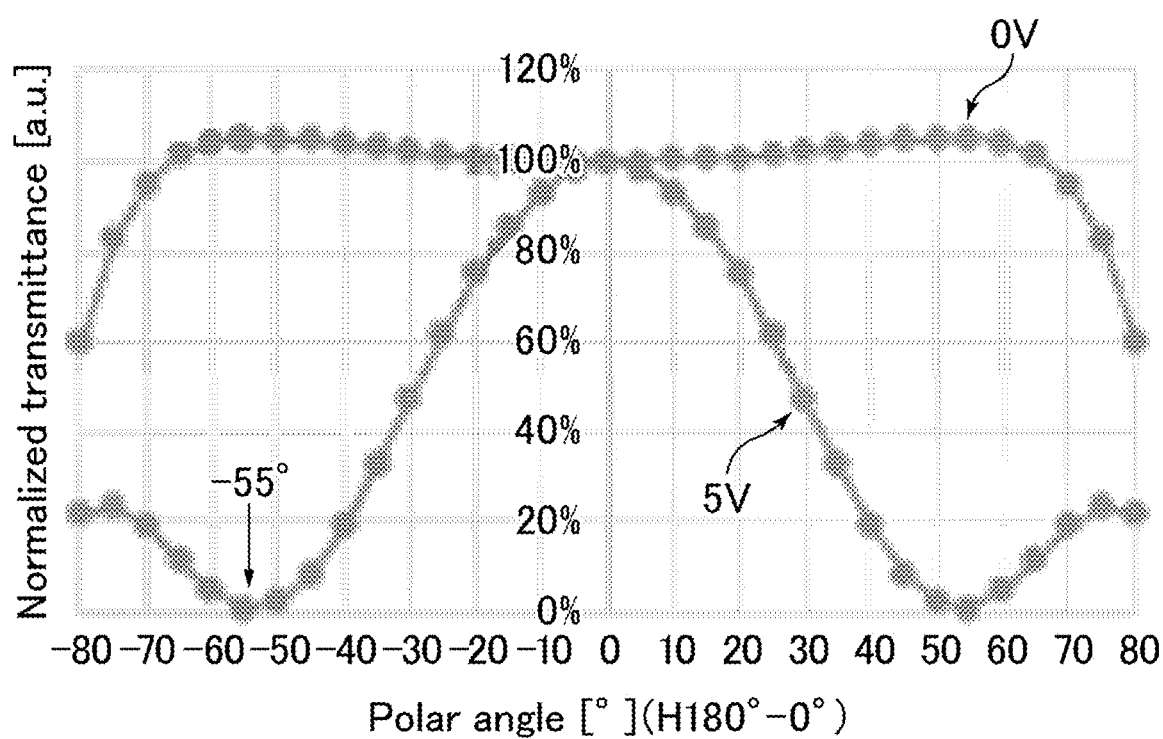
FIG. 47 is a graph showing viewing angle characteristics of the configuration illustrated in FIG. 16 relative to polar angles when the second liquid crystal layer in Example 5 is in a no-voltage application state (Voff) and a voltage application state (Von).

FIG. 47 is a graph showing viewing angle characteristics of the configuration illustrated in FIG. 16 relative to polar angles when the second liquid crystal layer in Example 5 is in a no-voltage application state (Voff) and a voltage application state (Von). In the voltage application state (Von), polar angles at which the transmittance is minimum (light-shielding angle in narrow viewing angle mode) are −55° and +55°.

As shown in FIGS. 46 and 47, in Example 5, the second liquid crystal panel functions as a liquid crystal panel in an ECB mode having a symmetric viewing angle for blocking light in a high polar angle side (direction near a polar angle of)−55°.

Figure 48:
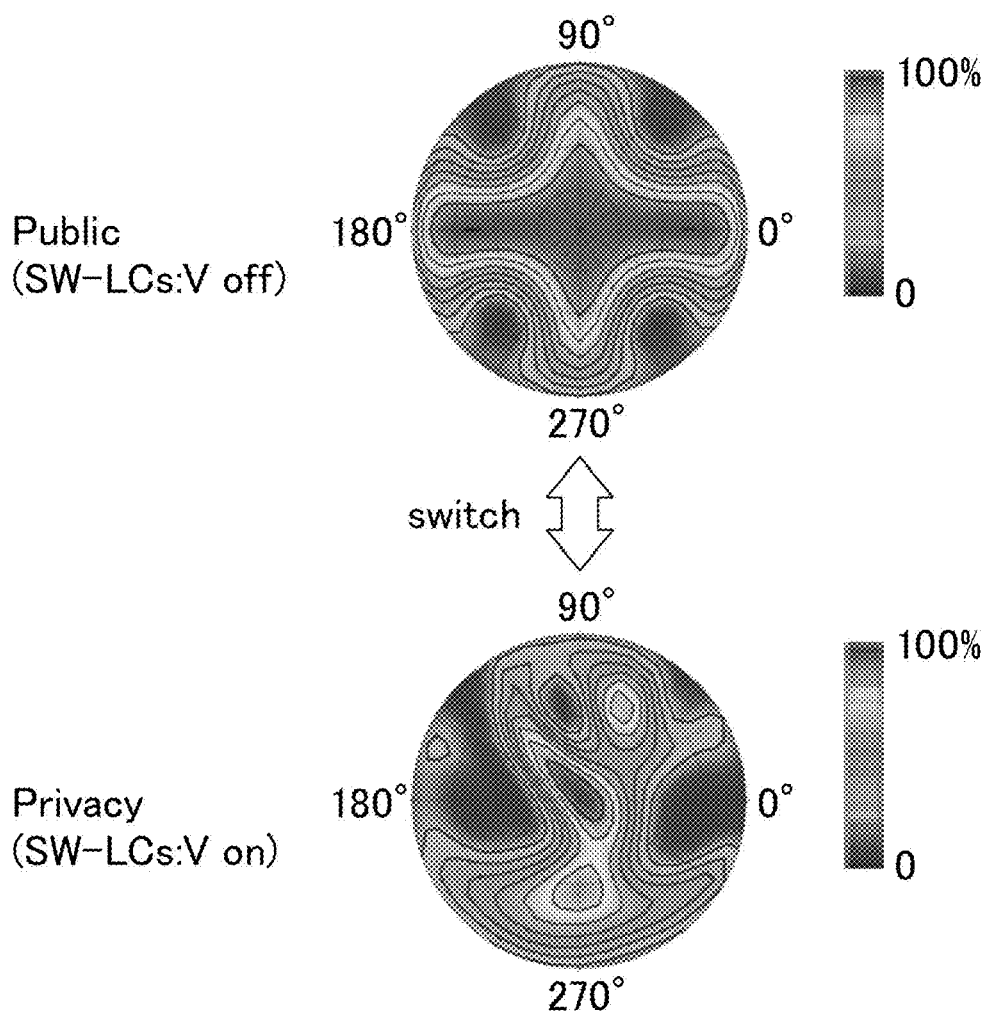
FIG. 48 is a contour view showing viewing angle characteristics of the combination of the configuration illustrated in FIG. 13 and the configuration illustrated in FIG. 16 relative to azimuthal angles when the first and second liquid crystal layers in Example 5 are in a no-voltage application state (Voff) and a voltage application state (Von).

FIG. 48 is a contour view showing viewing angle characteristics of the combination of the configuration illustrated in FIG. 13 and the configuration illustrated in FIG. 16 relative to azimuthal angles when the first and second liquid crystal layers in Example 5 are in a no-voltage application state (Voff) and a voltage application state (Von). In FIG. 48, the right in the horizontal direction corresponds to an azimuthal angle of 0°, the upward direction corresponds to an azimuthal angle of 90°, the left in the horizontal direction corresponds to an azimuthal angle of 180°, the downward direction corresponds to an azimuthal angle of 270°, and a difference in transmittance (i.e., luminance of transmitted backlight illumination) is indicated by contour lines. That is, data shown in FIG. 48 corresponds to an integrated value of data shown in FIG. 44 and data shown in FIG. 46.

Figure 49:
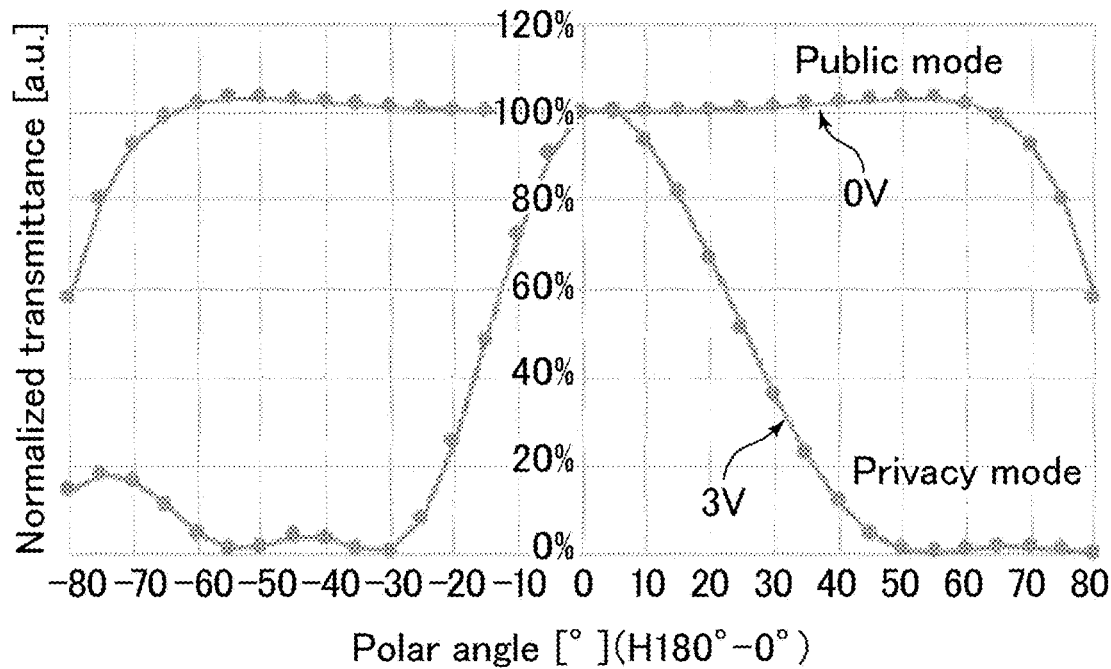
FIG. 49 is a graph showing viewing angle characteristics of a combination of the configuration illustrated in FIG. 13 and the configuration illustrated in FIG. 16 relative to polar angles when the first and second liquid crystal layers in Example 5 are in a no-voltage application state (Voff) and a voltage application state (Von).

FIG. 49 is a graph showing viewing angle characteristics of a combination of the configuration illustrated in FIG. 13 and the configuration illustrated in FIG. 16 relative to polar angles when the first and second liquid crystal layers in Example 5 are in a no-voltage application state (Voff) and a voltage application state (Von). That is, data shown in FIG. 49 corresponds to an integrated value of data shown in FIG. 45 and data shown in FIG. 47.

Figure 50:
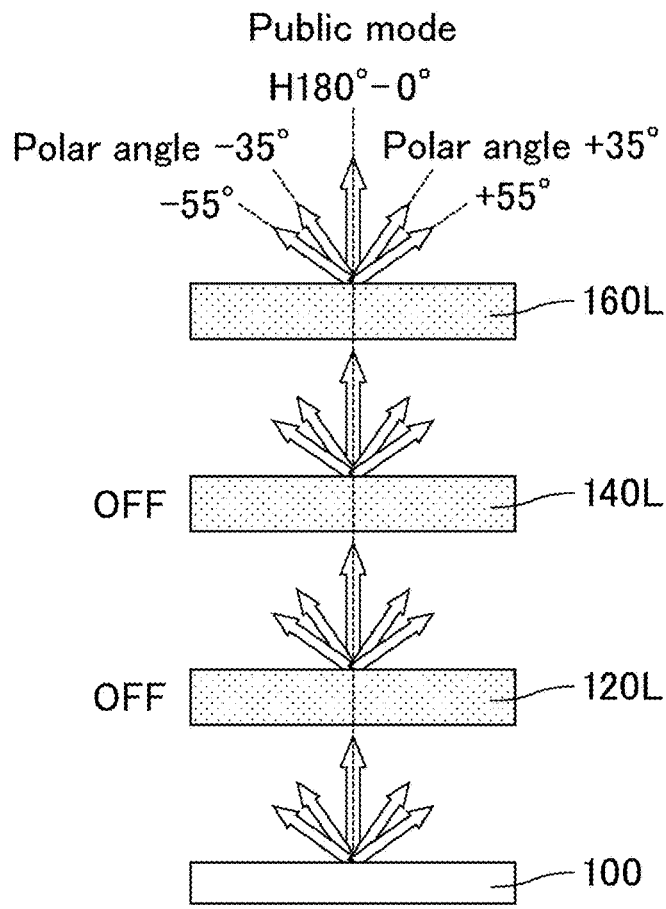
FIG. 50 is a view schematically illustrating an intensity variation of light passing through each member in a public mode at different polar angles in a horizontal direction (direction of 0°-180° azimuthal angle) of the display device of Example 5.

FIG. 50 is a view schematically illustrating an intensity variation of light passing through each member in a public mode at different polar angles in a horizontal direction (direction of 0°-180° azimuthal angle) of the display device of Example 5.

Figure 51:
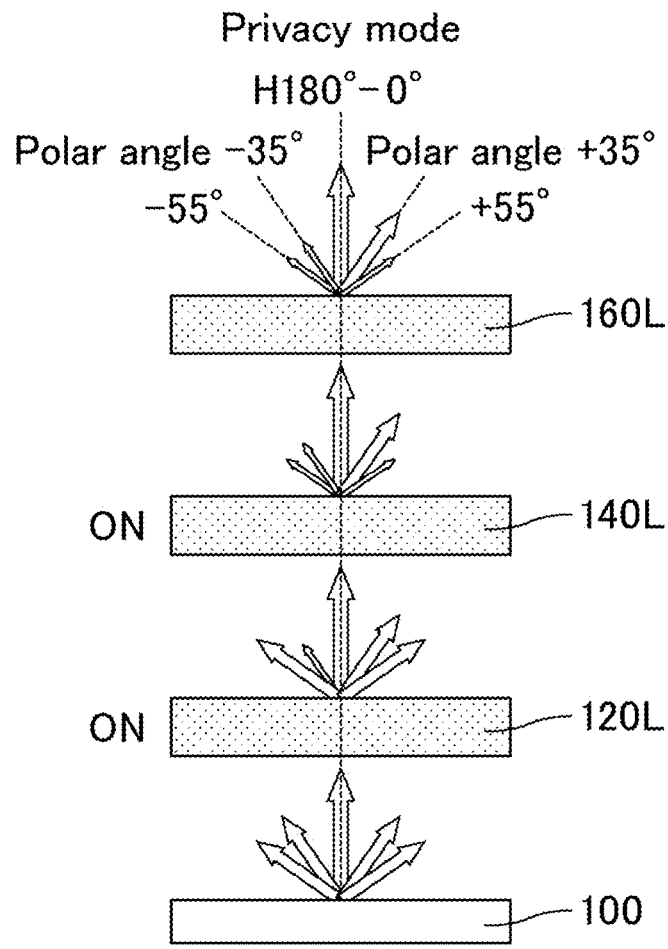
FIG. 51 is a view schematically illustrating an intensity variation of light passing through each member in a privacy mode at different polar angles in a horizontal direction (direction of 0°-180° azimuthal angle) of the display device of Example 5.

FIG. 51 is a view schematically illustrating an intensity variation of light passing through each member in a privacy mode at different polar angles in a horizontal direction (direction of 0°-180° azimuthal angle) of the display device of Example 5.

As shown in FIGS. 48 through 51, in the display device of Example 5, when the mode is switched from the public mode (wide viewing angle mode) to the privacy mode (narrow viewing angle mode), a transmittance is reduced in a wide angle range of a light-shielding angle from −55° to −35°, and enhancement of light-shielding angle range is achieved.

In the display device of Example 5, an azimuthal angle at which transmittance is minimum in light blocking by the first liquid crystal panel is −35°, and a privacy mode (narrow viewing angle mode) with a lower polar angle is achieved, as compared to the display device of Example 1. In addition, since an azimuthal angle at which transmittance is minimum in the second liquid crystal panel is −55°, the privacy mode can be achieved in a wide angle range of a light-shielding angle from −55° to −35°. Thus, when the display device is used as a display for a passenger's seat in an automobile, for example, a light-shielding angle range in which a display image on the display for a passenger's seat cannot be visually recognized can be enlarged so that safety during driving can be thereby enhanced.

Tables 1 to 3 show details of design conditions and evaluation results of the display device of Example 5.

Comparative Example 1

Table 1 to 3 below show detailed design conditions and evaluation results of the display device of Comparative Example 1.

TABLE 1

First liquid crystal panel

| | Viewing angle control direction | Liquid crystal mode | Liquid crystal phase difference (Δn × d) [nm] | Back surface side liquid crystal Director azimuthal angle φ1 [°] | Viewing surface side liquid crystal Director azimuthal angle φ2 [°] | \|φ1 − φ2\| [°] | Chiral agent |
|---|---|---|---|---|---|---|---|
| Comparative Example 1 | Left-right | Symmetric ECB | 800 | 90 | 90 | 0 | Absent |
| Example 1 | Left low polar angle | Asymmetric ECB | 630 | 90 | 45 | 45 | Absent |
| Example 2 | Left low polar angle | Asymmetric ECB | 800 | 90 | 45 | 45 | Absent |
| Example 3 | Left low polar angle | Asymmetric ECB | 800 | 90 | 50 | 40 | Present |
| Example 4 | Left low polar angle | Asymmetric ECB | 1000 | 90 | 45 | 45 | Absent |
| Example 5 | Left low polar angle | Asymmetric ECB | 1200 | 90 | 45 | 45 | Absent |

TABLE 2

Second liquid crystal panel

| | Viewing angle control direction | Liquid crystal mode | Liquid crystal phase difference (Δn × d) [nm] | Back surface side liquid crystal Director azimuthal angle φ3 [°] | Viewing surface side liquid crystal Director azimuthal angle φ4 [°] | \|φ3 − φ4\| [°] |
|---|---|---|---|---|---|---|
| Comparative Example 1 | Left-right | Symmetric ECB | 500 | 90 | 90 | 0 |
| Example 1 | Left-right | Symmetric ECB | 500 | 90 | 90 | 0 |
| Example 2 | Left-right | Symmetric ECB | 500 | 90 | 90 | 0 |
| Example 3 | Left-right | Symmetric ECB | 500 | 90 | 90 | 0 |
| Example 4 | Left-right | Symmetric ECB | 400 | 90 | 90 | 0 |
| Example 5 | Left-right | Symmetric ECB | 650 | 90 | 90 | 0 |

TABLE 3

Evaluation result

| | Light-shielding angle [°] (H180°-0°) | | | |
|---|---|---|---|---|
| | First viewing angle-controlling liquid crystal panel | Second viewing angle-controlling liquid crystal panel | Front color shift Δxy between modes | Determination |
| Comparative Example 1 | −50°/+50° | −60°/+60° | 0 | Poor |
| Example 1 | −40°/+70° | −60°/+60° | 0.007 | Good |
| Example 2 | −30°/+70° | −60°/+60° | 0.018 | Good |
| Example 3 | −40°/+70° | −60°/+60° | 0.002 | Good |
| Example 4 | −25°/+60° | −80°/+80° | 0.021 | Good |
| Example 5 | −35°/+80° | −55°/+55° | 0.013 | Good |

A front color shift Δxy between modes in Table 3 represents a color difference between a public mode (wide viewing angle mode) and a privacy mode (narrow viewing angle mode) in a front view.

The "LCD Master 2D" was used to determine the color difference by calculating the voltage dependence (wavelength range of 400 nm to 800 nm) of the transmittance relative to the polar angle in the horizontal direction (0°-180° azimuthal angle) of the viewing angle-controlling liquid crystal panel. Specifically, a front chromaticity coordinates (x1, y1) in the wide viewing angle mode (0 V) and a front chromaticity coordinates (x2, y2) in the narrow viewing angle mode (5.5 V) are obtained. Then, as shown in the following equation, a front color shift Δxy was obtained as a difference between the front chromaticity coordinates (x1, y1) in the wide viewing angle mode (0 V) and the front chromaticity coordinates (x2, y2) in the narrow viewing angle mode (5.5 V).

$$\Delta xy = \sqrt{\{(x1-x2)^2 + (y1-y2)^2\}}$$

In the display device of Comparative Example 1, the light-shielding angle in the narrow viewing angle mode (i.e., polar angle at which transmittance is minimum in the voltage application state (Von)) is as high as −50°, and capability of blocking light in the narrow viewing angle mode (capability of blocking light especially around)−30° was insufficient. On the other hand, in the display device of Example 1, the light-shielding angle in the narrow viewing angle mode was −40°, which is closer to the low polar angle side than Comparative Example 1, and high capability of blocking light in the narrow viewing angle mode (capability of blocking light especially around)−30° was obtained. In the display device of Example 2, the light-shielding angle was −30°, which is closer to the low polar angle side than in Example 1, and more high capability of blocking light in the narrow viewing angle mode (capability of blocking light especially around)−30° was obtained. The display device of Example 3 is also excellent in that the light-shielding angle was −40°, which is closer to the low polar angle side than in Comparative Example 1, high capability of blocking light in the narrow viewing angle mode was obtained, and a color shift between modes was small. In the display device of Example 4, the light-shielding angle was −25°, which is closer to the low polar angle side than in Comparative Example 1, and high capability of blocking light in the narrow viewing angle mode (capability of blocking light especially around)−30° was obtained. In the display device of Example 5, the light-shielding angle was −35°, which is closer to the low polar angle side than in Comparative Example 1, and high capability of blocking light in the narrow viewing angle mode (capability of blocking light especially around)−30° was obtained.

In Example 4, although capability of blocking light near −45° is lower than capability of blocking light at −25° or −80°, a third liquid crystal panel for viewing angle control with a light-shielding angle of −45° may be additionally provided between the second liquid crystal panel and the display-providing liquid crystal panel so that capability of blocking light in the narrow viewing angle mode can be enhanced. That is, the number of liquid crystal panels for viewing angle control is not limited to two, and may be three or more.

REFERENCE SIGNS LIST

21P: pixel
100: backlight
110P: first polarizing plate
120L: first liquid crystal panel
121: first substrate
121a: support substrate
121b: first electrode
122: alignment film
123: first liquid crystal layer
123a: first liquid crystal molecules near first substrate
123b: first liquid crystal molecules near second substrate
123M: first liquid crystal molecules
124: alignment film
125: second substrate
125a: support substrate
125b: second electrode
128: negative C plate
130P: second polarizing plate
131: third substrate
132: alignment film
133: second liquid crystal layer
133a: second liquid crystal molecules near third substrate
133b: second liquid crystal molecules near fourth substrate
134: alignment film
135: fourth substrate
140L: second liquid crystal panel
150P: third polarizing plate
160L: display-providing liquid crystal panel
161: fifth substrate
162: alignment film
163: third liquid crystal layer
163M: third liquid crystal molecules
164: alignment film
165: sixth substrate
170P: fourth polarizing plate
211: third support substrate
212: color filter layer
212C, 212CB, 212CG, 212CR: color filter
213: black matrix layer
213S: aperture
250P: pixel electrode
250PS: slit
251: fourth support substrate
252: third electrode
253: insulating layer
254: fourth electrode
254a: linear electrode
254b: aperture
256: gate line
257: source line

What is claimed is:

1. A viewing angle-controlling liquid crystal panel sequentially comprising:
a first polarizing plate with a first absorption axis;
a first liquid crystal panel sequentially including a first substrate with a first electrode, a first liquid crystal layer containing first liquid crystal molecules, and a second substrate with a second electrode;
a second polarizing plate with a second absorption axis parallel to the first absorption axis;
a second liquid crystal panel sequentially including a third substrate with a third electrode, a second liquid crystal layer containing second liquid crystal molecules, and a fourth substrate with a fourth electrode; and
a third polarizing plate with a third absorption axis parallel to the first absorption axis,
the viewing angle-controlling liquid crystal panel satisfying the following Formula (1), Formula (4), and Formula (5) as well as the following Formula (2) or Formula (3):

$$40° \leq |\varphi 1 - \varphi 2| \leq 50° \quad \text{Formula (1)}$$

$$0° \leq |\varphi P1 - \varphi 1| \leq 5° \quad \text{Formula (2)}$$

$$40° \leq |\varphi P2 - \varphi 2| \leq 50° \quad \text{Formula (3)}$$

$$0° \leq |\varphi 3 - \varphi 4| \leq 20° \quad \text{Formula (4)}$$

$$0° \leq |\varphi P3 - \varphi 3| \leq 5° \quad \text{Formula (5)}$$

wherein φP1 represents an azimuthal angle of the first absorption axis; φ1 represents an azimuthal angle of a director of the first liquid crystal molecules near the first substrate, and φ2 represents an azimuthal angle of a director of the first liquid crystal molecules near the second substrate, each with no voltage applied to the first liquid crystal layer; φP2 represents an azimuthal angle of the second absorption axis, φ3 represents an azimuthal angle of a director of the second liquid crystal molecules near the third substrate, and φ4 represents an azimuthal angle of a director of the second liquid crystal molecules near the fourth substrate, each with no voltage applied to the second liquid crystal layer; and φP3 represents an azimuthal angle of the third absorption axis.

2. The viewing angle-controlling liquid crystal panel according to claim 1,
wherein in the first liquid crystal panel, the first electrode and the second electrode are solid electrodes, and the first liquid crystal layer provides a retardation of not less than 600 nm and not more than 1200 nm, and
in the second liquid crystal panel, the third electrode and the fourth electrode are solid electrodes, and the second liquid crystal layer provides a retardation of not less than 300 nm and not more than 700 nm.

3. The viewing angle-controlling liquid crystal panel according to claim 1,
wherein the first liquid crystal panel or the second liquid crystal panel includes a negative C plate that provides a retardation Rth in a thickness direction of not less than 350 nm and not more than 750 nm.

4. A display device sequentially comprising:
a backlight located at or behind a back surface side of the first polarizing plate;
the viewing angle-controlling liquid crystal panel according to claim 1;
a display-providing liquid crystal panel located at or in front of a viewing surface side of the third polarizing plate and sequentially including a fifth substrate with a pixel electrode, a third liquid crystal layer containing third liquid crystal molecules, and a sixth substrate with color filters of a plurality of colors, the display-providing liquid crystal panel being in an IPS mode or an FFS mode; and
a fourth polarizing plate with a fourth absorption axis,
the display device satisfying the following Formula (6):

$$85° \leq |\varphi P3 - \varphi P4| \leq 90°$$ Formula (6)

wherein φP3 represents an azimuthal angle of the third absorption axis, and φP4 represents an azimuthal angle of the fourth absorption axis.

5. The display device according to claim 4,
wherein in the display-providing liquid crystal panel, the color filters of the plurality of colors and the pixel electrode each have an elongated shape, and
a lengthwise direction of each of the color filters of the plurality of colors and the pixel electrode lies in a top-bottom direction of the display-providing liquid crystal panel.

6. The display device according to claim 4,
wherein in the display-providing liquid crystal panel, the color filters of the plurality of colors and the pixel electrode each have an elongated shape, and
a lengthwise direction of each of the color filters of the plurality of colors and the pixel electrode lies in a left-right direction of the display-providing liquid crystal panel.

7. The display device according to claim 5,
wherein the sixth substrate includes a black matrix layer provided with apertures corresponding to the respective color filters of the plurality of colors,
the apertures each have a width in the top-bottom direction of the display-providing liquid crystal panel of not smaller than 80 μm and not greater than 140 μm, and
the apertures each have a width in a left-right direction of the display-providing liquid crystal panel of not greater than 80 μm.

8. The display device according to claim 6,
wherein the sixth substrate includes a black matrix layer provided with apertures corresponding to the respective color filters of the plurality of colors,
the apertures each have a width in the left-right direction of the display-providing liquid crystal panel of not smaller than 80 μm and not greater than 140 μm, and
the apertures each have a width in a top-bottom direction of the display-providing liquid crystal panel of not greater than 80 μm.

\* \* \* \* \*